US011771091B2

(12) United States Patent
Dale et al.

(10) Patent No.: US 11,771,091 B2
(45) Date of Patent: Oct. 3, 2023

(54) NON-TOXIC PLANT AGENT COMPOSITIONS AND METHODS AND USES THEREOF

(71) Applicant: Neozyme International, Inc., Costa Mesa, CA (US)

(72) Inventors: Parker Dale, Newport Beach, CA (US); Parker David Dale, Newport Beach, CA (US)

(73) Assignee: Neozyme International, Inc., Costa Mesa, CA (US)

( * ) Notice: Subject to any disclaimer, the term of this patent is extended or adjusted under 35 U.S.C. 154(b) by 775 days.

(21) Appl. No.: 16/729,240

(22) Filed: Dec. 27, 2019

(65) Prior Publication Data

US 2020/0138037 A1 May 7, 2020

Related U.S. Application Data

(63) Continuation of application No. 15/243,961, filed on Aug. 22, 2016, now Pat. No. 10,681,914, which is a continuation-in-part of application No. 14/404,917, filed as application No. PCT/US2013/000140 on May 24, 2013, now Pat. No. 9,617,178.

(60) Provisional application No. 62/208,662, filed on Aug. 22, 2015, provisional application No. 61/689,077, filed on May 29, 2012.

(51) Int. Cl.

*A01N 63/30* (2020.01)
*A01N 63/32* (2020.01)
*A01N 63/20* (2020.01)

(52) U.S. Cl.

CPC ............. *A01N 63/30* (2020.01); *A01N 63/20* (2020.01); *A01N 63/32* (2020.01)

(58) Field of Classification Search

CPC ...... D21C 5/005; D21C 5/025; D21H 17/005; D21H 21/24; D21H 21/36; Y02W 30/64; A01N 63/30; A01N 63/20; A01N 63/32; C12N 1/16; C12N 1/165; C12N 1/18; C12N 1/185; C12N 2500/74; C12R 2001/645; C12R 2001/72; C12R 2001/85; C12R 2001/86; C12R 2001/865; C12R 2001/87

See application file for complete search history.

(56) References Cited

U.S. PATENT DOCUMENTS

| | | | |
|---|---|---|---|
| 3,635,797 | A | 1/1972 | Battistoni et al. |
| 4,052,858 | A | 10/1977 | Jeppson |
| 4,541,986 | A | 9/1985 | Schwab et al. |
| 4,666,606 | A | 5/1987 | Heinicke |
| 4,758,353 | A | 7/1988 | Spence et al. |
| 4,804,478 | A | 2/1989 | Tamir |
| 5,071,765 | A | 12/1991 | Wiatr |
| 5,075,008 | A | 12/1991 | Chigusa et al. |
| 5,139,945 | A | 8/1992 | Liu |
| 5,179,003 | A | 1/1993 | Wolf et al. |
| 5,227,067 | A | 7/1993 | Runyon |
| 5,284,844 | A | 2/1994 | Lorenz et al. |
| 5,308,449 | A | 5/1994 | Fuentes et al. |
| 5,326,477 | A | 7/1994 | Fuqua et al. |
| 5,369,031 | A | 11/1994 | Middleditch et al. |
| 5,407,577 | A | 4/1995 | Nghiem |
| 5,462,868 | A | 10/1995 | Britt et al. |
| 5,500,306 | A | 3/1996 | Hsu et al. |
| 5,616,479 | A | 4/1997 | Marchal et al. |
| 5,654,192 | A | 8/1997 | Ducreux et al. |
| 5,736,209 | A | 4/1998 | Andersen et al. |
| 5,807,464 | A | 9/1998 | Jobbins et al. |
| 5,820,758 | A | 10/1998 | Dale et al. |
| 5,849,566 | A | 12/1998 | Dale et al. |
| 5,866,376 | A | 2/1999 | Rocha et al. |
| 5,879,913 | A | 3/1999 | Marchal et al. |
| 5,879,928 | A | 3/1999 | Dale et al. |
| 5,885,590 | A | 3/1999 | Hunter et al. |
| 5,885,950 | A | 3/1999 | Dale et al. |
| 6,001,218 | A | 12/1999 | Hsu et al. |
| 6,699,391 | B2 | 3/2004 | Baldridge et al. |
| 6,783,679 | B1 | 8/2004 | Rozich |
| 6,841,572 | B2 | 1/2005 | Horst et al. |
| 6,884,351 | B1 | 4/2005 | Lytal |
| 7,165,561 | B2 | 1/2007 | Baldridge et al. |
| 7,476,529 | B2 | 1/2009 | Podella et al. |
| 7,645,730 | B2 | 1/2010 | Baldridge et al. |
| 7,658,848 | B2 | 2/2010 | Baldridge et al. |
| 7,659,237 | B2 | 2/2010 | Baldridge et al. |
| 7,759,301 | B2 | 7/2010 | Baldridge et al. |

(Continued)

FOREIGN PATENT DOCUMENTS

| | | | |
|---|---|---|---|
| CA | 1124459 | A | 6/1982 |
| CN | 101557249 | A | 10/2009 |

(Continued)

OTHER PUBLICATIONS

Chaichi, et al., "Surfactant Application on Yield and Irrigation Water Use Efficiency in Com under Limited Irrigation", Crop Sci. 55(1): 386 (2015).
Desai, et al., "Microbial Production of Surfactants and Their Commercial Potential", Microbiol. Mol. Biol. Rev., 1997, 61(1): 47-64.
EPO, Extended Search Report for European Patent Application Serial No. EP13796699.0, pp. 12 (dated Jul. 12, 2016).

(Continued)

*Primary Examiner* — Renee Claytor
*Assistant Examiner* — Susan E. Fernandez
(74) *Attorney, Agent, or Firm* — UltimatEdge IP Law Group, P.C.; Dean G. Stathakis

(57) ABSTRACT

The present specification discloses plant agent compositions, articles of manufacture, containers or kits comprising such compositions, and methods and uses to control a causal agent of a plant disease or increasing plant growth and/or fruit production.

17 Claims, No Drawings

(56) References Cited

U.S. PATENT DOCUMENTS

| | | | |
|---|---|---|---|
| 7,922,906 B2 | 4/2011 | Baldridge et al. | |
| 8,188,028 B2 | 5/2012 | Baldridge et al. | |
| 8,389,459 B2 | 3/2013 | Baldridge et al. | |
| 8,735,338 B2 | 5/2014 | Baldridge et al. | |
| 8,778,646 B1 * | 7/2014 | Chapman ................. | C12P 7/06 435/165 |
| 8,821,646 B1 | 9/2014 | Miller et al. | |
| 8,835,152 B2 | 9/2014 | Podella | |
| 8,871,682 B2 | 10/2014 | Podella et al. | |
| 8,871,698 B2 | 10/2014 | Podella et al. | |
| 8,894,861 B2 | 11/2014 | Podella et al. | |
| 9,051,535 B2 | 6/2015 | Goldfeld et al. | |
| 9,617,178 B2 | 4/2017 | Dale | |
| 10,334,856 B2 | 7/2019 | Dale et al. | |
| 2002/0187220 A1 | 12/2002 | Luhadiya | |
| 2003/0121868 A1 | 7/2003 | Barak | |
| 2004/0180411 A1 | 9/2004 | Podella et al. | |
| 2005/0164355 A1 | 7/2005 | Vlasenko et al. | |
| 2005/0171275 A1 | 8/2005 | De et al. | |
| 2005/0266036 A1 | 12/2005 | Awada et al. | |
| 2006/0151387 A1 | 7/2006 | Yost et al. | |
| 2006/0205042 A1 | 9/2006 | Aehle et al. | |
| 2007/0029264 A1 | 2/2007 | Bowe | |
| 2007/0224249 A1 | 9/2007 | Kelly et al. | |
| 2007/0257127 A1 | 11/2007 | Iverson | |
| 2008/0138327 A1 | 6/2008 | Kelly | |
| 2008/0293813 A1 | 11/2008 | Agvald et al. | |
| 2009/0152196 A1 | 6/2009 | Podella | |
| 2009/0186761 A1 | 7/2009 | Arbogast et al. | |
| 2010/0078307 A1 | 4/2010 | Dale et al. | |
| 2010/0273495 A1 | 10/2010 | Onggosanusi et al. | |
| 2011/0052514 A1 | 3/2011 | Juesten et al. | |
| 2012/0100236 A1 | 4/2012 | Asolkar et al. | |
| 2012/0172219 A1 | 7/2012 | Podella et al. | |
| 2013/0104264 A1 | 4/2013 | Schoonneveld-Bergmans et al. | |
| 2013/0195826 A1 | 8/2013 | Alessandri et al. | |
| 2013/0281328 A1 | 10/2013 | Podella et al. | |
| 2013/0344554 A1 | 12/2013 | Bleyer et al. | |
| 2014/0056853 A1 | 2/2014 | Marrone et al. | |
| 2014/0128256 A1 | 5/2014 | Asolkar et al. | |
| 2014/0248373 A1 | 9/2014 | Michalow et al. | |
| 2015/0045220 A1 | 2/2015 | Michalow et al. | |
| 2015/0072917 A1 | 3/2015 | Baldridge et al. | |
| 2015/0141311 A1 | 5/2015 | Podella et al. | |
| 2015/0191748 A1 | 7/2015 | Dale | |
| 2015/0267151 A1 | 9/2015 | Goldfeld et al. | |
| 2016/0100587 A1 | 4/2016 | Bywater-Ekegard et al. | |
| 2016/0298056 A1 | 10/2016 | Baldridge et al. | |
| 2016/0353746 A1 | 12/2016 | Dale | |
| 2016/0362834 A1 | 12/2016 | Dale | |
| 2017/0156343 A1 | 6/2017 | Michalow et al. | |

FOREIGN PATENT DOCUMENTS

| | | | |
|---|---|---|---|
| CN | 101951686 | A | 1/2011 |
| CN | 104452385 | A | 3/2015 |
| EP | 375615 | A1 | 6/1990 |
| EP | 375615 | A2 | 6/1990 |
| EP | 1721966 | A1 | 11/2006 |
| KR | 20100088758 | A | 8/2010 |
| RU | 2143199 | C1 | 12/1999 |
| WO | 1992011381 | A1 | 7/1992 |
| WO | 1994012718 | A1 | 6/1994 |
| WO | 1996000811 | A1 | 1/1996 |
| WO | 1997016381 | A1 | 5/1997 |
| WO | 1997028092 | A1 | 8/1997 |
| WO | 1998005212 | A1 | 2/1998 |
| WO | 1998023813 | A1 | 6/1998 |
| WO | 2001079450 | A1 | 10/2001 |
| WO | 02/26041 | A2 | 4/2002 |
| WO | 2003031536 | A1 | 4/2003 |
| WO | 03/035972 | A1 | 5/2003 |
| WO | 2003037066 | A2 | 5/2003 |
| WO | 2005019527 | A1 | 3/2005 |
| WO | 2005054475 | A1 | 6/2005 |
| WO | 2005/067531 | A2 | 7/2005 |
| WO | 2005067531 | A2 | 7/2005 |
| WO | 2005069849 | A2 | 8/2005 |
| WO | 2006119052 | A2 | 11/2006 |
| WO | 2008111613 | A1 | 9/2008 |
| WO | 2010115021 | A2 | 10/2010 |
| WO | 2010148535 | A1 | 12/2010 |
| WO | 2011016008 | A1 | 2/2011 |
| WO | 2012040908 | A1 | 4/2012 |
| WO | 2013180756 | A1 | 12/2013 |
| WO | 2017035099 | A1 | 3/2017 |
| WO | 2017035100 | A1 | 3/2017 |
| WO | 2017035101 | A1 | 3/2017 |

OTHER PUBLICATIONS

EPO, Extended Search Report for European Patent Application Serial No. EP16839956.6, pp. 12 (dated Jan. 14, 2019).

EPO, Extended Search Report for European Patent Application Serial No. EP16839957.4, pp. 11 (dated Apr. 17, 2019).

EPO, Extended Search Report for European Patent Application Serial No. EP16839958.2, pp. 12 (dated Sep. 30, 2019).

EPO, Extended Search Report for European Patent Application Serial No. EP19160826.4, pp. 5 (dated Apr. 3, 2019).

Frolund, et al., "Enzymatic Activity in the Activated-Sludge Floc Matrix", Appl. Microbiol. Biotechnol., 1995, 43(3): 755-561.

Goel, "Enzyme Activities under Anaerobic and Aerobic Conditions in Activated Sludge Sequencing Batch Reactor", Water Research, 1998, 32(7): 2081-2088.

Ito, et al., "Sophorolipidsfrom Torulopsis bombicola: Possible Relation to Alkane Update", Appl. Environ, Micobiol., 1982, 43(6): 1278-1283.

Kastner, "Formation of Bound Residues during Microbial Degradation of [14C]Anthracene in Soil", Appl. Environ. Microbiol., 1999, 65(5): 1834-1842.

Sensient Flavors LLC, "Tastone 154, Technical Information", 2010.

Sukumaran, et al., "Microbial Celluloses—Production, Applications, and Challenges", J. Sci. Indus. Res., 2005, 64: 832-844.

WIPO, PCT Form IB373, International Preliminary Report on Patentability for International Patent Application Serial No. PCT/US2013/000140, pp. 12 (dated Dec. 2, 2014).

WIPO, PCT Form IB373, International Preliminary Report on Patentability for International Patent Application Serial No. PCT/US2016/048092, pp. 6 (dated Mar. 8, 2018).

WIPO, PCT Form IB373, International Preliminary Report on Patentability for International Patent Application Serial No. PCT/US2016/048093, pp. 5 (dated Mar. 8, 2018).

WIPO, PCT Form IB373, International Preliminary Report on Patentability for International Patent Application Serial No. PCT/US2016/048094, pp. 5, dated Feb. 2018.

WIPO, PCT Form ISA210, International Search Report for International Patent Application Serial No. PCT/US2013/000140, pp. 2 (dated Jul. 22, 2013).

WIPO, PCT Form ISA210, International Search Report for International Patent Application Serial No. PCT/US2016/048092, pp. 10 (dated Nov. 15, 2016).

WIPO, PCT Form ISA210, International Search Report for International Patent Application Serial No. PCT/US2016/048093, pp. 8 (dated Oct. 24, 2016).

WIPO, PCT Form ISA210, International Search Report for International Patent Application Serial No. PCT/US2016/048094, pp. 7 (dated Nov. 4, 2016).

WIPO, PCT Form ISA237, Written Opinion for International Patent Application Serial No. PCT/US2013/000140, pp. 11 (dated Jul. 22, 2013).

WIPO, PCT Form ISA237, Written Opinion for International Patent Application Serial No. PCT/US2016/0048093, pp. 4 (dated Oct. 24, 2016).

WIPO, PCT Form ISA237, Written Opinion for International Patent Application Serial No. PCT/US2016/048092. pp. 5 (dated Nov. 15, 2016).

(56) References Cited

OTHER PUBLICATIONS

WIPO, PCT Form ISA237, Written Opinion for International Patent Application Serial No. PCT/US2016/048094, pp. 4 (dated Nov. 4, 2016).
Witek-Krowiak, et al., "Ultrafiltrative Separation of Rhamnolipid from Culture Medium", World J. Microbiol. Biotechnol., 2011, 27: 1961-1964.
Xu, et al., "Biosurfactants for Microbubble Preparation and Application", Int. J. Mol. Sci., 2011, 12: 462-475.
Xu, et al., "Research Review of Wastewater Treatment Technology with Hydrolytic Enzymes", J. Chongqing Univ. Sci. Technol. 12(6), 2010, 156-161.
U.S. Appl. No. 15/243,961, filed Aug. 22, 2016, US 2016/0353746.
U.S. Appl. No. 14/404,917, filed May 24, 2013, US 2015/0191748, U.S. Pat. No. 9,617,178.
U.S. Appl. No. 15/243,957, filed Aug. 22, 2016, US 2016/0360758, U.S. Pat. No. 10,334,856.
U.S. Appl. No. 15/243,958, filed Aug. 22, 2016, US 2016/0362834, U.S. Pat. No. 10,557,234.
U.S. Appl. No. 15/444,093, filed Feb. 27, 2017, US 2017/0166467.
U.S. Appl. No. 16/446,583, filed Jun. 19, 2019, US 2019/0307130.
U.S. Appl. No. 16/729,236, filed Dec. 27, 2019.
U.S. Appl. No. 16/729,243, filed Dec. 27, 2019.
CNIPA, Second Office Action for Chinese Patent Application Serial No. 201680061816.2, pp. 9 (dated Mar. 15, 2021).
FSIP, Decision on Grant for Russian Patent Application Serial No. 2018109947, pp. 19 (dated Jun. 22, 2022).
Haruhiko, Recent Yeast Taxonomy, Journal of the Brewing Society of Japan, 1985, vol. 80, No. 8, pp. 519-529, ISSN 2186-4004.
JPO, Decision of Rejection for Japanese Patent Application Serial No. 2018-528938, pp. 7 (dated Apr. 5, 2022).
JPO, Office Action for Japanese Patent Application Serial No. 2018-528937, (dated Jul. 13, 2021), 4 pages.
JPO, Office Action for Japanese Patent Application Serial No. 2018-528938, (dated Aug. 17, 2021), 8 pages.

* cited by examiner

NON-TOXIC PLANT AGENT COMPOSITIONS AND METHODS AND USES THEREOF

This application is a continuation that claims the benefit of priority and the filing date pursuant to 35 U.S.C. § 120 of U.S. patent application Ser. No. 15/243,961, filed on Aug. 22, 2016, a continuation in part that claims the benefit of priority and the filing date of U.S. patent application Ser. No. 14/404,917, filed on Dec. 1, 2014, a US national stage filing of PCT Patent Application PCT/US2013/000140, filed on May 24, 2013, which claims the benefit of priority and the filing date of U.S. Provisional Patent Application 61/689,077, filed on May 29, 2012; and also claims the benefit of priority and the filing date of U.S. Provisional Patent Application 62/208,662, filed on Aug. 22, 2015, the content of each of which is hereby incorporated by reference in its entirety.

Agriculture is of the upmost importance to the world. Not only does agriculture essential to providing foodstuffs world-wide it is of critical economic importance to the economy of most, if not all countries. Three factor that can impact the yields of agricultural crops are plant disease, unfavorable growth conditions and cultivation inefficiency.

Losses from infectious plant diseases can have catastrophic humanitarian impact, where crop losses result in hunger, famine and starvation. In addition losses from plant diseases also can have a significant economic effect, causing decreased revenue for crop producers and distributors and higher prices for consumers. In situations where infectious plant disease-control methods are absent or limited, annual losses of 30% to 50% are common for major crops. Conventional plant agent technologies based on agricultural chemicals have improved agricultural productivity. However, agricultural chemical use has fallen into disfavor due to its negative consequences such as, e.g., increased cost to consumers and decreased revenue for crop producers and distributors. In addition, there is increasing public concerns regarding the negative impacts of agricultural chemicals on the environment. As such, protection of agriculturally important crops from plant diseases is crucial in improving crop yields.

Crop plants in different ecosystems around the world are also exposed to unfavorable growing conditions that negatively affect the health and vigor of the plants. These less than ideal conditions are typically due to soil or weather conditions, or various stresses including extremes of temperature, disadvantageous relationships between moisture and oxygen, toxic substances in the soil or atmosphere, and an excess or deficiency of an essential mineral. Such factors can reduce productivity of the crops to a greater or lesser degree, even under good growing conditions. As such, improving growing conditions of agriculturally important crops is important in improving crop yields.

Lastly, increased global population growth together with a concomitant decrease in land used for agriculture has increased the pressure to not only optimized crop productivity but also increase cultivation efficiency. In addition, demand for enhanced crop yields will only increase as both increases world-wide population growth and decreases in agriculture land used continues. As such, enhanced productivity of agriculturally important crops is vital in improving crop yields.

Accordingly, there is a great need for an environmentally-friendly treatments that will increase the health and vigor of plants, whether the plants are stressed by plant disease, by poor growing conditions, or even when the plants are healthy and/or grown under favorable conditions, but increased cultivation efficiency and productivity is needed. Such treatments should also reduce the amounts of, if not completely dispense with, agricultural chemicals in order to safeguard human welfare and the environment.

SUMMARY

Aspects of the present specification disclose plant agent compositions. The disclosed plant agent compositions comprises a treated fermented microbial supernatant and one or more nonionic surfactants. The disclosed plant agent compositions may further comprise one or more anionic surfactants. The disclosed plant agent compositions are biodegradable and non-toxic to humans, mammals, plants and the environment.

Aspects of the present specification disclose a plant agent kit. The disclosed plant agent kit comprises a plant agent composition disclosed herein and instructions for how to use the compositions to improve the health and vigor of plants.

Aspects of the present specification disclose methods of controlling a plant disease. The disclosed methods comprises applying an effective amount of a plant agent composition disclosed herein to one or more plants and/or one or more locations where control of a plant disease is desired.

Aspects of the present specification disclose methods of increasing plant growth and/or fruit production. The disclosed methods comprises applying an effective amount of a plant agent composition disclosed herein to one or more plants and/or one or more locations where increase in plant growth and/or fruit production is desired.

Aspects of the present specification disclose uses of a plant agent composition for controlling a plant disease. The disclosed uses comprises applying an effective amount of the plant agent composition disclosed herein to one or more plants and/or one or more locations where control of a plant disease is desired.

Aspects of the present specification disclose uses of a plant agent composition for increasing plant growth and/or fruit production. The disclosed uses comprises applying an effective amount of a plant agent composition disclosed herein to one or more plants and/or one or more locations where increased plant growth and/or fruit production is desired.

DETAILED DESCRIPTION

A plant becomes diseased when it is continuously disturbed by some causal agent that results in an abnormal physiological process that disrupts a plant's normal structure, growth, function, or other activities. This interference with one or more of a plant's essential physiological or biochemical systems elicits characteristic pathological conditions or symptoms. Plant diseases are caused by a pathogenic organism such as a fungus, bacterium, mycoplasma, virus, viroid, nematode, or parasitic flowering plant. An infectious agent is transmissible, being capable of reproducing within or on its host and spreading from one susceptible host to another. Plant diseases can be broadly classified according to the nature of their primary causal agent. Such primary causal agents include viruses, microorganisms like fungi and bacteria, and animals like nematodes. However, one difficulty in treating a plant disease caused by such primary causal agents is that they are typically protected from the environment by some sort of structure. These protective structures not only essential in maintaining the health of these causal agents, but also helpful in shielding these causal agents from compounds designed to destroy them.

A complete virus particle, known as a virion, consists of nucleic acid surrounded by a protective coat of protein called a capsid. The capsid encloses the genetic material of the virus and consists of several oligomeric structural subunits made of protein called protomers. Some viruses are enveloped, meaning that the capsid is coated with a lipid membrane known as the viral envelope. The envelope is acquired by the capsid from an intracellular membrane in the virus' host; examples include the inner nuclear membrane, the golgi membrane, and the cell's outer membrane.

Microorganisms such as, e.g., bacterium, mycoplasma (bacteria without a cell wall) and certain fungi, secrete a polymeric conglomeration of biopolymers, generally composed of extracellular nucleic acids, proteins, and polysaccharides, that form a matrix of extracellular polymeric substance (EPS). The EPS matrix embeds the cells causing the cells to adhere to each other as well as to any living (biotic) or non-living (abiotic) surface to form a sessile community of microorganisms referred to as a biofilm or slime layer. A biofilm colony can also form on solid substrates submerged in or exposed to an aqueous solution, or form as floating mats on liquid surfaces.

There are five stages of biofilm development, initial attachment, irreversible attachment, maturation I, maturation II and dispersion. Biofilm formation initially begins with the attachment of free-floating planktonic microorganisms to a surface. These first colonists adhere to the surface initially through weak, reversible adhesion via van der Waals forces. If not immediately separated from the surface, these first colonists become permanently anchored through secretion of the EPS matrix and formation of cell adhesion structures such as pili (irreversible attachment). Once colonization has begun, the biofilm grows through a combination of cell division of embedded microorganisms and new recruitment (Maturation I and II). In addition to the extracellular biopolymers secreted by the microorganisms, a biofilm can also incorporate material from the surrounding environment, including but not limited to minerals, soil particles, and biological components. Maturation I and II is where the biofilm is established and may only change in shape and size. The final stage of biofilm formation is known as dispersion, where microorganisms are released from the biofilm to enter the planktonic growth phase in order to spread and colonize new surfaces.

Microorganisms living in a biofilm are physiologically distinct and have significantly different properties from free-floating planktonic microorganisms of the same species. One reason for these differences is because the biofilm protects the microorganisms from the environment and allows them to cooperate and interact in various ways. For example, a biofilm increased the resistance of microorganisms to detergents and antibiotics. In addition, lateral gene transfer is greatly facilitated in biofilms and leads to a more stable biofilm structure. Microorganisms within a biofilm can also communicate with each other via quorum sensing (QS) using products such as N-acyl homoserine lactone (AHL). As such, biofilms play essential and critical roles in protecting microorganisms by insulating them from potentially harmful interactions with the environment.

Larger organisms also are protected from the environment by some sort of structure. Nematodes have a cuticle, a polymerized, proteinacious extracellular matrix. The cuticle of nematodes is formed when a mostly syncial epidermal cell layer, termed hypodermis, secretes various proteins from its apical membranes that are then extensively cross-linked by peroxidases on the outer surface of the hypodermis to form a cuticle. The major component of this flexible cuticle are members of the collagen superfamily and cuticlins, a highly cross-linked insoluble class of proteins. Overlying the cuticle is the lipid-rich, trilaminar epicuticle that is itself overlaid by a loosely associated, glycoprotein-rich, negatively charged surface coat (or glycocalyx). This multi-functional extracellular structure creates a highly impervious barrier that protects nematodes from desiccation and pathogenic infection as well as creates a structural framework that maintains its body morphology and integrity, prevents mechanical damage by environmental insults, and enables locomotion via attachments to body-wall muscles. As such, the nematode cuticle plays essential and critical roles in preserving the integrity of the animal and its interactions with the environment.

Thus, protective structures present in primary causal agents of plant diseases, such as, e.g., viruses, bacteria, fungi and nematodes is not only essential for the survival of these agents, but also protects them from the environment. Thus, a treatment that disrupts or otherwise destroys a protective structure of a primary causal agents of plant diseases would be of great benefit.

Plants, or green plants, are multicellular eukaryotes of the kingdom Plantae that form the Glade Viridiplantae. Green plants includes the flowering plants, conifers and other gymnosperms, ferns, clubmosses, hornworts, liverworts, mosses and the green algae, but exclude the red and brown algae, the fungi, archaea, bacteria and animals. Plants are characterized by obtaining most of their energy from sunlight via photosynthesis using chloroplasts. Chloroplasts contain chlorophylls a and b, which gives them their green color. Plants are also characterized by having a thick cell wall of cellulose, a central vacuole for storage, plastids for storage of pigments, sexual reproduction, modular and indeterminate growth, and an alternation of generations, although asexual reproduction is also common.

A typical plant is structurally organized into two primary divisions, the root system and the shoot system. The root system is usually underground and comprises primary and lateral roots as well as modified stem structures such as tubers and rhizomes. This system functions to anchor a plant in the soil, absorb water and nutrients from the ground, transport water and nutrients throughout a plant, store food produce certain hormones. The shoot system is usually above ground and comprises stems, leaves and the reproductive organs. This system functions to elevate a plant above the soil, conduct photosynthesis, conduct reproduction, transport water and nutrients throughout a plant, store food and produce hormones.

Plants containing vascular tissues which distribute resources throughout plant are referred to as vascular plants. Vascular plants, also known as tracheophytes, are defined as those land plants that have lignified vascular tissues (the xylem) for conducting water and minerals throughout a plant and specialized non-lignified vascular tissues (the phloem) to conduct products of photosynthesis. Vascular plants include the clubmosses, horsetails, ferns, gymnosperms (including conifers) and angiosperms (flowering plants). Scientific names for the group include Tracheophyta and Tracheobionta.

Xylem is a vascular tissue that on maturity is composed of dead cells. Xylem provides unidirectional transport of xylem sap from the roots up to and throughout a plant. Xylem sap includes water, soluble mineral nutrients and inorganic ions, although it can contain a number of organic chemicals as well. Movement of xylem sap through xylem is passive, relying on capillary action to provide the force that establishes an equilibrium configuration that counteracts gravity. This capillary action is achieved principally through two mechanisms, transpirational pull and root pressure. Transpirational pull is due to a surface tension created by evaporation of water from the surfaces of cells in the leaves which causes a negative pressure in the xylem that generates enough force to pulls xylem sap upwards from the roots and soil. Root pressure is due to osmosis created by the more negative water potential of the root cells relative to the soil due to higher solute concentrations which causes a positive pressure that forces xylem sap up the xylem towards the leaves.

Phloem comprises living vascular tissue composed of 1) conducting cells called sieve elements that form tubes; 2) parenchyma cells, including both specialized companion cells or albuminous cells and unspecialized cells; and 3) supportive cells, such as fibres and sclereids that provide mechanical support. Sieve elements lack a nucleus and have very few organelles, so they rely on companion cells or albuminous cells for most of their metabolic needs. Phloem provides multi-directional transport of photosynthate (or sap) made by the photosynthetic areas of a plant (principally the leaves) to all other parts of a plant where needed, especially the non-photosynthetic parts of a plant, such as the roots, or into storage structures, such as tubers or bulbs. Photosynthate is a water-based solution rich is sugars and other soluble organic nutrients made during photosynthesis. Movement of photosynthate through the phloem is driven by positive hydrostatic pressures. This process is termed translocation, and is accomplished by a process called phloem loading and unloading. Cells in a sugar source "load" a sieve-tube element by actively transporting solute molecules into it. This causes water to move into the sieve-tube element by osmosis, creating pressure that pushes the sap down the tube. In sugar sinks, cells actively transport solutes out of the sieve-tube elements, producing the opposite effect.

The root system is the organ of a plant that typically lies below the surface of the soil. Structurally, a root is composed of an epidermis, a cortex, an endodermis, a pericycle and a vascular system. The epidermis is the outer layer of cells. The cortex is the primary structural tissue of the root bound on the outside by the epidermis and on the inside by the endodermis. The endodermis separates the cortex from the pericycle, the tissue from which lateral (or branch) roots arise from. In the center of a root is the vascular tissue comprised of xylem and phloem. A root system comprises a primary root, lateral roots and root hairs and can be divided into three regions of growth. A zone of maturation is the portion of the root system that comprises the mature portion of the primary root, lateral roots and root hairs that is absorbing water and nutrients from the soil and transporting them through the xylem into the shoot system. The zone of elongation is where newly divided cells are enlarging. The meristematic zone is composed of the root tip meristem and the root cap and is the zone where cell division and new cell growth occurs.

Root hairs are absorptive unicellular extensions of epidermal cells of a root. These tiny, hair-like structures function as the major site of water and mineral uptake. There are beneficial microorganisms associated with root hairs which form a beneficial, symbiotic relationship with a plant. Mycorrhizae are soil fungi that appear to expand the root's contact with the soil profile, enhancing water and nutrient uptake. *Rhizobium* is a soil bacterium that make atmospheric nitrogen available to plants, typically by forming nodules on the roots of plants.

The proper transportation of both xylem sap and photosynthate is essential for a plant's survival. As such, facilitation of this transportation process will benefit the health of a plant. For example, improved absorption at the root hairs results in increased amounts of water, minerals and other nutrients needed by a plant for growth. Likewise, better xylem sap and photosynthate flow through the vascular tissue ensures for effective and efficient synthesis of compounds and energy needed to sustain and continue plant growth.

On the other hand, any impediment that disrupts or halts the movement of xylem sap and photosynthate affects the health of a plant. For example, disturbance of transpirational pull due to high temperatures, high humidity, darkness or drought dramatically decrease the negative water pressure in the xylem resulting in poor flow of xylem sap. Likewise, disturbance of root pressure due to poor water and nutrient absorption by root hairs due to unfavorable environmental conditions can significantly reduce the positive water pressure in the xylem resulting in poor flow of xylem sap. As another example, disruption of photosynthate flow in phloem results in poor distribution of nutrients. In any of these case, such flow disruptions can result in wilting, withering, stunted grow and reduced reproduction as well as increased susceptibility to plant diseases and unfavorable environmental conditions. With respect to agricultural, such flow disruptions ultimately result in reduced yields of crops. Thus, a treatment that facilitates, maintains or enhances xylem sap and photosynthate flow in xylem and phloem respectively would be of great benefit.

Irrigation is the artificial application of water to the land or soil. It is used to assist in the growing of agricultural crops, maintenance of landscapes, and revegetation of disturbed soils in dry areas and during periods of inadequate rainfall. Irrigation also has a few other uses in crop production, which include protecting plants against frost, suppressing weed growth and preventing soil consolidation. In contrast, agriculture that relies only on direct rainfall is referred to as rain-fed or dryland farming.

The goal of irrigation is to supply an entire field uniformly with water, so that each plant has the amount of water it needs, neither too much nor too little. Overhead or sprinkler irrigation is a system where water is distributed under high pressure through a piped network to one or more central locations within a field and distributed by overhead sprinklers or guns. Sprinklers can also be mounted on platforms that can be manually or automatically moved to different regions of the field. Center pivot, traveling sprinkler, lateral move and wheel line irrigation are types of overhead irrigation methods. Localized irrigation is a system where water is distributed under low pressure through a piped network, in a pre-determined pattern, and applied as a small discharge to each plant or adjacent to it. Drip, spray or micro-sprinkler and bubbler irrigation are types of localized irrigation methods. Localized irrigation methods can be the most water-efficient methods of irrigation because they deliver only the amount of water needed and minimize evaporation and runoff.

Most commercial and residential irrigation systems are "in ground" systems, meaning that everything is buried in the ground. With the pipes, sprinklers, emitters (drippers), and irrigation valves being hidden, it makes for a cleaner, more presentable landscape without garden hoses or other items having to be moved around manually. This does, however, create some drawbacks in the maintenance of a completely buried system.

Irrigation can lead to a number of problems. For example, the piped network of overhead and localized irrigation systems can become clogged due to growth of algae and other microorganisms creating biofilms, leading to aberrant water distribution. Such poor water distribution can cause unfavorable growing conditions that negatively affect the health and vigor of a plant. For example, inconsistent water distribution lead to an under or over irrigation of portions of a field due to unequal uniformity in distribution, increase soil salinity with consequent toxic salt build-up on soil surface due to under irrigation, crop failure due to under or over irrigation and increase prevalence in plant diseases. Thus, a treatment that facilitates, maintains or enhances water flow in localized and overhead irrigation systems would be of great benefit.

Without wishing to be limited by its theory, the presently disclosed plant agent compositions dissolve, disperse, or otherwise disrupt one or more components of the protective structures present on the causal agents of plant diseases, like viruses, bacteria, fungi and nematodes, resulting in their death through disruption of one or more essential physiological processes. This mechanism of action is tied to the ability of a plant agent composition disclosed herein to breach or otherwise rupture the capsid of viruses, the biofilms of microorganisms and the lipid-based membrane epicuticle layer of a nematode's cuticle. Methods of applying a disclosed plant agent compositions is effected thorough an external exposure, either by direct application to the causal agent, indirectly by treating a location where the causal agent will become exposed to a disclosed plant agent composition, or any other method that exposes the causal agent to the disclosed plant agent compositions in a manner that provides adequate disruption of one or more components of the protective structures present on the causal agents and subsequent death through disruption of an essential physiological process.

In addition, without wishing to be limited by its theory, the presently disclosed plant agent compositions improve absorption by root hairs, improve xylem sap flow through xylem and improve photosynthate flow in phloem, resulting in improved transport of water and nutrients that will maintain and/or enhance the health and vigor of plants. This mechanism of action is tied to the ability of a plant agent compositions disclosed herein to increase uptake of water, minerals and other nutrients from the soil, increase the capillary action and/or hydrostatic pressure in xylem, and/or increase synthesis of compounds and energy, resulting in sustained and continued plant growth and/or enhanced health and vigor of a plant. Methods of applying a disclosed plant agent compositions is effected thorough an external exposure, either by direct application to a plant, indirectly by treating a location where a plant will become exposed to a disclosed plant agent composition, or any other method that exposes a plant to the disclosed plant agent compositions in a manner that improves the absorption of water, minerals and other nutrients, improves the transportation of these raw materials throughout a plant and/or improves the synthesis of compounds and energy needed to sustain and continue plant growth.

Similarly, without wishing to be limited by its theory, the presently disclosed plant agent compositions dissolve, disperse, or otherwise remove one or more components that disrupt xylem sap flow in xylem and/or photosynthate flow in phloem, resulting in improved transport of water and nutrients that will maintain and/or enhance the health and vigor of plants. This mechanism of action is tied to the ability of a plant agent composition disclosed herein to dissolve or otherwise remove one or more components blocking the channels of xylem and phloem. Methods of applying a disclosed plant agent compositions is effected thorough an external exposure, either by direct application to a plant, indirectly by treating a location where a plant will become exposed to a disclosed plant agent composition, or any other method that exposes a plant to the disclosed plant agent compositions in a manner that provides adequate disruption of one or more components blocking xylem sap and/or photosynthate flow and subsequent improved transport of water and nutrients throughout a plant. In an embodiment, one or more components blocking xylem sap flow and/or photosynthate flow includes biofilm.

Furthermore, without wishing to be limited by its theory, the presently disclosed plant agent compositions dissolve, disperse, or otherwise remove one or more components that disrupt water flow in a pipeline network of an irrigation system, resulting in improved water distribution that will maintain and/or enhance the health and vigor of plants. This mechanism of action is tied to the ability of a plant agent compositions disclosed herein to dissolve or otherwise remove one or more components blocking the pipeline network. Methods of applying a disclosed plant agent compositions is effected thorough an external exposure, either by direct application to the pipeline network of an irrigation system, or any other method that exposes the pipeline network to the disclosed plant agent compositions in a manner that provides adequate removal of one or more components blocking the pipeline network and subsequent improved water transport throughout the pipeline network. In an embodiment, one or more components blocking a pipeline network includes biofilm.

Regardless of the theory of operation, the disclosed plant agent compositions and methods and uses offer an alternative means that does not rely on chemicals toxic to humans or the environment. Rather, a plant agent compositions and methods and uses disclosed herein act by exploiting an inherent process to improve raw material absorption and transport as well as improve synthesis of growth-sustaining compounds and energy. Similarly, a plant agent compositions and methods and uses disclosed herein act by exploiting a natural vulnerability of the causal agent to its environment, one or more components blocking xylem sap and/or photosynthate flow in a plant, or one or more components blocking water flow in an irrigation system. In addition, the components of the disclosed plant agent compositions been proven to be substantially non-toxic to man and domestic animals and which have minimal adverse effects on wildlife and the environment.

Aspects of the present specification disclose, in part, a plant agent composition. A plant agent composition disclosed herein comprises a treated fermented microbial supernatant and one or more non-ionic surfactants. The treated fermented microbial supernatant lacks any live microorganisms such as yeast or bacteria, and additionally, lacks any active enzymes, activatable pro-enzymes, or any enzymatic activity. Additionally, a plant agent composition itself lacks any live microorganisms such as yeast or bacteria, and additionally, lacks any active enzymes, activatable pro-enzymes, or any enzymatic activity.

In an aspect of this embodiment, a plant agent composition disclosed herein comprises, e.g., about 75% to about 99% of treated fermented microbial supernatant and about 1%-25% of one or more non-ionic surfactants. In another aspect of this embodiment, a plant agent composition disclosed herein comprises, e.g., about 80% to about 97% of treated fermented microbial supernatant and about 3%-20% of one or more non-ionic surfactants. In yet another aspect of this embodiment, a plant agent composition disclosed herein comprises, e.g., about 85% to about 95% of treated fermented microbial supernatant and about 5%-15% of one or more non-ionic surfactants. In still another aspect of this embodiment, a plant agent composition disclosed herein comprises, e.g., about 87% to about 93% of treated fermented microbial supernatant and about 7%-13% of one or more non-ionic surfactants. In another aspect of this embodiment, a plant agent composition disclosed herein comprises, e.g., about 88% to about 92% of treated fermented microbial supernatant and about 8%-12% of one or more non-ionic surfactants. In another aspect of this embodiment, a plant agent composition disclosed herein comprises, e.g., about 89% to about 91% of treated fermented microbial supernatant and about 9%-11% of one or more non-ionic surfactants.

Aspects of the present specification disclose, in part, a fermented microbial supernatant. A fermented microbial supernatant disclosed herein can be prepared by culturing a yeast strain, a bacterial strain, or a combination of both a yeast strain and a bacterial strain in a fermenting medium comprising a sugar source, a malt and a magnesium salt. In an aspect of this embodiment, only a single yeast strain is used in a fermenting medium. In another aspect of this embodiment, two or more different yeast strains are used in a fermenting medium. In yet another aspect of this embodiment, only a single bacterial strain is used in a fermenting medium. In still another aspect of this embodiment, two or more different bacterial strains are used in a fermenting medium. In another aspect of this embodiment, one or more different yeast strains are used in conjunction with one or more different bacteria in a fermenting medium. In yet another aspect of this embodiment, two, three, four, five or more different yeast strains are used in conjunction with two, three, four, five or more different bacteria in a fermenting medium.

A sugar source includes, without limitation, sucrose from molasses, raw cane sugar, soybeans or mixtures thereof. Molasses generally contains up to about 50% sucrose in addition to reducing sugars such as glucose and maltase as well as ash, organic non-sugars and some water. The presence of the sugars of the type found in the molasses is important in encouraging the activity of the enzymes and the yeast bacteria by which they are produced. Although the untreated cane blackstrap molasses is preferred, other molasses such as beet molasses, barrel molasses and the like may also be used as a natural source of the materials required for the enzymatic fermentation. The amount of molasses useful in preparing a fermenting medium disclosed herein is between 40% and about 80% by weight, and preferably between about 55% and about 75% by weight. It will be appreciated that specific amounts of the molasses utilized may be varied to yield optimum compositions desired.

Raw cane sugar is a sugar product which has not been refined and which contains residual molasses as well as other natural impurities. Although it is not clearly understood, it has been found that the presence of raw sugar in the fermentation reaction yields significantly improved properties as compared to the use of refined sugars which contain residual chemicals used in the decolorization and final purification and refinement which may have some deleterious effect on the yeast and malt enzymes. It has been found that optimum biological and enzymatic properties of the disclosed fermenting medium are improved where a portion of the fermentable materials present in the mixture comprises raw sugar. The amount of raw cane sugar useful in preparing a fermenting medium disclosed herein may be about 10% and about 40% by weight, and preferably between about 10% and about 30% by weight. It will be appreciated that specific amounts of the raw cane sugar utilized may be varied to yield optimum compositions desired.

The essential enzymes which advantageously contribute to the fermentation reaction are provided by the malt and the yeast and/or bacteria. The specific malt utilized is preferably a diastatic malt which contains enzymes including diastase, maltase and amylase. The malt also is believed to improve the activity of the yeast and/or bacteria in addition to contributing to the overall potency and activity of the enzymatic composition within the final product mixture. The amount of malt useful in preparing a fermenting medium disclosed herein may be between about 3% and about 15% by weight, and preferably between about 7% and about 12% by weight. It will be appreciated that specific amounts of the malt utilized may be varied to yield optimum compositions desired.

Fermentation is a metabolic process that results in the breakdown of carbohydrates and other complex organic substances into simpler substances like sugars, acids, gases or alcohol. Fermentation can occurs in yeast, bacteria and mold. Fermentation includes ethanol fermentation and lactic acid fermentation. Lactic acid fermentation includes homolactic fermentation and heterolactic fermentation.

A yeast refers to any fermentation fungi that can be produce the needed enzymes for a fermentation reaction that results in, for example the conversion of carbohydrates into carbon dioxide and alcohols. A number of enzymes are produced by the active yeast during the fermentation reaction and include both hydrolytic and oxidative enzymes such as invertase, catalase, lactase, maltase, carboxylase and others. Yeast include yeast strains useful in food processing fermentation, such as, e.g., bean-based fermentation, dough-based fermentation, grain-based fermentation, vegetable-based fermentation, fruit-based fermentation, honey-based fermentation, dairy-based fermentation, fish-based fermentation, meat-based fermentation and tea-based fermentation. A non-exhaustive list of particular yeast genera useful in a fermentation reaction disclosed herein include, but is not limited, *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* and *Zygotorulaspora*. Species of yeast useful in a fermentation reaction disclosed herein belong to, without limitation A non-exhaustive list of particular yeast species useful in a fermentation reaction disclosed herein includes, but is not limited, *B. anomalus, B. bruxellensis, B. claussenfi, B. custersianus, B. naardenensis, B. nanus, C. colliculosa, C. exiguous, C. humicola, C. kefyr, C. krusei, C. milleri, C. mycoderma, C. pelliculosa, C. rugose, C. stellate, C. tropicalis, C. utilis, C. valida, C. vini, C. zeylanoides, Cb. mrakii, Cs, infirmominiatum, D. hansenfi, D. kloeckeri, Dk. anomala, Dk. bruxellensis, F. domesticum, G. candidum, I. orientalis, K. exigua, K. unispora, Kl. africana, Kl. apis, Kl. javanica, Ku. lactis, Ku. marxianus, Ku. marxianus, L. lecanfi, M. hiemalis, M. plumbeus, M. racemosus, M. rac-*

*emosus, N. intermedia, P. cerevisiae, Pn. album, Pn. camemberti, Pn. caseifulvum, Pn. chrysogenum, Pn. commune, Pn. nalgiovense, Pn. roqueforti, Pn. solitum, Pi. fermentans, R. microspores, Rs. infirmominiatum, Rt. glutinis, Rt. minuta, Rt. rubra, S. bayanus, S. boulardii, S. carlsbergensis, S. cerevisiae, S. eubayanus, S. paradoxus, S. pastorianus, S. rouzii, S. uvarum, Sc. pombe, Th. beigelii, T. delbrueckii, T. franciscae, T. pretoriensis, T. microellipsoides, T. globosa, T. indica, T. maleeae, T. quercuum, To. versatilis, V. lecanfi, Y. lipolytica, Z. bailii, Z. bisporus, Z. cidri, Z. fermentati, Z. florentinus, Z. kombuchaensis, Z. lentus, Z. mellis, Z. microellipsoides, Z. mrakii, Z. pseudorouxii* and *Z. rouxii* and *Zt. florentina*. A preferred yeast is *Saccharomyces cerevisiae* commonly available as baker's yeast.

Bacteria refer to any fermentation bacteria that can be produce the needed enzymes for a fermentation reaction that results in, for example the production of alcohols like ethanol or acids like acetic acid, lactic acid and/or succinic acid. A non-exhaustive list of particular bacterial genera useful in a fermentation reaction disclosed herein include, but is not limited, *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* and *Zymomonas*. A non-exhaustive list of particular bacterial species useful in a fermentation reaction disclosed herein includes, but is not limited, *A. aceti, A. fabarum, A. lovaniensis, A. malorum, A. orientalis, A. pasteurianus, A. pasteurianus, A. pomorum, A. syzygii, A. tropicalis, Ar. arilaitensis, Ar. Bergerei, Ar. Globiformis, Ar. nicotianae, Ar. variabilis, B. cereus, B. coagulans, B. licheniformis, B. pumilus, B. sphaericus, B. stearothermophilus, B. subtilis, B. adolescentis, B. animalis, B. bifidum, B. breve, B. infantis, B. lactis, B. longum, B. pseudolongum, B. thermophilum, Br. alimentarium, Br. alimentarium, Br. tyrofermentans, Br. tyrofermentans, Bv. aurantiacum, Bv. casei, Bv. linens, C. divergens, C. maltaromaticum, C. piscicola, C. ammoniagenes, Co. casei, Co. fiavescens, Co. mooreparkense, Co. variabile, E. faecalis, E. faecium, G. azotocaptans, G. diazotrophicus, G. entanii, G. europaeus, G. hansenfi, G. johannae, G. oboediens, G. xylinus, Gl. oxydans, H. alvei, Hl. elongate, K. rhizophila, K. rhizophila, K. varians, K. varians, L. acetotolerans, L. acidifarinae, L. acidipiscis, L. alimentarius, L. brevis, L. bucheri, L. cacaonum, L. casei, L. cellobiosus, L. collinoides, L. composti, L. coryniformis, L. crispatus, L. curvatus, L. delbrueckii, L. dextrinicus, L. diolivorans, L. fabifermentans, L. farciminis, L. fermentum, L. gasseri, L. ghanensis, L. hammesii, L. harbinensis, L. helveticus, L. hilgardii, L. homohiochii, L. jensenii, L. johnsonii, L. kefiranofaciens, L. kefiri, L. kimchi, L. kisonensis, L. kunkeei, L. mali, L. manihotivorans, L. mindensis, L. mucosae, L. nagelii, L. namuresis, L. nantesis, L. nodensis, L. oeni, L. otakiensis, L. panis, L. parabrevis, L. parabuchneri, L. paracasei, L. parakefiri, L. paralimentarius, L. paraplantarum, L. pentosus, L. perolens, L. plantarum, L. pobuzihii, L. pontis, L. rapi, L. reuteri, L. rhamnosus, L. rossiae, L. sakei, L. salivarius, L. sanfranciscensis, L. satsumensis, L. secaliphilus, L. senmaizukei, L. siliginis, L. similis, L. spicheri, L. suebicus, L. sunkii, L. tucceti, L. vaccinostercus, L. versmoldesis, L. yamanashiensis, Lc. lactis, Lc. raffinolactis, Le. carnosum, Le. citreum, Le. fallax, Le. holzapfelii, Le. inhae, Le. kimchi, Le. lactis, Le. mesenteroides, Le. palmae, Le. Pseudomesenteroides, M. caseolyticus, Mb. foliorum, Mb gubbeenense, Mc. luteus, Mc. lylae, P. acidilactici, P. pentosaceus, P. acidipropionici, P. freudenreichii, P. jensenii, P. thoenii, Pr. vulgaris, Ps. fluorescens, Py. celer, S. carnosus, S. condiment, S. equorum, S. fleurettii, S. piscifermentans, S. saphrophyticus, S. sciuri, S. simulans, S. succinus, S. vitulinus, S. warneri, S. xylosus, St. cremoris, St. gallolyticus, St. salivarius, St. thermophiles, St. griseus, T. halophilus, T. koreensis, W. beninensis, W. cibaria, W. fabaria, W. ghanesis, W. koreensis, W. paramesenteroides, W. thailandensis,* and *Z. mobilis.*

Mold refer to any fermentation mold that can be produce the needed enzymes for a fermentation reaction that results in, for example the production of alcohols like ethanol or acids like acetic acid, lactic acid and/or succinic acid. A non-exhaustive list of particular mold genera useful in a fermentation reaction disclosed herein include, but is not limited, *Aspergillus*. A non-exhaustive list of particular mold species useful in a fermentation reaction disclosed herein includes, but is not limited, *A. acidus, A. fumigatus, A. niger, A. oryzae*, and *A. sojae.*

It will be appreciated that actual amounts of the various types of enzymes produced will be dependent on a number of factors including the types of molasses and sugar used in preparing the fermentation mixture. However, again it is believed that, in utilizing the molasses and raw sugar, optimum enzyme yields and activity are obtained. In an embodiment, the amount of yeast useful in preparing a fermenting medium disclosed herein may be between about 0.2% and about 5% by weight, and preferably between about 1% and about 3% by weight. It will be appreciated that specific amounts of the yeast utilized may be varied to yield optimum compositions desired.

The presence of a small amount of inorganic catalyst such as a magnesium salt enhances the activity of the enzymes not only during the fermentation reaction but thereafter in the product composition in attacking and decomposing the organic waste materials. A preferred magnesium salt is magnesium sulfate. The amount of magnesium salt useful in preparing a fermenting medium disclosed herein may be between about 0.1% and about 5% by weight, and preferably between about 1% and about 3% by weight. It will be appreciated that specific amounts of the magnesium salt utilized may be varied to yield optimum compositions desired.

To prepare a fermented microbial supernatant, the molasses, sucrose and magnesium salt are added to a suitable amount of warm water. Although the specific amount of water used is not particularly critical, typically suitable amounts of water are from about 2 to about 20 times the total weight of the other ingredients of the fermenting medium used in the fermentation reaction. This amount of water is sufficient to facilitate easy admixture as well as to activate the yeast, bacterial and/or mold and dissolve the other materials. In addition, the temperature of the water cannot be too hot such that the heat inactivates the malt and yeast enzymes needed for fermentation. Thus, for example, water temperatures greater than about 65° C. must be avoided and preferred temperatures are between about 25° C. to about 45° C. The use of cold water may result in unduly slow fermentation reaction rates and, thus, should also be avoided where increased reaction rates are desired. After the molasses, sugar and magnesium salt are effectively mixed and dissolved, the malt and the yeast are added, the mixture stirred and allowed to set until fermentation is essentially complete. The reaction time may be between about 2 and about 5 days at temperatures between about 20° C. and about 45° C. Completion may be readily ascertained by noting that the effervescence of the reacting mixture has substantially subsided. At the end of the fermentation reaction, the fermented microbial culture is centrifuged to remove the "sludge" formed during the fermentation. The resulting fermentation supernatant (typically about 90% to about 98% by weight) is collected for subsequent treatment.

A fermented microbial supernatant contains bio-nutrients, minerals and amino acids. Bio-nutrients are typically present in an amount of from about 0.01% to about 1% of the total weight of fermented microbial supernatant. Each individual bio-nutrient is typically present in an amount of from about 0.00001% to about 0.01% of the total weight of fermented microbial supernatant. Examples of bio-nutrients include, without limitation, biotin, folic acid, glucans like α-glucan and β-glucan, niacin, insotil, pantothenic acid, pyridoxine, riboflavin and thiamine. In aspects of this embodiment, a fermented microbial supernatant disclosed herein comprises, e.g., about 0.00001% to about 0.0011% of biotin, about 0.0006% to about 0.016% of folic acid, about 0.005% to about 15% of niacin, about 0.01% to about 1% of insotil, about 0.00017% to about 0.017% of pantothenic acid, about 0.0006% to about 0.016% of pyrodoxine, about 0.002% to about 0.023% of riboflavin and about 0.001% to about 0.02% of thiamine. In other aspects of this embodiment, a fermented microbial supernatant disclosed herein comprises, e.g., about 0.00006% to about 0.0006% of biotin, about 0.001% to about 0.011% of folic acid, about 0.01% to about 0.1% of niacin, about 0.08% to about 0.18% of insotil, about 0.002% to about 0.012% of pantothenic acid, about 0.001% to about 0.011% of pyrodoxine, about 0.007% to about 0.017% of riboflavin, about 0.003% to about 0.013% of thiamine. In yet other aspects of this embodiment, a fermented microbial supernatant disclosed herein comprises, e.g., about 0.00012% to about 0.0006% of biotin, about 0.001% to about 0.011% of folic acid, about 0.01% to about 0.1% of niacin, about 0.08% to about 0.18% of insotil, about 0.003% to about 0.013% of pantothenic acid, about 0.001% to about 0.011% of pyrodoxine, about 0.008% to about 0.017% of riboflavin, about 0.003% to about 0.013% of thiamine. In still other aspects of this embodiment, a fermented microbial supernatant disclosed herein comprises, e.g., about 0.00009% to about 0.0003% of biotin, about 0.004% to about 0.008% of folic acid, about 0.03% to about 0.07% of niacin, about 0.11% to about 0.15% of insotil, about 0.006% to about 0.01% of pantothenic acid, about 0.004% to about 0.008% of pyrodoxine, about 0.01% to about 0.014% of riboflavin, about 0.006% to about 0.010% of thiamine.

Minerals are typically present in an amount of from about 0.1% to about 20% of the total weight of fermented microbial supernatant. Each individual mineral is typically present in an amount of from about 0.0001% to about 5% of the total weight of fermented microbial supernatant. Examples of minerals include, without limitation, calcium, chromium, copper, iron, magnesium, phosphate, potassium, sodium and zinc. In aspects of this embodiment, a fermented microbial supernatant disclosed herein comprises, e.g., about 0.02% to about 0.3% of calcium, about 0.000002% to about 0.0016% of chromium, about 0.000009% to about 0.0014% of copper, about 0.00005% to about 0.02% of iron, about 0.001% to about 1.3% of magnesium, about 0.2% to about 14% of phosphate, about 0.4% to about 16% of potassium, about 0.2% to about 15% of sodium and about 0.08% to about 13% of zinc. In other aspects of this embodiment, a fermented microbial supernatant disclosed herein comprises, e.g., about 0.07% to about 0.21% of calcium, about 0.000007% to about 0.0011% of chromium, about 0.00004% to about 0.0009% of copper, about 0.0001% to about 0.015% of iron, about 0.005% to about 0.9% of magnesium, about 0.7% to about 9% of phosphate, about 0.9% to about 11% of potassium, about 0.7% to about 10% of sodium and about 0.3% to about 8% of zinc. In yet other aspects of this embodiment, a fermented microbial supernatant disclosed herein comprises, e.g., about 0.05% to about 1% of calcium, about 0.0001% to about 0.0009% of chromium, about 0.00006% to about 0.0007% of copper, about 0.0001% to about 0.013% of iron, about 0.005% to about 1% of magnesium, about 0.1% to about 7% of phosphate, about 0.5% to about 9% of potassium, about 0.5% to about 8% of sodium and about 0.5% to about 6% of zinc. In still other aspects of this embodiment, a fermented microbial supernatant disclosed herein comprises, e.g., about 0.12% to about 0.16% of calcium, about 0.0002% to about 0.0006% of chromium, about 0.00009% to about 0.0004% of copper, about 0.0006% to about 0.01% of iron, about 0.01% to about 0.4% of magnesium, about 1% to about 4% of phosphate, about 2% to about 6% of potassium, about 1% to about 5% of sodium and about 0.8% to about 3% of zinc.

Amino acids are typically present in an amount of from about 20% to about 60% of the total weight of fermented microbial supernatant. Each individual amino acid is typically present in an amount of from about 0.1% to about 15% of the total weight of fermented microbial supernatant. Examples of minerals include, without limitation, alanine, arginine, aspartic acid, cysteine, glutamic acid, glycine, lysine, methionine, phenylalanine, proline, serine, and threonine. In aspects of this embodiment, a fermented microbial supernatant disclosed herein comprises, e.g., about 0.2% to about 16% of alanine, about 0.09% to about 15% of arginine, about 0.4% to about 18% of aspartic acid, about 0.003% to about 5% of cysteine, about 0.5% to about 20% of glutamic acid, about 0.09% to about 15% of glycine, about 0.09% to about 15% of lysine, about 0.002% to about 5% of methionine, about 0.09% to about 15% of phenylalanine, about 0.09% to about 15% of proline, about 0.09% to about 15% of serine and about 0.09% to about 15% of threonine. In other aspects of this embodiment, a fermented microbial supernatant disclosed herein comprises, e.g., about 0.7% to about 11% of alanine, about 0.5% to about 10% of arginine, about 0.9% to about 13% of aspartic acid, about 0.008% to about 1.2% of cysteine, about 1% to about 15% of glutamic acid, about 0.5% to about 10% of glycine, about 0.8% to about 12% of lysine, about 0.2% to about 1.6% of methionine, about 0.5% to about 10% of phenylalanine, about 0.5% to about 10% of proline, about 0.5% to about 10% of serine and about 0.5% to about 10% of threonine. In yet other aspects of this embodiment, a fermented microbial supernatant disclosed herein comprises, e.g., about 0.5% to about 9% of alanine, about 0.5% to about 8% of arginine, about 1% to about 11% of aspartic acid, about 0.01% to about 2% of cysteine, about 3% to about 13% of glutamic acid, about 0.5% to about 8% of glycine, about 1% to about 10% of lysine, about 0.3% to about 3% of methionine, about 0.5% to about 7% of phenylalanine, about 0.5% to about 7% of proline, about 0.5% to about 7% of serine and about 0.5% to about 7% of threonine. In sill other aspects of this embodiment, a fermented microbial supernatant disclosed herein comprises, e.g., about 2% to about 6% of alanine, about 1% to about 5% of arginine, about 4% to about 8% of aspartic acid, about 0.03% to about 0.7% of cysteine, about 6% to about 10% of glutamic acid, about 1% to about 5% of glycine, about 3% to about 7% of lysine, about 0.7% to about 1.1% of methionine, about 1% to about 5% of phenylalanine, about 1% to about 5% of proline, about 1% to about 5% of serine and about 1% to about 5% of threonine.

Aspects of the present specification disclose, in part, a treated fermented microbial supernatant. A treated fermented microbial supernatant is one that is processed in a manner that denatures, kills or otherwise destroys any remaining live yeast, active enzymes contributed by the yeast and malt as well as any other microorganism or enzymes contributed by another source present in a fermented microbial supernatant disclosed herein. Non-limiting examples, of useful treatment procedures include a boiling process using high temperatures, an autoclaving process using high temperatures and high pressure or an irradiation process by exposing the supernatant to ionizing radiation, or any other sterilization process that denatures, kills or otherwise destroys any remaining live yeast, active enzymes contributed by the yeast and malt as well as any other microorganism or enzymes contributed by another source present in a fermented microbial supernatant disclosed herein. Furthermore, the above treatment processes could be used alone, in combination with one another, or in combination with a pasteurization process, a chemical sterilization process and a sterile filtration process to denature, kill or otherwise destroys proteins such as enzymes and microorganisms such as yeast, bacteria and/or mold present the fermentation supernatant disclosed herein. All the methods discussed above are processes known to a person of ordinary skilled in the art as these are routinely used in the food preparation and/or sterilization arts.

The treated fermented microbial supernatant can then be stored in liquid form for subsequent use. Alternatively, the treated fermented microbial supernatant can be spray dried by methods known in the art to produce a dry powder. The dry powder form can also be stored for subsequent use.

Any amount of treated fermented microbial supernatant disclosed herein may be used in a disclosed plant agent composition, with the proviso that the amount is useful to practice the methods disclosed herein. Factor used in determining an appropriate amount include, e.g., whether the treated fermented microbial supernatant is in liquid or powder form, the particular commercial source of the treated fermented microbial supernatant, the particular method used to produce the treated fermented microbial supernatant, whether a plant agent composition is produced as a concentrate or as a ready as is product, and the dilution factor desired when preparing plant agent composition from a concentrate. Typically, a larger amount of a liquid form of the treated fermented microbial supernatant will be required relative to a dry powder form.

In aspects of this embodiment, the amount of treated fermented microbial supernatant used is, e.g., about 0.5% by weight, about 1.0% by weight, about 1.5% by weight, about 2.0% by weight, about 2.5% by weight, about 3.0% by weight, about 3.5% by weight, about 4.0% by weight, about 4.5% by weight, about 5.0% by weight, about 6.0% by weight, about 7.0% by weight, about 7.5% by weight, about 8.0% by weight, about 9.0% by weight or about 10.0% by weight. In other aspects of this embodiment, the amount of treated fermented microbial supernatant used is, e.g., at least 0.5% by weight, at least 1.0% by weight, at least 1.5% by weight, at least 2.0% by weight, at least 2.5% by weight, at least 3.0% by weight, at least 3.5% by weight, at least 4.0% by weight, at least 4.5% by weight, at least 5.0% by weight, at least 6.0% by weight, at least 7.0% by weight, at least 7.5% by weight, at least 8.0% by weight, at least 9.0% by weight or at least 10.0% by weight. In yet other aspects of this embodiment, the amount of treated fermented microbial supernatant used is, e.g., at most 0.5% by weight, at most 1.0% by weight, at most 1.5% by weight, at most 2.0% by weight, at most 2.5% by weight, at most 3.0% by weight, at most 3.5% by weight, at most 4.0% by weight, at most 4.5% by weight, at most 5.0% by weight, at most 6.0% by weight, at most 7.0% by weight, at most 7.5% by weight, at most 8.0% by weight, at most 9.0% by weight or at most 10.0% by weight. In still other aspects of this embodiment, the amount of treated fermented microbial supernatant used is between, e.g., about 0.1% to about 2.5% by weight, about 0.1% to about 3.0% by weight, about 0.1% to about 3.5% by weight, about 0.1% to about 4.0% by weight, about 0.1% to about 5.0% by weight, about 0.5% to about 2.5% by weight, about 0.5% to about 3.0% by weight, about 0.5% to about 3.5% by weight, about 0.5% to about 4.0% by weight, about 0.5% to about 5.0% by weight, about 1% to about 2.5% by weight, about 1% to about 3.0% by weight, about 1% to about 3.5% by weight, about 1% to about 4.0% by weight, about 1% to about 5.0% by weight, about 1% to about 6.0% by weight, about 1% to about 7.0% by weight, about 1% to about 8.0% by weight, about 1% to about 9.0% by weight or about 1% to about 10.0% by weight.

In other aspects of this embodiment, the amount of treated fermented microbial supernatant used is, e.g., about 15.0% by weight, about 20.0% by weight, about 25.0% by weight, about 30.0% by weight, about 35.0% by weight, about 40.0% by weight, about 45.0% by weight, about 50.0% by weight, about 55.0% by weight, about 60.0% by weight, about 65.0% by weight, about 70.0% by weight, about 75.0% by weight, about 80.0% by weight, about 85.0% by weight or about 90.0% by weight. In yet other aspects of this embodiment, the amount of treated fermented microbial supernatant used is, e.g., at least 15.0% by weight, at least 20.0% by weight, at least 25.0% by weight, at least 30.0% by weight, at least 35.0% by weight, at least 40.0% by weight, at least 45.0% by weight, at least 50.0% by weight, at least 55.0% by weight, at least 60.0% by weight, at least 65.0% by weight, at least 70.0% by weight, at least 75.0% by weight, at least 80.0% by weight, at least 85.0% by weight or at least 90.0% by weight. In still other aspects of this embodiment, the amount of treated fermented microbial supernatant used is, e.g., at most 15.0% by weight, at most 20.0% by weight, at most 25.0% by weight, at most 30.0% by weight, at most 35.0% by weight, at most 40.0% by weight, at most 45.0% by weight, at most 50.0% by weight, at most 55.0% by weight, at most 60.0% by weight, at most 65.0% by weight, at most 70.0% by weight, at most 75.0% by weight, at most 80.0% by weight, at most 85.0% by weight or at most 90.0% by weight.

In other aspects of this embodiment, the amount of treated fermented microbial supernatant used is between, e.g., about 5% to about 7.5% by weight, about 5% to about 10% by weight, about 5% to about 15% by weight, about 5% to about 20% by weight, about 5% to about 25% by weight, about 5% to about 30% by weight, about 5% to about 35% by weight, about 5% to about 40% by weight, about 5% to about 45% by weight, about 5% to about 50% by weight, about 5% to about 55% by weight, about 5% to about 60% by weight, about 5% to about 65% by weight, about 5% to about 70% by weight, about 5% to about 75% by weight, about 5% to about 80% by weight, about 5% to about 85% by weight, about 5% to about 90% by weight, about 5% to about 95% by weight, about 10% to about 15% by weight, about 10% to about 20% by weight, about 10% to about 25% by weight, about 10% to about 30% by weight, about 10% to about 35% by weight, about 10% to about 40% by weight, about 10% to about 45% by weight, about 10% to about 50% by weight, about 10% to about 55% by weight, about 10% to about 60% by weight, about 10% to about 65% by weight, about 10% to about 70% by weight, about 10% to about 75% by weight, about 10% to about 80% by weight, about 10% to about 85% by weight, about 10% to about 90% by weight, about 10% to about 95% by weight, about 15% to about 20% by weight, about 15% to about 25% by weight, about 15% to about 30% by weight, about 15% to about 35% by weight, about 15% to about 40% by weight, about 15% to about 45% by weight, about 15% to about 50% by weight, about 15% to about 55% by weight, about 15% to about 60% by weight, about 15% to about 65% by weight, about 15% to about 70% by weight, about 15% to about 75% by weight, about 15% to about 80% by weight, about 15% to about 85% by weight, about 15% to about 90% by weight, about 15% to about 95% by weight, about 25% to about 25% by weight, about 25% to about 30% by weight, about 25% to about 35% by weight, about 25% to about 40% by weight, about 25% to about 45% by weight, about 25% to about 50% by weight, about 25% to about 55% by weight, about 25% to about 60% by weight, about 25% to about 65% by weight, about 25% to about 70% by weight, about 25% to about 75% by weight, about 25% to about 80% by weight, about 25% to about 85% by weight, about 25% to about 90% by weight, about 25% to about 95% by weight, about 25% to about 30% by weight, about 25% to about 35% by weight, about 25% to about 40% by weight, about 25% to about 45% by weight, about 25% to about 50% by weight, about 25% to about 55% by weight, about 25% to about 60% by weight, about 25% to about 65% by weight, about 25% to about 70% by weight, about 25% to about 75% by weight, about 25% to about 80% by weight, about 25% to about 85% by weight, about 25% to about 90% by weight, about 25% to about 95% by weight, about 30% to about 35% by weight, about 30% to about 40% by weight, about 30% to about 45% by weight, about 30% to about 50% by weight, about 30% to about 55% by weight, about 30% to about 60% by weight, about 30% to about 65% by weight, about 30% to about 70% by weight, about 30% to about 75% by weight, about 30% to about 80% by weight, about 30% to about 85% by weight, about 30% to about 90% by weight, about 30% to about 95% by weight, about 35% to about 40% by weight, about 35% to about 45% by weight, about 35% to about 50% by weight, about 35% to about 55% by weight, about 35% to about 60% by weight, about 35% to about 65% by weight, about 35% to about 70% by weight, about 35% to about 75% by weight, about 35% to about 80% by weight, about 35% to about 85% by weight, about 35% to about 90% by weight, about 35% to about 95% by weight, about 40% to about 45% by weight, about 40% to about 50% by weight, about 40% to about 55% by weight, about 40% to about 60% by weight, about 40% to about 65% by weight, about 40% to about 70% by weight, about 40% to about 75% by weight, about 40% to about 80% by weight, about 40% to about 85% by weight, about 40% to about 90% by weight, about 40% to about 95% by weight, about 45% to about 50% by weight, about 45% to about 55% by weight, about 45% to about 60% by weight, about 45% to about 65% by weight, about 45% to about 70% by weight, about 45% to about 75% by weight, about 45% to about 80% by weight, about 45% to about 85% by weight, about 45% to about 90% by weight, about 45% to about 95% by weight, about 50% to about 55% by weight, about 50% to about 60% by weight, about 50% to about 65% by weight, about 50% to about 70% by weight, about 50% to about 75% by weight, about 50% to about 80% by weight, about 50% to about 85% by weight, about 50% to about 90% by weight, about 50% to about 95% by weight, about 55% to about 60% by weight, about 55% to about 65% by weight, about 55% to about 70% by weight, about 55% to about 75% by weight, about 55% to about 80% by weight, about 55% to about 85% by weight, about 55% to about 90% by weight, about 55% to about 95% by weight, about 60% to about 65% by weight, about 60% to about 70% by weight, about 60% to about 75% by weight, about 60% to about 80% by weight, about 60% to about 85% by weight, about 60% to about 90% by weight, about 60% to about 95% by weight, about 65% to about 70% by weight, about 65% to about 75% by weight, about 65% to about 80% by weight, about 65% to about 85% by weight, about 65% to about 90% by weight, about 65% to about 95% by weight, about 70% to about 75% by weight, about 70% to about 80% by weight, about 70% to about 85% by weight, about 70% to about 90% by weight, about 70% to about 95% by weight, about 75% to about 80% by weight, about 75% to about 85% by weight, about 75% to about 90% by weight, about 75% to about 95% by weight, about 80% to about 85% by weight, about 80% to about 90% by weight, about 80% to about 95% by weight, about 85% to about 90% by weight, about 85% to about 95% by weight or about 90% to about 95% by weight.

Aspects of the present specification disclose, in part, a surfactant. Surfactants are compounds that lower the surface tension of a liquid, allowing easier spreading, and lowering of the interfacial tension between two liquids, or between a liquid and a solid. Either a single surfactant may be mixed with the buffered solution disclosed herein, or a plurality of surfactants may be mixed with the buffered solution disclosed herein. Useful surfactants, include, without limitation, ionic surfactants, zwitterionic (amphoteric) surfactants, non-ionic surfactants, or any combination therein. The surfactant used in a method disclosed herein can be varied as appropriate by one skilled in the art and generally depends, in part, on the particular buffer being used, the protein being eluted, and the conductivity values being employed.

Ionic surfactants include anionic surfactants. Anionic surfactants include ones based on permanent functional groups attached to the head, such as, e.g., sulfate, sulfonate, phosphate carboxylates) or pH dependent anionic surfactants. Anionic surfactants include, without limitation, alkyl sulfates like ammonium lauryl sulfate and sodium lauryl sulfate (SDS); alkyl ether sulfates like sodium laureth sulfate and sodium myreth sulfate; docusates like dioctyl sodium sulfosuccinate; sulfonate fluorosurfactants like perfluorooctanesulfonate (PFOS) and perfluorobutanesulfonate; alkyldiphenyloxide Disulfonates like DOWFAX™ 2A1 (Disodium Lauryl Phenyl Ether Disulfonate), DOWFAX™ 3B2 (Disodium Decyl Phenyl Ether Disulfonate), DOWFAX™ C10L (Disodium Decyl Phenyl Ether Disulfonate), DOWFAX™ 2EP, and DOWFAX™ 8390 (Disodium Cetyl Phenyl Ether Disulfonate); potassium phosphate polyether esters like TRITON™ H-55 and TRITON™ H-66; alkyl benzene sulfonates; alkyl aryl ether phosphates; alkyl ether phosphates; alkyl carboxylates like fatty acid salts and sodium stearate; sodium lauroyl sarcosinate; carboxylate fluorosurfactants like perfluorononanoate and perfluorooctanoate; and Sodium Hexyldiphenyl Ether Sulfonate (DOWFAX™ C6L).

Ionic surfactants also include cationic surfactants. Cationic surfactants include ones based on permanent or pH dependent cationic surfactants, such as, e.g., primary, secondary or tertiary amines. Cationic surfactants include, without limitation, alkyltrimethylammonium salts like cetyl trimethylammonium bromide (CTAB) and cetyl trimethylammonium chloride (CTAC); cetylpyridinium chloride (CPC); polyethoxylated tallow amine (POEA); benzalkonium chloride (BAC); benzethonium chloride (BZT); 5-Bromo-5-nitro-1,3-dioxane; dimethyldioctadecylammonium chloride; and dioctadecyldimethylammonium bromide (DODAB), as well as pH-dependent primary, secondary or tertiary amines like surfactants where the primary amines become positively charged at pH greater than 10, or the secondary amines become charged at pH less than 4, like octenidine dihydrochloride. Other useful anionic surfactants include bio-based anionic surfactants, including, without limitation, STEPONOL® AM 30-KE, an ammonium lauryl sulfate, and STEPONOL® EHS, a sodium 2-ethyl hexyl sulfate. Such bio-based surfactants are not synthetic molecules, but instead are anionic biosurfactants derived from organic matter such as plants.

Zwitterionic surfactants are based on primary, secondary or tertiary amines or quaternary ammonium cation with a sulfonate, a carboxylate, or a phosphate. Zwitterionic surfactants include, without limitation, 3-[(3-Cholamidopropyl)dimethylammonio]-1-propanesulfonate (CHAPS); sultaines like cocamidopropyl hydroxysultaine; betaines like cocamidopropyl betaine; or lecithins.

Non-ionic surfactants are less denaturing and as such are useful to solubilize membrane proteins and lipids while retaining protein-protein interactions. Nonionic surfactant include polyether nonionic surfactants, polyhydroxyl nonionic surfactants and biosurfactants. Nonionic surfactant include alcohol ethoxylates, alkylphenol ethoxylates, phenol ethoxylates, amide ethoxylates, glyceride ethoxylates, fatty acid ethoxylates, and fatty amine ethoxylates. A nonionic surfactant disclosed herein may have the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group. In aspects of this embodiment, $R^1$ is a $C_7$-$C_{10}$ alkyl group and/or $R^2$ is a $C_{12}$-$C_{20}$ aliphatic group. Other useful nonionic surfactants include bio-based non-ionic surfactants, including, without limitation, STEPOSOL® MET-10U, a metathesis-derived, nonionic surfactant that is an unsaturated, short chain amide. Such bio-based surfactants are not synthetic molecules, but instead are non-ionic biosurfactants derived from organic matter such as plants.

Non-limiting examples of surfactants include polyoxyethylene glycol sorbitan alkyl esters (or ethoxylated sorbital esters) like polysorbate 20 sorbitan monooleate (TWEEN® 20), polysorbate 40 sorbitan monooleate (TWEEN® 40), polysorbate 60 sorbitan monooleate (TWEEN® 60), polysorbate 61 sorbitan monooleate (TWEEN® 61), polysorbate 65 sorbitan monooleate (TWEEN® 65), polysorbate 80 sorbitan monooleate (TWEEN® 80), polysorbate 81 sorbitan monooleate (TWEEN® 81) and polysorbate 85 sorbitan monooleate (TWEEN® 85); sorbital esters like sorbitan monooleate, sorbitan monolaurate, sorbitan monopalmitate, sorbitan monostearate and sorbitan tristearate; polyglycerol esters like glycerol monooleate, glycerol monolaurate, glycerol monopalmitate, glycerol monostearate, glycerol trioleate, glycerol ricinoleate, glycerol tristearate, mono diglycerides and glycerol triacetate; ethoxylated polyglycerol esters; alkyl glucosides like arachidyl glucoside, $C_{12-20}$ alkyl glucoside, caprylyl/capryl glucoside, cetearyl glucoside, coco-glucoside, ethyl glucoside and lauryl glucoside. decyl glucoside; ethoxylated alkyl glucosides; sucrose esters like sucrose monooleate, sucrose monolaurate, sucrose monopalmitate, sucrose monostearate, sucrose trioleate, sucrose ricinoleate, sucrose tristearate, sucrose diglycerides and sucrose triacetate; ethoxylated sucrose ester; amine oxides; ethoxylated alcohols; ethoxylated aliphatic alcohols; alkylamines; ethoxylated alkylamines; ethoxylated alkyl phenols like ethoxylated nonyl phenol and ethoxylated octyl phenol; alkyl polysaccharides; ethoxylated alkyl polysaccharides; ethoxylated fatty acids like ethoxylated castor oil; ethoxylated fatty alcohols like ethoxylated ceto-oleyl alcohol, ethoxylated ceto-stearyl alcohol, ethoxylated decyl alcohol, ethoxylated dodecyl alcohol and ethoxylated tridecyl alcohol; ethoxylated fatty amines; poloxamers (polyethylene-polypropylene copolymers), like Poloxamer 124 (PLURONIC® L44), Poloxamer 181 (PLURONIC® L61), Poloxamer 182 (PLURONIC® L62), Poloxamer 184 (PLURONIC® L64), Poloxamer 188 (PLURONIC® F68), Poloxamer 237 (PLURONIC® F87), Poloxamer 338 (PLURONIC® L108), and Poloxamer 407 (PLURONIC® F127); linear secondary alcohol ethoxylates like TERGITOL™ 15-S-5, TERGITOL™ 15-S-7, TERGITOL™ 15-S-9, TERGITOL™ 15-S-12, TERGITOL™ 15-S-15, TERGITOL™ 15-S-20, TERGITOL™ 15-S-30 and TERGITOL™ 15-S-40; alkyl phenol polyglycol ethers; polyethylene glycol alkyl aryl ethers; polyoxyethylene glycol alkyl ethers, like octaethylene glycol monododecyl ether, pentaethylene glycol monododecyl ether, BRIJ® 30, and BRIJ® 35; 2-dodecoxyethanol (LUBROL®-PX); polyoxyethylene glycol octylphenol ethers like polyoxyethylene (4-5) p-t-octyl phenol (TRITON® X-45) and polyoxyethylene octyl phenyl ether (TRITON® X-100); polyoxyethylene glycol alkylphenol ethers like Nonoxynol-9; phenoxypolyethoxylethanols like nonylphenoxypolyethoxylethanol and octylphenoxypolyethoxylethanol (IGEPAL® CA-630 or NONIDET™ P-40); glucoside alkyl ethers like octyl glucopyranoside; maltoside alkyl ethers like dodecyl maltopyranoside; thioglucoside alkyl ethers like heptyl thioglucopyranoside; digitonins; glycerol alkyl esters like glyceryl laurate; alkyl aryl polyether sulfates; alcohol sulfonates; sorbitan alkyl esters; cocamide ethanolamines like cocamide monoethanolamine and cocamide diethanolamine; sucrose monolaurate; dodecyl dimethylamine oxide, and sodium cholate. Other non-limiting examples of surfactants useful in the methods disclosed herein can be found in, e.g., Winslow, et al., *Methods and Compositions for Simultaneously Isolating Hemoglobin from Red Blood Cells and Inactivating Viruses*, U.S. 2008/0138790; Pharmaceutical Dosage Forms and Drug Delivery Systems (Howard C. Ansel et al., eds., Lippincott Williams & Wilkins Publishers, 7th ed. 1999); Remington: The Science and Practice of Pharmacy (Alfonso R. Gennaro ed., Lippincott, Williams & Wilkins, 20th ed. 2000); Goodman & Gilman's The Pharmacological Basis of Therapeutics (Joel G. Hardman et al., eds., McGraw-Hill Professional, 10th ed. 2001); and Handbook of Pharmaceutical Excipients (Raymond C. Rowe et al., APhA Publications, 4th edition 2003), each of which is hereby incorporated by reference in its entirety.

Non-ionic surfactants act synergistically to enhance the action of the fermentated microbial supernatant. In addition, it has been established that the non-ionic surfactants used in a plant agent composition disclosed herein are compatible with enhance chemical reactions. Thus, in an embodiment, a plant agent composition disclosed herein contains only one or more nonionic surfactants. In another embodiment, a plant agent composition disclosed herein contains only one or more nonionic surfactants and one or more anionic surfactants. In another embodiment, a plant agent composition disclosed herein does not contain any cationic surfactants. In another embodiment, a plant agent composition disclosed herein does not contain any cationic surfactants or zwitterionic surfactants. In another embodiment, a plant agent composition disclosed herein does not contain any ionic surfactants. In another embodiment, a plant agent composition disclosed herein does not contain any ionic surfactants or zwitterionic surfactants.

Any amount of surfactant disclosed herein may be used, with the proviso that the amount is useful to practice the methods disclosed herein. In aspects of this embodiment, the amount of surfactant used is, e.g., about 0.01% by weight, about 0.05% by weight, about 0.075% by weight, about 0.1% by weight, about 0.2% by weight, about 0.3% by weight, about 0.4% by weight, about 0.5% by weight, about 0.6% by weight, about 0.7% by weight, about 0.8% by weight, about 0.9% by weight, about 1.0% by weight, about 1.5% by weight, about 2.0% by weight, about 2.5% by weight, about 3.0% by weight, about 4.0% by weight, about 5.0% by weight, about 6.0% by weight, about 7.0% by weight, about 7.5% by weight, about 8.0% by weight, about 9.0% by weight or about 10.0% by weight. In other aspects of this embodiment, the amount of surfactant used is, e.g., at least 0.01% by weight, at least 0.05% by weight, at least 0.075% by weight, at least 0.1% by weight, at least 0.25% by weight, at least 0.5% by weight, at least 0.75% by weight, at least 1.0% by weight, at least 1.5% by weight, at least 2.0% by weight, at least 2.5% by weight, at least 3.0% by weight, at least 4.0% by weight, at least 5.0% by weight, at least 6.0% by weight, at least 7.0% by weight, at least 7.5% by weight, at least 8.0% by weight, at least 9.0% by weight, or at least 10.0% by weight. In yet other aspects of this embodiment, the amount of surfactant used is, e.g., at most 0.01% by weight, at most 0.05% by weight, at most 0.075% by weight, at most 0.1% by weight, at most 0.25% by weight, at most 0.5% by weight, at most 0.75% by weight, at most 1.0% by weight, at most 1.5% by weight, at most 2.0% by weight, at most 2.5% by weight, at most 3.0% by weight, at most 4.0% by weight, at most 5.0% by weight, at most 6.0% by weight, at most 7.5% by weight, at most 8.0% by weight, at most 9.0% by weight or at most 10.0% by weight.

In still other aspects of this embodiment, the amount of surfactant used is between, e.g., about 0.1% by weight to about 0.5% by weight, about 0.1% by weight to about 0.75% by weight, about 0.1% by weight to about 1.0% by weight, about 0.1% by weight to about 1.5% by weight, about 0.1% by weight to about 2.0% by weight, about 0.1% by weight to about 2.5% by weight, about 0.2% by weight to about 0.5% by weight, about 0.2% by weight to about 0.75% by weight, about 0.2% by weight to about 1.0% by weight, about 0.2% by weight to about 1.5% by weight, about 0.2% by weight to about 2.0% by weight, about 0.2% by weight to about 2.5% by weight, about 0.5% by weight to about 1.0% by weight, about 0.5% by weight to about 1.5% by weight, about 0.5% by weight to about 2.0% by weight, about 0.5% by weight to about 2.5% by weight, about 0.5% by weight to about 3.0% by weight, about 0.5% by weight to about 4.0% by weight, about 0.5% by weight to about 5.0% by weight, about 1.0% by weight to about 2.5% by weight, about 1.0% by weight to about 3.0% by weight, about 1.0% by weight to about 4.0% by weight, about 1.0% by weight to about 5.0% by weight, about 1.0% by weight to about 6.0% by weight, about 1.0% by weight to about 7.0% by weight, about 1.0% by weight to about 7.5% by weight, about 1.0% by weight to about 8.0% by weight, about 1.0% by weight to about 9.0% by weight, about 1.0% by weight to about 10.0% by weight, about 2.0% by weight to about 2.5% by weight, about 2.0% by weight to about 3.0% by weight, about 2.0% by weight to about 4.0% by weight, about 2.0% by weight to about 5.0% by weight, about 2.0% by weight to about 6.0% by weight, about 2.0% by weight to about 7.0% by weight, about 2.0% by weight to about 7.5% by weight, about 2.0% by weight to about 8.0% by weight, about 2.0% by weight to about 9.0% by weight, about 2.0% by weight to about 10.0% by weight, about 5.0% by weight to about 6.0% by weight, about 5.0% by weight to about 7.0% by weight, about 5.0% by weight to about 7.5% by weight, about 5.0% by weight to about 8.0% by weight, about 5.0% by weight to about 9.0% by weight, about 5.0% by weight to about 10.0% by weight, about 5.0% by weight to about 11.0% by weight, about 5.0% by weight to about 12.0% by weight, about 5.0% by weight to about 13.0% by weight, about 5.0% by weight to about 14.0% by weight or about 5.0% by weight to about 15.0% by weight.

Aspects of the present specification disclose, in part, a pH of a plant agent composition disclosed herein. The final pH of a plant agent composition is typically acidic as this contributes to a longer shelf-life of the composition. In aspects of this embodiment, the pH of a plant agent composition disclosed herein is, e.g., about 2, about 2.5, about 3, about 3.5, about 4, about 4.5, about 5, about 5.5 or about 6. In other aspects of this embodiment, the pH of a plant agent composition disclosed herein is, e.g., at least 2, at least 2.5, at least 3, at least 3.5, at least 4, at least 4.5, at least 5, at least 5.5 or at least 6. In yet other aspects of this embodiment, the pH of a plant agent composition disclosed herein is, e.g., at most 2, at most 2.5, at most 3, at most 3.5, at most 4, at most 4.5, at most 5, at most 5.5 or at most 6. In still other aspects of this embodiment, the pH of a plant agent composition disclosed herein is between, e.g., about 2 to about 3, about 2 to about 3.5, about 2 to about 4, about 2 to about 4.5, about 2 to about 5, about 2 to about 5.5, about 2 to about 6, about 2.5 to about 3, about 2.5 to about 3.5, about 2.5 to about 4, about 2.5 to about 4.5, about 2.5 to about 5, about 2.5 to about 5.5, about 2.5 to about 6, about 3 to about 3.5, about 3 to about 4, about 3 to about 4.2, about 3 to about 4.5, about 3 to about 4.7, about 3 to about 5, about 3 to about 5.2, about 3 to about 5.5, about 3 to about 6, about 3.5 to about 4, about 3.5 to about 4.2, about 3.5 to about 4.5, about 3.5 to about 4.7, about 3.5 to about 5, about 3.5 to about 5.2, about 3.5 to about 5.5, about 3.5 to about 6, about 3.7 to about 4.0, about 3.7 to about 4.2, about 3.7 to about 4.5, about 3.7 to about 5.2, about 3.7 to about 5.5 or about 3.7 to about 6.0.

A plant agent composition disclosed herein has minimal adverse effects on humans, mammals including domestic animals, plant life and the environment. In an aspect of this embodiment, a plant agent composition disclosed herein is substantially non-toxic to humans, mammals, plants and the environment. In other aspects of this embodiment, a plant agent composition disclosed herein is essentially non-toxic to humans, mammals, plants and the environment.

Aspects of the present specification disclose, in part, a plant agent composition that is biodegradable. A biodegradable plant agent composition disclosed herein is one that is prone to degrading, eroding, resorbing, decomposing, or breaking down to a substantial or significant degree once applied according to the methods and uses disclosed herein. In aspects of this embodiment, at least 75%, at least 80%, at least 85%, at least 90%, at least 95%, at least 99% of a plant agent composition disclosed herein biodegrades in, e.g., about 1 day, about 2 days, about 3 days, about 4 days, about 5 days, about 6 days or about 7 days. In other aspects of this embodiment, at least 75%, at least 80%, at least 85%, at least 90%, at least 95%, at least 99% of a plant agent composition disclosed herein biodegrades in, e.g., about 1 to about 2 days, about 1 to about 3 days, about 1 to about 4 days, about 1 to about 5 days, about 1 to about 6 days, about 1 to about 7 days, about 2 to about 3 days, about 2 to about 4 days, about 2 to about 5 days, about 2 to about 6 days, about 2 to about 7 days, about 3 to about 4 days, about 3 to about 5 days, about 3 to about 6 days, about 3 to about 7 days, about 4 to about 5 days, about 4 to about 6 days, about 4 to about 7 days, about 5 to about 6 days, about 5 to about 7 days or about 6 to about 7 days.

In aspects of this embodiment, at least 75%, at least 80%, at least 85%, at least 90%, at least 95%, at least 99% of a plant agent composition disclosed herein biodegrades in, e.g., about 7 day, about 8 days, about 9 days, about 10 days, about 11 days, about 12 days, about 13 days or about 14 days. In other aspects of this embodiment, at least 75%, at least 80%, at least 85%, at least 90%, at least 95%, at least 99% of a plant agent composition disclosed herein biodegrades in, e.g., about 7 to about 8 days, about 7 to about 9 days, about 7 to about 10 days, about 7 to about 11 days, about 7 to about 12 days, about 7 to about 13 days, about 7 to about 14 days, about 8 to about 9 days, about 8 to about 10 days, about 8 to about 11 days, about 8 to about 12 days, about 8 to about 13 days, about 8 to about 14 days, about 9 to about 10 days, about 9 to about 11 days, about 9 to about 12 days, about 9 to about 13 days, about 9 to about 14 days, about 9 to about 11 days, about 9 to about 12 days, about 9 to about 13 days, about 9 to about 14 days, about 10 to about 11 days, about 10 to about 12 days, about 10 to about 13 days, about 10 to about 14 days, about 11 to about 12 days, about 11 to about 13 days, about 11 to about 14 days, about 12 to about 13 days, about 12 to about 14 days or about 13 to about 14 days.

In aspects of this embodiment, at least 75%, at least 80%, at least 85%, at least 90%, at least 95%, at least 99% of a plant agent composition disclosed herein biodegrades in, e.g., about 15 day, about 16 days, about 17 days, about 18 days, about 19 days, about 20 days or about 21 days. In other aspects of this embodiment, at least 75%, at least 80%, at least 85%, at least 90%, at least 95%, at least 99% of a plant agent composition disclosed herein biodegrades in, e.g., about 15 to about 16 days, about 15 to about 17 days, about 15 to about 18 days, about 15 to about 19 days, about 15 to about 20 days, about 15 to about 21 days, about 16 to about 17 days, about 16 to about 18 days, about 16 to about 19 days, about 16 to about 20 days, about 16 to about 21 days, about 17 to about 18 days, about 17 to about 19 days, about 17 to about 20 days, about 17 to about 21 days, about 18 to about 19 days, about 18 to about 20 days, about 18 to about 21 days, about 19 to about 20 days, about 19 to about 21 days or about 20 to about 21 days.

Aspects of the present specification disclose, in part, kits comprising one or more components useful to practice a method or use disclosed herein. Kits provide a convenient enclosure of components useful to practice a method or use disclosed herein to facilitate or enhance a commercial sale. For example, a kit may comprises a plant agent composition disclosed herein and one or more other reagents useful to practice a method or use disclosed herein, such as, e.g., one or more dilutants and/or one or more carriers.

Kits typically provide a suitable container, e.g., a box or other enclosed carrier that contain the one or more components useful to practice a method or use disclosed herein. In addition, kits disclosed herein will typically include separate containers, e.g., a bottle, a vial, a flask or other enclosed carrier that contains the one or more components. For example, a container for a plant agent composition disclosed herein, and a separate container for the one or more other reagents included in the kit. Kits can be portable, for example, able to be transported and used in remote areas such as commercial or industrial installations or agricultural fields. Other kits may be of use in a residential building.

A kit disclosed herein may include labels or inserts. Labels or inserts include "printed matter" that can be provided as separate material, a packing material (e.g., a box), or attached or affixed to a container containing a kit component. Labels or inserts can additionally include a computer readable medium, such as a disk (e.g., hard disk, flash memory), optical disk such as CD- or DVD-ROM/RAM, DVD, MP3, magnetic tape, or an electrical storage media such as RAM and ROM or hybrids of these such as magnetic/optical storage media, FLASH media or memory type cards. Labels or inserts may include identifying information of one or more components therein, dose amounts, does frequency or timing, information on the individual components. Labels or inserts can include information identifying manufacturer information, lot numbers, manufacturer location and date. Labels or inserts can include information on a condition or situation for which a kit component may be used. Labels or inserts can include instructions for using one or more of the kit components in a method, or use as disclosed herein. Instructions can include dosage amounts, frequency or duration, and instructions for practicing any of the methods or uses, or treatment protocols described herein as well as warnings on potential hazards or situations where it would not be appropriate to use the components of the kit.

Aspects of the present specification disclose, in part, a method of controlling a causal agent of a plant disease. A disclosed method of controlling a causal agent of a plant disease includes a step of applying an effective amount of a plant agent composition disclosed herein to one or more plants infested with a causal agent and/or applying an effective amount of a plant agent composition disclosed herein to one or more locations in a manner where a causal agent will be exposed to a plant agent composition. Application of a plant agent composition disclosed herein results in e.g., an adverse effect on the causal agent of a plant disease sought to be controlled.

Aspects of the present specification disclose, in part, use of a plant agent composition disclosed herein for controlling a causal agent of a plant disease. A disclosed use of a plant agent composition includes applying an effective amount of a plant agent composition disclosed herein to one or more plants infested with a causal agent and/or applying an effective amount of a plant agent composition disclosed herein to one or more locations in a manner where a causal agent will be exposed to a plant agent composition. Application of a plant agent composition disclosed herein results in e.g., an adverse effect on the causal agent of a plant disease sought to be controlled.

Aspects of the present specification disclose, in part, a method of increasing plant growth and/or crop production. A disclosed method of increasing plant growth and/or crop production includes a step of applying an effective amount of a plant agent composition disclosed herein to one or more plants and/or applying an effective amount of a plant agent composition disclosed herein to one or more locations in a manner where the one or more plants will be exposed to a plant agent composition. Application of a plant agent composition disclosed herein results in e.g., improved absorption by root hairs, improve xylem sap flow through xylem and improve photosynthate flow in phloem, increased uptake of water, minerals and other nutrients from the soil, increase the capillary action and/or hydrostatic pressure in xylem, and/or increase synthesis of compounds and energy and/or disruption of one or more components blocking xylem sap flow and/or photosynthate flow. In an embodiment, one or more components blocking xylem sap flow and/or photosynthate flow includes biofilm.

Aspects of the present specification disclose, in part, use of a plant agent composition disclosed herein for increasing plant growth and/or crop production. A disclosed use of a plant agent composition includes applying an effective amount of a plant agent composition disclosed herein to one or more plants and/or applying an effective amount of a plant agent composition disclosed herein to one or more locations where a plant agent composition will be exposed to the one or more plants. Application of a plant agent composition disclosed herein results in e.g., improved absorption by root hairs, improve xylem sap flow through xylem and improve photosynthate flow in phloem, increased uptake of water, minerals and other nutrients from the soil, increase the capillary action and/or hydrostatic pressure in xylem, and/or increase synthesis of compounds and energy and/or disruption of one or more components blocking xylem sap flow and/or photosynthate flow. In an embodiment, one or more components blocking xylem sap flow and/or photosynthate flow includes biofilm.

Aspects of the present specification disclose, in part, a method of maintaining or improving the efficiency of an irrigation system. A disclosed method of maintaining or improving the efficiency of an irrigation system includes a step of applying an effective amount of a plant agent composition disclosed herein to one or more pipes in a pipeline network of the irrigation system. Application of a plant agent composition disclosed herein results in e.g., adequate removal of one or more components blocking one or more pipeline networks of an irrigation system. In an embodiment, one or more components blocking one or more pipeline networks includes biofilm.

Aspects of the present specification disclose, in part, use of a plant agent composition disclosed herein for maintaining or improving the efficiency of an irrigation system. A disclosed use of a plant agent composition includes applying an effective amount of a plant agent composition disclosed herein to one or more pipes in a pipeline network of the irrigation system. Application of a plant agent composition disclosed herein results in e.g., adequate removal of one or more components blocking one or more pipeline networks of an irrigation system. In an embodiment, one or more components blocking one or more pipeline networks includes biofilm.

The combination of the nonionic surfactant and the treated fermented microbial supernatant in a plant agent composition disclosed herein results in an accelerated in situ chemical reactions of the molecular structures, particularly chemical bonds present in polysaccharide and lipid-based components, of 1) the one or more components present in the protective structure of a causal agent of a plant disease; 2) the one or more components blocking xylem sap and/or photosynthate flow in a plant; or 3) the one or more components blocking water flow in an irrigation system. These in situ chemical reactions dissolve, disperse, or otherwise disrupt 1) the one or more components of the protective structure of the causal agent, resulting in its death through disruption of one or more essential physiological processes; 2) the one or more components that block xylem sap flow in xylem and/or photosynthate flow in phloem, resulting in improved transport of water and nutrients that will maintain and/or enhance the health and vigor of plants; or 3) the one or more components that disrupt water flow in a pipeline network of an irrigation system, resulting in improved water distribution that will maintain and/or enhance the health and vigor of plants.

Without wishing to be limited by any theory, upon application of a plant agent composition in an aqueous environment, highly reactive, uniquely structured, ultra-fine microbubbles are spontaneously formed. These "functionalized" microbubbles comprise an outer "highly reactive" shell composed of one or more nonionic surfactants and components from the treated fermented microbial supernatant and an inner core containing air. The "highly reactive" shell enables a dramatic increase in the mass transfer of oxygen in an aqueous environment and an accelerated bio-catalysis of the molecular structures of compounds, which in combination provide a synergistic functionality. With respect to mass transfer of oxygen, this functionality increases transfer rates of oxygen and raises the level of dissolved oxygen in an aqueous environment which far exceeding the solubility limits anticipated by Henry's Law, and, are at levels that simply cannot be achieved through mechanical aeration systems. It appears that components from the treated fermented microbial supernatant interfere with the ability of the nonionic surfactants to create a well-organized micellar shell. The result is a loose molecular packing of these fermentation components and surfactants that "functionalized" the shell to be more gas permeable, thereby creating more favorable conditions for mass gas transfer. As such, this oxygen transfer function increases the availability of oxygen in an aqueous environment. With respect to accelerated bio-catalysis, this functionality lowers the transition of energy required for a catalytic reaction to occur by providing a reaction platform that increases localized concentrations of reactants, enables donation of electrons and facilitate chemical reactions at electron poor sites. As such, this bio-catalysis function mediates cleavage of chemical bonds, including glycosidic and ester bonds, present in a compound. As such, the "functionalized" shell of the microbubbles have catalytic activities that like conventional enzyme systems, but without the need of any enzymes. Thus, application of a plant agent composition disclosed herein creates "functionalized: microbubbles that increase oxygen dispersion resulting in higher dissolved oxygen levels and accelerate molecular interactions resulting in catalytic breakdown of compounds.

When in contact with a protective structure of a causal agent, the "functionalized" microbubbles chemically interacts with one or more components of the protective structure in a manner that enables donation of electrons or reactions at electron poor sites that mediates cleavage of chemical bonds, including glycosidic and ester bonds, present in the one or more components. Similarly, when in contact with one or more components blocking xylem sap and/or photosynthate flow in a plant, the "functionalized" microbubbles chemically interacts with one or more components in a manner that enables donation of electrons or reactions at electron poor sites that mediates cleavage of chemical bonds, including glycosidic and ester bonds, present in the one or more components. Likewise, when in contact with one or more components blocking water flow in an irrigation system, the "functionalized" microbubbles chemically interacts with one or more components in a manner that enables donation of electrons or reactions at electron poor sites that mediates cleavage of chemical bonds, including glycosidic and ester bonds, present in the one or more components. These interactions appear to be a form of hydrolysis using beta-oxidation where, in addition to relying on the "highly reactive" shell, oxygen present in the core of the microbubble is also utilized. Thus, the properties present in the "functionalized" microbubbles works synergistically with the oxygen transfer capabilities of the core to enhance the in situ breaking of chemical bonds, including glycosidic and ester bonds present in 1) the one or more components present in the protective structure of a causal agent of a plant disease; 2) the one or more components blocking xylem sap and/or photosynthate flow in a plant; and/or 3) the one or more components blocking water flow in an irrigation system.

In addition, when in contact with root hairs, "functionalized" microbubbles increase water absorption, increase nitrogen-fixation, increase gas exchange, increase capillary action and hydrostatic pressure in vascular tissue by making the membranes of the root hairs more permeable to water transfer and providing a better microbial environment for symbiotic organisms that enhance root hair function. Such interactions improve absorption by root hairs, improve xylem sap flow through xylem and improve photosynthate flow in phloem, resulting in improved transport of raw materials, growth components and energy that will be used to maintain and/or enhance the health and vigor of plants.

Application of a plant agent composition disclosed herein can be by any method that exposes the one or more components present in the protective structure of a causal agent of a plant disease to the disclosed plant agent compositions in a manner that provides adequate disruption of one or more components of the protective structure and subsequent death through disruption of one or more essential physiological processes. For example, exposure can be by direct application to the causal agent or by indirect application to a location were the causal agent will be exposed to a plant agent composition.

Likewise, application of a plant agent composition disclosed herein can be by any method that exposes the root hairs to the disclosed plant agent compositions in a manner that provides increase uptake of water, minerals and other nutrients from the soil, increase the capillary action and/or hydrostatic pressure in xylem, and/or increase synthesis of compounds and energy and subsequent improvement in root hair absorption, xylem sap flow through xylem and photosynthate flow in phloem. For example, exposure can be by direct application to one or more plants or by indirect application to a location were the one or more plants will be exposed to a plant agent composition.

Similarly, application of a plant agent composition disclosed herein can be by any method that exposes the one or more components that block xylem sap flow in xylem and/or photosynthate flow in phloem to the disclosed plant agent compositions in a manner that provides adequate disruption of one or more components of the protective structure and subsequent improvement of transport of water and nutrients that will maintain and/or enhance the health and vigor of plants. For example, exposure can be by direct application to one or more plants or by indirect application to a location were the one or more plants will be exposed to a plant agent composition.

In addition, application of a plant agent composition disclosed herein can be by any method that exposes the one or more components that disrupt water flow in a pipeline network of an irrigation system to the disclosed plant agent compositions in a manner that provides adequate disruption of one or more components of the protective structure and subsequent improvement of water distribution in the irrigation system that will maintain and/or enhance the health and vigor of plants. For example, exposure can be by direct application to one or more pipeline networks of the irrigation system or by indirect application to a location were the one or more pipeline networks of the irrigation system will be exposed to a plant agent composition.

An undiluted form of a plant agent composition disclosed herein can be used in the methods and uses disclosed herein. Alternatively, it may desirable to dilute a plant agent composition disclosed herein, and those skilled in the art are aware that dilutions of such compositions can be used. Dilution of a plant agent composition disclosed herein is typically done using water, although other appropriate diluents may be used so long as they are compatible with the formation of microbubbles as disclosed herein. In aspects of this embodiment, a plant agent composition is diluted to a ratio of, e.g., 1:10, 1:25, 1:50, 1:75, 1:100, 1:200, 1:300, 1:400, 1:500, 1:600, 1:700, 1:800, 1:900, 1:1000, 1:2000, 1:3000, 1:4000, 1:5000, 1:6000, 1:7000, 1:8000, 1:9000, 1:10000, 1:20000, 1:30000, 1:40000, 1:50000, 1:60000, 1:70000, 1:80000, 1:90000 or 1:100000. In other aspects of this embodiment, a plant agent composition is diluted to a ratio of, e.g., at least 1:10, at least 1:25, at least 1:50, at least 1:75, at least 1:100, at least 1:200, at least 1:300, at least 1:400, at least 1:500, at least 1:600, at least 1:700, at least 1:800, at least 1:900, at least 1:1000, at least 1:2000, at least 1:3000, at least 1:4000, at least 1:5000, at least 1:6000, at least 1:7000, at least 1:8000, at least 1:9000, at least 1:10000, at least 1:20000, at least 1:30000, at least 1:40000, at least 1:50000, at least 1:60000, at least 1:70000, at least 1:80000, at least 1:90000 or at least 1:100000. In yet other aspects of this embodiment, a plant agent composition is diluted to a ratio of, e.g., at most 1:10, at most 1:25, at most 1:50, at most 1:75, at most 1:100, at most 1:200, at most 1:300, at most 1:400, at most 1:500, at most 1:600, at most 1:700, at most 1:800, at most 1:900, at most 1:1000, at most 1:2000, at most 1:3000, at most 1:4000, at most 1:5000, at most 1:6000, at most 1:7000, at most 1:8000, at most 1:9000, at most 1:10000, at most 1:20000, at most 1:30000, at most 1:40000, at most 1:50000, at most 1:60000, at most 1:70000, at most 1:80000, at most 1:90000 or at most 1:100000.

In still other aspects of this embodiment, a plant agent composition is diluted to a ratio of, e.g., about 1:1 to about 1:10, about 1:1 to about 1:25, about 1:1 to about 1:50, about 1:1 to about 1:75, about 1:1 to about 1:100, about 1:2 to about 1:10, about 1:2 to about 1:25, about 1:2 to about 1:50, about 1:2 to about 1:75, about 1:2 to about 1:100, about 1:10 to about 1:25, about 1:10 to about 1:50, about 1:10 to about 1:75, about 1:10 to about 1:100, about 1:10 to about 1:125, about 1:10 to about 1:150, about 1:10 to about 1:175, about 1:10 to about 1:200, about 1:10 to about 1:225, about 1:10 to about 1:250, about 1:50 to about 1:100, about 1:50 to about 1:200, about 1:50 to about 1:300, about 1:50 to about 1:400, about 1:50 to about 1:500, about 1:50 to about 1:600, about 1:50 to about 1:700, about 1:50 to about 1:800, about 1:50 to about 1:900, about 1:50 to about 1:1000, about 1:100 to about 1:200, about 1:100 to about 1:300, about 1:100 to about 1:400, about 1:100 to about 1:500, about 1:100 to about 1:600, about 1:100 to about 1:700, about 1:100 to about 1:800, about 1:100 to about 1:900, about 1:100 to about 1:1000, about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:5000 to about 1:10000, about 1:5000 to about 1:20000, about 1:5000 to about 1:30000, about 1:5000 to about 1:40000, about 1:5000 to about 1:50000, about 1:5000 to about 1:60000, about 1:5000 to about 1:70000, about 1:5000 to about 1:80000, about 1:5000 to about 1:90000, about 1:5000 to about 1:100000, about 1:10000 to about 1:20000, about 1:10000 to about 1:30000, about 1:10000 to about 1:40000, about 1:10000 to about 1:50000, about 1:10000 to about 1:60000, about 1:10000 to about 1:70000, about 1:10000 to about 1:80000, about 1:10000 to about 1:90000, about 1:10000 to about 1:100000.

Application of a plant agent composition disclosed herein is in an effective amount. An effective amount of a disclosed plant agent composition can be 1) an amount sufficient to cause an adverse effect on the population of a causal agent of a plant disease sought to be controlled; 2) an amount sufficient to improve absorption by root hairs, improve xylem sap flow through xylem and improve photosynthate flow in phloem; 3) an amount sufficient to increase uptake of water, minerals and other nutrients from the soil, increase the capillary action and/or hydrostatic pressure in xylem, and/or increase synthesis of compounds and energy; 4) an amount sufficient to cause adequate disruption of one or more components blocking xylem sap and/or photosynthate flow; and/or 5) an amount sufficient to cause adequate removal of one or more components blocking one or more pipeline networks of an irrigation system. The actual effective amount of a disclosed plant agent composition is determined by routine screening procedures employed to evaluate controlling activity and efficacy of a plant agent composition disclosed herein. Such screening procedures are well known by those skilled in the art. It is expected that a plant agent composition disclosed herein having a higher level of activity can be used in smaller amounts and concentrations, while those having a lower level of activity may require larger amounts or concentrations in order to achieve the same controlling effect.

Application of a plant agent composition disclosed herein is in an effective amount. An effective amount of a disclosed plant agent composition can be an amount sufficient to cause there desired effect. The actual effective amount of a disclosed plant agent composition is determined by routine screening procedures employed to evaluate controlling activity and efficacy of a plant agent composition disclosed herein. Such screening procedures are well known by those skilled in the art. It is expected that a plant agent composition disclosed herein having a higher level of activity can be used in smaller amounts and concentrations, while those having a lower level of activity may require larger amounts or concentrations in order to achieve the same controlling effect.

An effective amount of a disclosed plant agent composition can be an amount sufficient to cause an adverse effect to causal agents sought to be controlled. In aspects of this embodiment, an effective amount of a disclosed plant agent composition is an amount sufficient to cause an adverse effect on, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of the causal agents in a population infecting a plant. In other aspects of this embodiment, an effective amount of a disclosed plant agent composition is an amount sufficient to cause an adverse effect on, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of the causal agents in a population infecting a plant. In still other aspects of this embodiment, an effective amount of a disclosed plant agent composition is an amount sufficient to cause an adverse effect on, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of the causal agents in a population infecting a plant. In yet other aspects of this embodiment, an effective amount of a disclosed plant agent composition is an amount sufficient to cause an adverse effect on, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of the causal agents in a population infecting a plant.

In aspects of this embodiment, an effective amount of a disclosed plant agent composition is an amount sufficient to cause mortality on, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of the causal agents in a population infecting a plant. In other aspects of this embodiment, an effective amount of a disclosed plant agent composition is an amount sufficient to cause mortality on, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of the causal agents in a population infecting a plant. In yet other aspects of this embodiment, an effective amount of a disclosed plant agent composition is an amount sufficient to cause mortality on, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of the causal agents in a population infecting a plant. In still other aspects of this embodiment, an effective amount of a disclosed plant agent composition is an amount sufficient to cause mortality on, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of the causal agents in a population infecting a plant.

An effective amount of a disclosed plant agent composition can be an amount sufficient to reduce the size of a population of a causal agent sought to be controlled. In aspects of this embodiment, an effective amount of a disclosed plant agent composition is an amount sufficient to reduce the size of a population of a causal agent sought to be controlled by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to reduce the size of a population of a causal agent sought to be controlled by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In yet other aspects of this embodiment, an effective amount of a disclosed plant agent composition is an amount sufficient to reduce the size of a population of a causal agent sought to be controlled by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In still other aspects of this embodiment, an effective amount of a disclosed plant agent composition is an amount sufficient to reduce the size of the population of a causal agent sought to be controlled by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to deter a population of a causal agent sought to be controlled from entering or infesting one or more locations. In aspects of this embodiment, an effective amount of a disclosed plant agent composition is an amount sufficient to deter, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of a population of a causal agent from entering or infesting one or more locations. In other aspects of this embodiment, an effective amount of a disclosed plant agent composition is an amount sufficient to deter, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of a population of a causal agent from entering or infesting one or more locations. In yet other aspects of this embodiment, an effective amount of a disclosed plant agent composition is an amount sufficient to deter, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of a population of a causal agent from entering or infesting one or more locations. In still other aspects of this embodiment, an effective amount of a disclosed plant agent composition is an amount sufficient to deter, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of a population of a causal agent from entering or infesting one or more locations.

An effective amount of a disclosed plant agent composition can be an amount sufficient to improve absorption of water, minerals and other nutrients from the soil by root hairs. In aspects of this embodiment, an effective amount of a disclosed plant agent composition is an amount sufficient to improve absorption of water, minerals and other nutrients from the soil by root hairs by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to improve absorption of water, minerals and other nutrients from the soil by root hairs by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to improve absorption of water, minerals and other nutrients from the soil by root hairs by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve absorption of water, minerals and other nutrients from the soil by root hairs by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to improve xylem sap flow through xylem. In aspects of this embodiment, an effective amount of a disclosed plant agent composition is an amount sufficient to improve xylem sap flow through xylem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to improve xylem sap flow through xylem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to improve xylem sap flow through xylem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve xylem sap flow through xylem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to improve photosynthate flow in phloem. In aspects of this embodiment, an effective amount of a disclosed plant agent composition is an amount sufficient to improve photosynthate flow in phloem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to improve photosynthate flow in phloem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to improve photosynthate flow in phloem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve photosynthate flow in phloem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to increase uptake of water, minerals and other nutrients from the soil. In aspects of this embodiment, an effective amount of a disclosed plant agent composition is an amount sufficient to increase uptake of water, minerals and other nutrients from the soil by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to increase uptake of water, minerals and other nutrients from the soil by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to increase uptake of water, minerals and other nutrients from the soil by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to increase uptake of water, minerals and other nutrients from the soil by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to increase capillary action and/or hydrostatic pressure in xylem. In aspects of this embodiment, an effective amount of a disclosed plant agent composition is an amount sufficient to increase capillary action and/or hydrostatic pressure in xylem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to increase capillary action and/or hydrostatic pressure in xylem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to increase capillary action and/or hydrostatic pressure in xylem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to increase capillary action and/or hydrostatic pressure in xylem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to improve the transportation of raw materials through a plant. In aspects of this embodiment, an effective amount of a disclosed plant agent composition is an amount sufficient to improve the transportation of raw materials through a plant by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to improve the transportation of raw materials through a plant by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to improve the transportation of raw materials through a plant by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve the transportation of raw materials through a plant by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to increase synthesis of compounds and energy in a plant. In aspects of this embodiment, an effective amount of a disclosed plant agent composition is an amount sufficient to increase synthesis of compounds and energy in a plant by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient increase synthesis of compounds and energy in a plant by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient increase synthesis of compounds and energy in a plant by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to increase synthesis of compounds and energy in a plant by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to improve the synthesis of compounds and energy needed to sustain and continue plant growth. In aspects of this embodiment, an effective amount of a disclosed plant agent composition is an amount sufficient to improve the synthesis of compounds and energy needed to sustain and continue plant growth by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient improve the synthesis of compounds and energy needed to sustain and continue plant growth by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient improve the synthesis of compounds and energy needed to sustain and continue plant growth by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve the synthesis of compounds and energy needed to sustain and continue plant growth by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to dissolve, disperse, or otherwise remove one or more components that disrupt xylem sap flow in xylem. In aspects of this embodiment, an effective amount of a disclosed plant agent composition is an amount sufficient to dissolve, disperse, or otherwise remove one or more components that disrupt xylem sap flow in xylem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to dissolve, disperse, or otherwise remove one or more components that disrupt xylem sap flow in xylem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to dissolve, disperse, or otherwise remove one or more components that disrupt xylem sap flow in xylem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to dissolve, disperse, or otherwise remove one or more components that disrupt xylem sap flow in xylem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to dissolve, disperse, or otherwise remove one or more components that disrupt photosynthate flow in phloem. In aspects of this embodiment, an effective amount of a disclosed plant agent composition is an amount sufficient to dissolve, disperse, or otherwise remove one or more components that disrupt photosynthate flow in phloem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to dissolve, disperse, or otherwise remove one or more components that disrupt photosynthate flow in phloem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to dissolve, disperse, or otherwise remove one or more components that disrupt photosynthate flow in phloem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to dissolve, disperse, or otherwise remove one or more components that disrupt photosynthate flow in phloem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to dissolve, disperse, or otherwise remove one or more components that disrupt water flow in a pipeline network of an irrigation system. In aspects of this embodiment, an effective amount of a disclosed plant agent composition is an amount sufficient to dissolve, disperse, or otherwise remove one or more components that disrupt water flow in a pipeline network of an irrigation system by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to dissolve, disperse, or otherwise remove one or more components that disrupt water flow in a pipeline network of an irrigation system by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to dissolve, disperse, or otherwise remove one or more components that disrupt water flow in a pipeline network of an irrigation system by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to dissolve, disperse, or otherwise remove one or more components that disrupt water flow in a pipeline network of an irrigation system by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to improve water transport throughout the pipeline network. In aspects of this embodiment, an effective amount of a disclosed plant agent composition is an amount sufficient to improve water transport throughout the pipeline network by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to improve water transport throughout the pipeline network by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to improve water transport throughout the pipeline network by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to improve water transport throughout the pipeline network by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be an amount sufficient to maintain and/or enhance the health and vigor of a plant. In aspects of this embodiment, an effective amount of a disclosed plant agent composition is an amount sufficient to maintain and/or enhance the health and vigor of a plant by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed plant agent composition is an amount sufficient to maintain and/or enhance the health and vigor of a plant by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed plant agent composition is an amount sufficient to maintain and/or enhance the health and vigor of a plant by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed plant agent composition is an amount sufficient to maintain and/or enhance the health and vigor of a plant by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed plant agent composition can be a dilution of a plant agent composition disclosed herein. In aspects of this embodiment, an effective amount of a disclosed plant agent composition is a plant agent composition:dilutant ratio of, e.g., about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575 or about 1:600. In other aspects of this embodiment, an effective amount of a disclosed plant agent composition is a plant agent composition:dilutant ratio of, e.g., at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575 or at least 1:600. In yet other aspects of this embodiment, an effective amount of a disclosed plant agent composition is a plant agent composition:dilutant ratio of, e.g., at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575 or at most 1:600. In other aspects of this embodiment, an effective amount of a disclosed plant agent composition is a plant agent composition:dilutant ratio of, e.g., about 1:50 to about 1:100, about 1:50 to about 1:200, about 1:50 to about 1:300, about 1:50 to about 1:400, about 1:50 to about 1:500, about 1:50 to about 1:600, about 1:100 to about 1:200, about 1:100 to about 1:300, about 1:100 to about 1:400, about 1:100 to about 1:500, about 1:100 to about 1:600, about 1:200 to about 1:300, about 1:200 to about 1:400, about 1:200 to about 1:500, about 1:200 to about 1:600, about 1:300 to about 1:400, about 1:300 to about 1:500, about 1:300 to about 1:600, about 1:400 to about 1:500, about 1:400 to about 1:600 or about 1:500 to about 1:600. These plant agent composition:dilutant ratios are typically concentrations that are an effective amount for the disclosed methods, uses of controlling a causal agent of a plant disease and for the disclosed methods and uses of increasing plant growth and/or crop production and uses of controlling a causal agent of a plant disease and for the disclosed methods and uses of maintaining or improving the efficiency of an irrigation system.

In aspects of this embodiment, an effective amount of a disclosed plant agent composition is a plant agent composition:dilutant ratio of, e.g., about 1:500, about 1:750, about 1:1000, about 1:1250, about 1:1500, about 1:1750, about 1:2000, about 1:2250, about 1:2500, about 1:2750, about 1:3000, about 1:3250, about 1:3500, about 1:3750, about 1:4000, about 1:4250, about 1:4500, about 1:4750, about 1:5000, about 1:5250, about 1:5500, about 1:5750, about 1:6000 about 1:7000, about 1:8000, about 1:9000 or about 1:10000. In other aspects of this embodiment, an effective amount of a disclosed plant agent composition is a plant agent composition:dilutant ratio of, e.g., at least 1:500, at least 1:750, at least 1:1000, at least 1:1250, at least 1:1500, at least 1:1750, at least 1:2000, at least 1:2250, at least 1:2500, at least 1:2750, at least 1:3000, at least 1:3250, at least 1:3500, at least 1:3750, at least 1:4000, at least 1:4250, at least 1:4500, at least 1:4750, at least 1:5000, at least 1:5250, at least 1:5500, at least 1:5750, at least 1:6000, at least 1:7000, at least 1:8000, at least 1:9000 or at least 1:10000. In yet other aspects of this embodiment, an effective amount of a disclosed plant agent composition is a plant agent composition:dilutant ratio of, e.g., at most 1:500, at most 1:750, at most 1:1000, at most 1:1250, at most 1:1500, at most 1:1750, at most 1:2000, at most 1:2250, at most 1:2500, at most 1:2750, at most 1:3000, at most 1:3250, at most 1:3500, at most 1:3750, at most 1:4000, at most 1:4250, at most 1:4500, at most 1:4750, at most 1:5000, at most 1:5250, at most 1:5500, at most 1:5750, at most 1:6000 at most 1:7000, at most 1:8000, at most 1:9000 or at most 1:10000. In other aspects of this embodiment, an effective amount of a disclosed plant agent composition is a plant agent composition:dilutant ratio of, e.g., about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:2000 to about 1:3000, about 1:2000 to about 1:4000, about 1:2000 to about 1:5000, about 1:2000 to about 1:6000, about 1:2000 to about 1:7000, about 1:2000 to about 1:8000, about 1:2000 to about 1:9000, about 1:2000 to about 1:10000, about 1:3000 to about 1:4000, about 1:3000 to about 1:5000, about 1:3000 to about 1:6000, about 1:3000 to about 1:7000, about 1:3000 to about 1:8000, about 1:3000 to about 1:9000, about 1:3000 to about 1:10000, about 1:4000 to about 1:5000, about 1:4000 to about 1:6000, about 1:4000 to about 1:7000, about 1:4000 to about 1:8000, about 1:4000 to about 1:9000, about 1:4000 to about 1:10000, about 1:5000 to about 1:6000, about 1:5000 to about 1:7000, about 1:5000 to about 1:8000, about 1:5000 to about 1:9000, about 1:5000 to about 1:10000, about 1:6000 to about 1:7000, about 1:6000 to about 1:8000, about 1:6000 to about 1:9000, about 1:6000 to about 1:10000, about 1:7000 to about 1:8000, about 1:7000 to about 1:9000, about 1:7000 to about 1:10000, about 1:8000 to about 1:9000, about 1:8000 to about 1:10000 or about 1:9000 to about 1:10000. These plant agent composition:dilutant ratios are typically concentrations that are an effective amount for the disclosed methods, uses of controlling a causal agent of a plant disease and for the disclosed methods and uses of increasing plant growth and/or crop production and uses of controlling a causal agent of a plant disease and for the disclosed methods and uses of maintaining or improving the efficiency of an irrigation system.

In aspects of this embodiment, an effective amount of a disclosed plant agent composition has a final concentration of, e.g., about 0.0001%, about 0.0002%, about 0.0003%, about 0.0004%, about 0.0005%, about 0.0006%, about 0.0007%, about 0.0008%, about 0.0009%, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9% or about 10%. In other aspects of this embodiment, an effective amount of a disclosed plant agent composition has a final concentration of, e.g., at least 0.0001%, at least 0.0002%, at least 0.0003%, at least 0.0004%, at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9% or at least 10%. In yet other aspects of this embodiment, an effective amount of a disclosed plant agent composition has a final concentration of, e.g., at most 0.0001%, at most 0.0002%, at most 0.0003%, at most 0.0004%, at most 0.0005%, at most 0.0006%, at most 0.0007%, at most 0.0008%, at most 0.0009%, at most 0.001%, at most 0.002%, at most 0.003%, at most 0.004%, at most 0.005%, at most 0.006%, at most 0.007%, at most 0.008%, at most 0.009%, at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4%, at most 5%, at most 6%, at most 7%, at most 8%, at most 9% or at most 10%. In still other aspects of this embodiment, an effective amount of a disclosed plant agent composition has a final concentration of, e.g., about 0.0001% to about 0.0005%, about 0.0001% to about 0.001%, about 0.0001% to about 0.005%, about 0.0001% to about 0.01%, about 0.0001% to about 0.05%, about 0.0001% to about 0.1%, about 0.0001% to about 0.5%, about 0.0001% to about 1%, about 0.0001% to about 5%, about 0.0001% to about 10%, about 0.0005% to about 0.001%, about 0.0005% to about 0.005%, about 0.0005% to about 0.01%, about 0.0005% to about 0.05%, about 0.0005% to about 0.1%, about 0.0005% to about 0.5%, about 0.0005% to about 1%, about 0.0005% to about 5%, about 0.0005% to about 10%, about 0.001% to about 0.005%, about 0.001% to about 0.01%, 0.001% to about 0.05%, about 0.001% to about 0.1%, 0.001% to about 0.5%, 0.001% to about 1%, 0.001% to about 5%, about 0.001% to about 10%, about 0.005% to about 0.01%, about 0.005% to about 0.05%, about 0.005% to about 0.1%, about 0.005% to about 0.5%, about 0.005% to about 1%, about 0.005% to about 5%, about 0.005% to about 10%, about 0.01% to about 0.05%, about 0.01% to about 0.1%, about 0.01% to about 0.5%, about 0.01% to about 1%, about 0.01% to about 5%, about 0.01% to about 10%, about 0.05% to about 0.1%, about 0.05% to about 0.5%, about 0.05% to about 1%, about 0.05% to about 5%, about 0.05% to about 10%, about 0.1% to about 0.5%, about 0.1% to about 1%, about 0.1% to about 5%, about 0.1% to about 10%, about 0.5% to about 1%, about 0.5% to about 5%, about 0.5% to about 10%, about 1% to about 5%, about 1% to about 10% or about 5% to about 10%.

The efficacy of a plant agent composition disclosed herein may be monitored by determining the adverse effect, mortality, reduced causal agent population, reduced entering or infestation of one or more locations, or any other assessment of damage to a causal agent population, including, without limitation, inhibition, arrestment, or retardation of causal agent growth, inhibition, arrestment, or retardation of causal agent reproduction or inhibition, arrestment, or retardation of causal agent development, all of which are encompassed by the term "controlling". Efficacy is also monitored by phytotoxicity to a plants that are infested with a causal agent population, tissue damage to the host plant infected with a causal agent population and any adverse effects that might be experienced by a human who is applying a disclosed plant agent composition to an infested plant, or otherwise exposed to a plant agent composition disclosed herein. Accordingly, the amount of a plant agent composition disclosed herein used in the disclosed methods or uses, meets the effective amount criteria above, and preferably has minimal or no adverse effect on ornamental and agricultural plants (such as phytotoxicity), wildlife and humans that may come into contact with such compositions.

Application of a plant agent composition disclosed herein can be achieved by any process that effectively creates microbubbles as disclosed herein and effectively exposes a causal agent sought to be controlled. For example any method that can introduce large concentrations of a gas into a plant agent composition during application is suitable because such gas introduction enables the spontaneous formation of microbubbles. Suitable application processes include, without limitation, spraying, fogging, atomizing, vaporizing, scattering, watering, squirting, sprinkling and the like. One preferred method of application is by a manual or mechanical application by irrigation, spraying, fogging, atomizing or vaporizing. Such applications provide formation of finely divided mist with sufficient aeration during the application process to create microbubbles as disclosed herein. Microbubbles exposed to a dispersion of gas in a liquid show colloidal properties and are referred to as colloidal gas aphrons (CGA). CGA differ from ordinary gas bubbles in that they contain a distinctive shell layer containing a low concentration of a surfactant.

The microbubbles formed with a plant agent composition disclosed herein appear to increase the mass transfer of oxygen in liquids. Without being bound by scientific theory, there are several possible explanations for this difference. First, the surfactants formulated into a plant agent composition disclosed herein include nonionic surfactants and/or biosurfactants which significantly alter the properties of bubble behavior. Second, a plant agent composition disclosed herein requires a much lower concentration of surfactants for microbubble formation. It has been suggested that surfactant concentrations must approach the critical micelles concentration (CMS) of a surfactant system. In a plant agent composition disclosed herein, microbubbles are formed below estimated CMCs for the surfactants used. This suggests that the microbubbles are the result of aggregates of surfactant molecules with a loose molecular packing more favorable to gas mass transfer characteristics. A surface containing fewer surfactant molecules would be more gas permeable than a well-organized micelle containing gas. Regardless of the mechanism, the tendency of a plant agent composition disclosed herein to organizes into clusters, aggregates, or gas-filled bubbles provides a platform for reactions to occur by increasing localized concentrations of reactants, lowering the transition of energy required for a catalytic reaction to occur, or some other mechanism which has not yet been described.

In aspects of this embodiment, a microbubbles disclosed herein have a mean diameter of, e.g., about 5 μm, about 10 μm, about 15 μm, about 20 μm, about 25 μm, about 30 μm, about 40 μm, about 50 μm, about 75 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm or about 1000 μm. In other aspects of this embodiment, a microbubbles disclosed herein have a mean diameter of, e.g., at least 5 μm, at least 10 μm, at least 15 μm, at least 20 μm, at least 25 μm, at least 30 μm, at least 40 μm, at least 50 μm, at least 100 μm, at least 150 μm, at least 200 μm, at least 250 μm, at least 300 μm, at least 350 μm, at least 400 μm, at least 450 μm, at least 500 μm, at least 550 μm, at least 600 μm, at least 650 μm, at least 700 μm, at least 750 μm, at least 800 μm, at least 850 μm, at least 900 μm, at least 950 μm or at least 1000 μm. In other aspects of this embodiment, a microbubbles disclosed herein have a mean diameter of, e.g., at most 5 μm, at most 10 μm, at most 15 μm, at most 20 μm, at most 25 μm, at most 30 μm, at most 40 μm, at most 50 μm, at most 100 μm, at most 150 μm, at most 200 μm, at most 250 μm, at most 300 μm, at most 350 μm, at most 400 μm, at most 450 μm, at most 500 μm, at most 550 μm, at most 600 μm, at most 650 μm, at most 700 μm, at most 750 μm, at most 800 μm, at most 850 μm, at most 900 μm, at most 950 μm or at most 1000 μm.

In aspects of this embodiment, a microbubbles disclosed herein have a mean diameter of, e.g., about 5 μm to about 10 μm, about 5 μm to about 15 μm, about 5 μm to about 20 μm, about 5 μm to about 25 μm, about 5 μm to about 30 μm, about 5 μm to about 40 μm, about 5 μm to about 50 μm, about 5 μm to about 75 μm, about 5 μm to about 100 μm, about 10 μm to about 15 μm, about 10 μm to about 20 μm, about 10 μm to about 25 μm, about 10 μm to about 30 μm, about 10 μm to about 40 μm, about 10 μm to about 50 μm, about 10 μm to about 75 μm, about 10 μm to about 100 μm, about 15 μm to about 20 μm, about 15 μm to about 25 μm, about 15 μm to about 30 μm, about 15 μm to about 40 μm, about 15 μm to about 50 μm, about 15 μm to about 75 μm, about 15 μm to about 100 μm, about 20 μm to about 25 μm, about 20 μm to about 30 μm, about 20 μm to about 40 μm, about 20 μm to about 50 μm, about 20 μm to about 75 μm, about 20 μm to about 100 μm, about 25 μm to about 30 μm, about 25 μm to about 40 μm, about 25 μm to about 50 μm, about 25 μm to about 75 μm, about 25 μm to about 100 μm, about 30 μm to about 40 μm, about 30 μm to about 50 μm, about 30 μm to about 75 μm, about 30 μm to about 100 μm, about 40 μm to about 50 μm, about 40 μm to about 75 μm, about 40 μm to about 100 μm, about 50 μm to about 75 μm, about 50 μm to about 100 μm, about 50 μm to about 150 μm, about 50 μm to about 200 μm, about 50 μm to about 250 μm, about 50 μm to about 300 μm, about 50 μm to about 350 μm, about 50 μm to about 400 μm, about 50 μm to about 450 μm, about 50 μm to about 500 μm, about 50 μm to about 550 μm, about 50 μm to about 600 μm, about 50 μm to about 650 μm, about 50 μm to about 700 μm, about 50 μm to about 750 μm, about 50 μm to about 800 μm, about 50 μm to about 850 μm, about 50 μm to about 900 μm, about 50 μm to about 950 μm, about 50 μm to about 1000 μm, about 100 μm to about 150 μm, about 100 μm to about 200 μm, about 100 μm to about 250 μm, about 100 μm to about 300 μm, about 100 μm to about 350 μm, about 100 μm to about 400 μm, about 100 μm to about 450 μm, about 100 μm to about 500 μm, about 100 μm to about 550 μm, about 100 μm to about 600 μm, about 100 μm to about 650 μm, about 100 μm to about 700 μm, about 100 μm to about 750 μm, about 100 μm to about 800 μm, about 100 μm to about 850 μm, about 100 μm to about 900 μm, about 100 μm to about 950 μm, about 100 μm to about 1000 μm, about 150 μm to about 200 μm, about 150 μm to about 250 μm, about 150 μm to about 300 μm, about 150 μm to about 350 μm, about 150 μm to about 400 μm, about 150 μm to about 450 μm, about 150 μm to about 500 μm, about 150 μm to about 550 μm, about 150 μm to about 600 μm, about 150 μm to about 650 μm, about 150 μm to about 700 μm, about 150 μm to about 750 μm, about 150 μm to about 800 μm, about 150 μm to about 850 μm, about 150 μm to about 900 μm, about 150 μm to about 950 μm, about 150 μm to about 1000 μm, about 200 μm to about 250 μm, about 200 μm to about 300 μm, about 200 μm to about 350 μm, about 200 μm to about 400 μm, about 200 μm to about 450 μm, about 200 μm to about 500 μm, about 200 μm to about 550 μm, about 200 μm to about 600 μm, about 200 μm to about 650 μm, about 200 μm to about 700 μm, about 200 μm to about 750 μm, about 200 μm to about 800 μm, about 200 μm to about 850 μm, about 200 μm to about 900 μm, about 200 μm to about 950 μm, about 200 μm to about 1000 μm, about 250 μm to about 300 μm, about 250 μm to about 350 μm, about 250 μm to about 400 μm, about 250 μm to about 450 μm, about 250 μm to about 500 μm, about 250 μm to about 550 μm, about 250 μm to about 600 μm, about 250 μm to about 650 μm, about 250 μm to about 700 μm, about 250 μm to about 750 μm, about 250 μm to about 800 μm, about 250 μm to about 850 μm, about 250 μm to about 900 μm, about 250 μm to about 950 μm, about 250 μm to about 1000 μm, about 300 μm to about 350 μm, about 300 μm to about 400 μm, about 300 μm to about 450 μm, about 300 μm to about 500 μm, about 300 μm to about 550 μm, about 300 μm to about 600 μm, about 300 μm to about 650 μm, about 300 μm to about 700 μm, about 300 μm to about 750 μm, about 300 μm to about 800 μm, about 300 μm to about 850 μm, about 300 μm to about 900 μm, about 300 μm to about 950 μm, about 300 μm to about 1000 μm, about 350 μm to about 400 μm, about 350 μm to about 450 μm, about 350 μm to about 500 μm, about 350 μm to about 550 μm, about 350 μm to about 600 μm, about 350 μm to about 650 μm, about 350 μm to about 700 μm, about 350 μm to about 750 μm, about 350 μm to about 800 μm, about 350 μm to about 850 μm, about 350 μm to about 900 μm, about 350 μm to about 950 μm, about 350 μm to about 1000 μm, about 400 μm to about 450 μm, about 400 μm to about 500 μm, about 400 μm to about 550 μm, about 400 μm to about 600 μm, about 400 μm to about 650 μm, about 400 μm to about 700 μm, about 400 μm to about 750 μm, about 400 μm to about 800 μm, about 400 μm to about 850 μm, about 400 μm to about 900 μm, about 400 μm to about 950 μm, about 400 μm to about 1000 μm, about 450 μm to about 500 μm, about 450 μm to about 550 μm, about 450 μm to about 600 μm, about 450 μm to about 650 μm, about 450 μm to about 700 μm, about 450 μm to about 750 μm, about 450 μm to about 800 μm, about 450 μm to about 850 μm, about 450 μm to about 900 μm, about 450 μm to about 950 μm, about 450 μm to about 1000 μm, about 500 μm to about 550 μm, about 500 μm to about 600 μm, about 500 μm to about 650 μm, about 500 μm to about 700 μm, about 500 μm to about 750 μm, about 500 μm to about 800 μm, about 500 μm to about 850 μm, about 500 μm to about 900 μm, about 500 μm to about 950 μm, about 500 μm to about 1000 μm, about 550 μm to about 600 μm, about 550 μm to about 650 μm, about 550 μm to about 700 μm, about 550 μm to about 750 μm, about 550 μm to about 800 μm, about 550 μm to about 850 μm, about 550 μm to about 900 μm, about 550 μm to about 950 μm, about 550 μm to about 1000 μm, about 600 μm to about 650 μm, about 600 μm to about 700 μm, about 600 μm to about 750 μm, about 600 μm to about 800 μm, about 600 μm to about 850 μm, about 600 μm to about 900 μm, about 600 μm to about 950 μm, about 600 μm to about 1000 μm, about 650 μm to about 700 μm, about 650 μm to about 750 μm, about 650 μm to about 800 μm, about 650 μm to about 850 μm, about 650 μm to about 900 μm, about 650 μm to about 950 μm, about 650 μm to about 1000 μm, about 700 μm to about 750 μm, about 700 μm to about 800 μm, about 700 μm to about 850 μm, about 700 μm to about 900 μm, about 700 μm to about 950 μm, about 700 μm to about 1000 μm, about 750 μm to about 800 μm, about 750 μm to about 850 μm, about 750 μm to about 900 μm, about 750 μm to about 950 μm, about 750 μm to about 1000 μm, about 800 μm to about 850 μm, about 800 μm to about 900 μm, about 800 μm to about 950 μm, about 800 μm to about 1000 μm, about 850 μm to about 900 μm, about 850 μm to about 950 μm, about 850 μm to about 1000 μm, about 900 μm to about 950 μm, about 900 μm to about 1000 μm or about 950 μm to about 1000 μm.

Aspects of the present specification disclose, in part, a plant. A plant includes, by way of example, a plant or group of plants or part of a plant, a particular area of land like a lawn, a garden or an agricultural field. As used herein, the term "plant" refers to any living organism belonging to the Kingdom Plantae that form the clade Viridiplantae. Non-limiting examples the flowering plants, conifers and other gymnosperms, ferns, clubmosses, hornworts, liverworts, mosses and the green algae, but exclude the red and brown algae, the fungi, archaea, bacteria and animals. A vascular plant include the clubmosses, horsetails, ferns, gymnosperms (including conifers) and angiosperms (flowering plants). The scientific names for this group include Tracheophyta and Tracheobionta. As used herein, the term "flower" is synonymous with "bloom" or "blossom" and refers the reproductive structure found in angiosperms. As used herein, the term "crop plant" refers to a plant that produces a crop. Non-limiting examples include are plants that produce fruits, seeds, nuts, grains, oil, wood, and fibers. As used herein, the term "crop" refers to a plant product which is of economic value. Non-limiting examples include are fruits, seeds, nuts, grains, oil, wood, and fibers.

Aspects of the present specification disclose, in part, a location. As such, a plant agent composition disclosed herein is advantageously employed in a wide variety of locations, including without limitation, household applications, lawn and garden applications, agriculture applications, organic farming applications, greenhouse and nursery applications, stored product applications, professional plant agent applications, foliage applications, underwater or submerged applications, soil incorporation applications, seedling box treatment applications, stalk injection and planting treatment applications.

Plant disease that can be treated by a plant agent composition, method and/or use disclosed herein include, without limitation, an anthracnose, a blight, a canker, a club root, a damping off, a gall, a leaf blister, a leaf spot, a mildew, a mold, a mosaic virus disease, a rot, a rust, a scab, a smut and a wilt.

Anthracnose, or bird's-eye spot, refers to a group of plant diseases caused by numerous species of fungi from the genera *Colletotrichum, Gloeosporium, Glomerella* and *Elsinoe* that affect a variety of plants in warm, humid areas. Commonly infecting the developing shoots and leaves, anthracnose fungi produce spores in tiny, sunken, saucershaped fruiting bodies known as acervuli. Symptoms include small sunken dead spots or lesions with a raised border of various colors in leaves, stems, fruits, or flowers, and some infections form cankers on twigs and branches. Anthracnose causes the wilting, withering, and dying of tissues, though the severity of the infection depends on both the causative agent and the infected species and can range from mere unsightliness to death. Shade trees such as sycamore, ash, oak, and maple are especially susceptible, though the disease is found in a number of plants, including grasses and annuals. Examples of anthracnoses include, without limitation, grape anthracnose (*Elsinoe ampelina*), Japanese persimmon anthracnose (*Gloeosporium kaki*), strawberry anthracnose (*Glomerella cingulata*), gourd anthracnose (*Colletotrichum lagenarium*), kidney bean anthracnose (*Colletotrichum lindemthianum*), tea anthracnose (*Colletotrichum theaesinensis*) and tabacco anthracnose (*Colletotrichum tabacum*).

Blight refers to a group of plant diseases caused by numerous species of fungi and bacteria symptomatically characterized by a rapid and severe chlorosis, yellowing, browning, spotting, withering and then death of plant tissues such as leaves, branches, twigs, or floral organs. Both fungal and bacterial blights occur most often under cool moist conditions, and usually attack the shoots and other young, rapidly growing tissues of a plant. Most economically important plants are susceptible to one or more blights, including tomatoes, potatoes, and apples, as well as many ornamental species. Blights are often named after their causative agent, for example *Colletotrichum* blight is named after the fungi *Colletotrichum capsici*, and *Phytophthora* blight is named after the water mold *Phytophthora parasitica*. Examples of blights include, without limitation, *alternaria* (early) blight (*Alternaria solani*), *fusarium* blight (*Fusarium gaminearum, F. avenaceum, F. culmorum, Microdochium nivale*), *Phytophthora* (late) blight (*Phytophthora infestans*), *rhizoctonia* seeding blight (*Rhizoctonia solani*); *rhizoctonia* aerial blight (*Rhizoctonia solani*), *typhula* snow blight (*Typhula* sp.), apple blossom blight (*Monilinia mali*), bacterial rice leaf blight (*Xanthomonas oryzae*), chestnut blight (*Cryphonectria parasitica*), fire blight of pome fruits (*Erwinia amylovora*), gray blight (*Pestalotiopsis* sp.), leaf blight (*Septoria chrysanthemi-indici, Thanatephorus cucumeris*), net blister blight (*Exobasidium reticulatum*), sheath blight (*Rhizoctonia solani*), Southern peanut blight (*Sclerotium rolfsii*), Southern corn leaf blight (*Cochliobolus heterostrophus, Bipolaris maydis*), soybean pod and stem blight (*Diaporthe phaseolorum* var. *sojae*) and vine blight (*Mycosphaerella melonis*).

Canker refers to a group of common and widespread plant diseases cause by numerous species of fungi and bacteria that occurs primarily on a wide range of woody plants. Symptoms include round-to-irregular, sunken, swollen, flattened, or cracked, discolored, and dieback, dead areas on the stem (cane), twig, limb, or trunk. Cankers may enlarge and girdle a twig or branch, killing the foliage beyond it. Canker can structurally weaken a plant until it breaks over in the wind or during an ice storm. Cankers also slow the normal healing of wounds and provide entry for wood decay or wilt producing fungi and other organisms. They are most common on plants weakened by cold or drought stresses, insect injury, nutritional imbalances, nematodes, or root rot. Cankers can be classified as annual cankers (*Fusarium* canker), perennial cankers (*Nectria* canker, *Eutypella* canker) and diffuse cankers (*Botryosphaeria* canker, *Phytophthora* dieback, *Cytospora* canker). Examples of cankers include, without limitation, fungal cankers like aApple tree canker (*Valsa ceratosperma*), *Botryosphaeria* canker *Cytospora* canker, *Eutypella* (maple tree) canker, *Nectria* canker, *Phytophthora* dieback, *Urnula* (oak tree) canker and bacterial cankers like *Erwinia* canker, *Pseudomonas* canker (*Pseudomonas syringae*) and *Xanthomonas* canker.

Club root refers to a group of plant diseases affecting members of the cabbage family that is caused by the soil-borne fungus, *Plasmodiophora brassicae* and is symptomatically characterized by misshapen and deformed (clubbed) roots which often cracking and rotting. As a result, plants have difficulty absorbing water and nutrients properly. Plants may grow slowly and wilt during the heat of the day; plants often revive during cool nights. Outer leaves eventually turn yellow or brown. Club root will reduce yields and can cause total plant loss.

Damping off refers to a group of plant diseases affecting seeds and new seedlings and is caused by several fungi including species of *Fusarium, Phytophthora, Pythium* and *Rhizoctonia* including *R. solani*, and is symptomatically characterized by rotting of stem and root tissues at and below the soil surface. In most cases, infected plants will germinate and begin to sprout, but within a few days they become water-soaked and mushy, fall over at the base, and die.

Galls refers to a group of plant diseases caused by fungi, bacteria, viruses, and nematodes as well as certain insects symptomatically characterized by an abnormal, localized outgrowth or swelling of plant tissue. Galls infect and kill vines, ornamental flowers, fruit trees, brambles, shade trees, and vegetables. Other plant disease also develop galls as a secondary consequence of infection including cedar-apple rust; clubroot and corn smut. Examples of galls include, without limitation, black knot (*Dibotryon morbosum*) and crown gall (*Agrobacterium tumefaciens*).

Leaf blister, also called leaf curl, refers to a group of plant diseases of many woody plants and ferns worldwide and is caused by fungi of the genus *Taphrina*, and is symptomatically characterized by distorted, curled leaves. Following cold, wet weather at budbreak, leaves become swollen, crinkled, and distorted with yellow, red, purple, brown, whitish, or gray blisters on the upper surface of the leaves, with gray depressions on the lower surface. Such leaves usually die and drop early, weakening a plant. Defoliation by leaf blisters can substantially reduce fruit production and can even kill the tree. Leaf blisters affect peach, nectarine, plum, almond, *amelanchier*, apricot, birch, cherry, cherry laurel, California buckeye, alder, oak and poplar trees. Examples of molds include, without limitation, leaf curl (*Taphrina deformans*).

Leaf Spots refers to a group of plant diseases caused by a vast number of fungi and bacteria symptomatically characterized by spots on the leaves of plants. Infected plants have brown or black water-soaked spots on the foliage, sometimes with a yellow halo, usually uniform in size. The spots enlarge and will run together under wet conditions. Under dry conditions the spots have a speckled appearance. As spots become more numerous, entire leaves may yellow, wither and drop. Fungal leaf spots include species from the genera *Alternaria, Asterina, Asterinella, Cercospora, Cercosporella, Cochliobolus, Corynespora, Diplocarpon, Diplotheca, Gloeocercospora, Glomerella, Gnomonia, Phomopsis, Placosphaeria, Pyrenophora, Schizothyrium, Sclerotinia, Septoria* and *Stigmea*. Fungal leaf spot attacks lettuce and can also occur on brassicas and other vegetables including such as cabbage, cauliflower, Chinese cabbage, broccoli, Brussels sprouts, kohlrabi, kale, turnip, and rutabaga. Fungal leaf spot will also infect strawberry plants as well as aspen and poplar trees. Leaf spot will also cause problems for. Fungal leaf spots include species from the genus *Pseudomonas*. Bacterial leaf spot particularly attacks members of the *Prunus* family (stone fruits, including cherry, plum, almond, apricot and peach) are particularly susceptible to bacterial leaf spot. The fruit may appear spotted or have sunken brown areas. Bacterial leaf spot will also infect tomato and pepper crops as well as some annual and perennial flowering plants including roses, geraniums, zinnias, purple coneflowers and black-eyed susans. Examples of wilts leaf spots, without limitation, *alternaria* leaf spot (*Alternaria alternata, Alternaria brassicicola, Alternaria japonica*), black spot (*Alternaria alternata, Diplocarpon rosae*), brown spot (*Alternaria longipes, Cochliobolus miyabeanus, Phomopsis vexans, Septoria glycines*), *Phycercospora* leaf spot (*Cercospora beticola*), dollar spot (*Sclerotinia homeocarpa*), early leaf spot (*Cercospora personata*), frog eye leaf spot (*Cercospora sojina*), gray leaf spot (*Cercospora zeae-maydis*), late leaf spot (*Cercospora arachidicola*), leaf spot (*Cercospora kaki, Mycosphaerella nawae*), tan spot (*Pyrenophora tritici-repentis*), white spot (*Cercosporella brassicae*), target spot (*Corynespora cassiicola*) and zonate leaf spot (*Gloeocercospora sorghi*).

Mildew refers to a group of plant diseases caused by numerous fungi symptomatically characterized by white, gray, bluish, or violet powdery growth, usually on the upper or lower surfaces of leaves. Small black dots appear and produce spores that are blown by wind to infect new plants. Leaves will become brown and often wilt, wither, and die early when mildew is extensive, fruits ripen prematurely and have poor texture and flavor. Seedlings may wilt and collapse. Hundreds of species of trees, shrubs, vines, flowers, vegetables, fruits, grasses, field crops, garden plants, bush fruits, and weeds can be affected by mildew. Examples of mildews include, without limitation, downy mildew (*Basidiophora* spp., *Bremia lactucae* and other *Bremia* spp., *Erysiphe graminis, Plasmopara viticola, Podosphaera, Peronospora* destructor, *Peronospora parasitica, Peronospora sparsa, Peronospora tabacina*, and other *Peronospora* spp., *Phytophthora* spp., *Plasmopara* spp., *Pseudoperonospora cubensis* and other *Pseudoperonospora* spp., and *Sclerospora* spp.) and powdery mildew (*Erysiphe cichoracearum, Erysiphe graminis, Erysiphe pisi* and other *Erysiphe* spp., *Microsphaera, Phyllactinia, Podosphaera leucotricha* and other *Podosphaera* spp., *Sphaerotheca fuliginea, Sphaerotheca humuli, Sphaerotheca pannosa* and other *Sphaerotheca* spp., and *Uncinula necator* and other *Uncinula* spp.).

Mold refers to a group of plant diseases caused by several fungi symptomatically characterized by a powdery or woolly appearance on the surface of the infected plant part. Molds attacks a wide range of plants including cereals, forage grasses and turf grasses especially during damp, cool to mild weather. Examples of molds include, without limitation, gray mold (*Botrytis cinerea*), leaf mold (*Cladosporium fulvum*), pink snow mold (*Fusarium nivale*) and snow mold (*Typhula itoana*).

Mosaic virus disease refers to a group of plant diseases caused by plant viruses and is symptomatically characterized by the appearance of having several nutrient deficiencies. Foliage have yellow stripes or spots, wrinkled or curled leaves, stunted growth and reduced yields. Infected fruit appear mottled and develops raised "warty" areas. Mosaic virus affects a wide variety of plants, including roses, beans, tobacco, tomatoes, potatoes and peppers. Examples of mosaic virus species include, without limitation, beet mosaic virus, plum pox virus (*Potyvirus* spp.), tobacco mosaic virus (*Tobamovirus* spp.), cassava mosaic virus (*Begomovirus* spp.), cowpea mosaic virus, cucumber mosaic virus, alfalfa mosaic virus, *panicum* mosaic satellite virus, squash mosaic virus, tulip breaking virus and zucchini yellow mosaic virus.

Rot, also called decay, refers to a group of plant diseases caused by any of hundreds of species of soil-borne fungi and bacteria symptomatically characterized by plant decomposition and putrefaction. Decomposition and putrefaction are due to decay of roots, stems, wood, flowers, and/or fruit. The decay can be hard and dry, soft and squishy, watery, mushy, or slimy and may affect any plant part. Many rots are very active in stored fruits, roots, bulbs, or tubers. Some rot diseases cause leaves to decay, but those symptoms tend to be described as leaf spots and blights. Examples of rots include, without limitation, *Aphanomyces* root rot (*Aphanomyces cochlioides*), *Phomopsis* rot (*Phomopsis* spp.), *Phytophthora* rot (*Phytophtora cactorum, Phytophthora sojae*, other *Phytophthora* spp.), *Sclerotinia* rot (*Sclerotinia sclerotiorum*), bitter rot (*Colletotrichum acutatum*), black rot (*Guignardia bidwellii*), brown rot (*Monilinia fructicola*), crown rot (*Phytophtora cactorum*), fruit rot (*Penicillium digitatum, P. italicum*), mushroom rot, pink rot (*Phytophthora Erythroseptica*), ripe rot (*Glomerella cingulata*), root rot (*Aphanomyces* spp., *Armillaria mellea, Clitocybe tabescens, Fusarium* spp., *Pythium* spp., *Phytophthora* spp., *Thanatephorus cucumeris*), stem rot, and wood rot.

Rust refers to a group of plant diseases caused by more than 5,000 species of fungi symptomatically characterized by yellow, orange, red, rust, brown, or black powdery pustules which appears as a coating on leaves, young shoots, and fruits of thousands of economically important plants. Plant growth and productivity are commonly reduced; some plants wither and die back. During their life cycle rust fungi parasitize either one species of plant (autoecious, or monoecious, rust) or two distinct species (heteroecious rust). Autoecious rusts include those that attack asparagus, bean, *chrysanthemum*, coffee, hollyhock, snapdragon, and sugarcane. Heteroecious rusts include those that attack cereals, grasses, junipers, fir, poplars, apple trees, Japanese quince, hawthorn, rose, currant and gooseberry. Examples of rusts include, without limitation, asparagus rust, barley rust (*Puccinia striiformis, P. graminis, P. hordei*), black stem rust (*Puccinia graminis*), cedar apple rust, common rust (Phragmidium spp.), grape rust (*Phakopsora ampelopsidis*), leaf rust (*Puccinia triticina* triticia), pear rust (*Gymnosporangium haraeanum*), Southern rust (*Puccinia polvsora*), soybean rust (*Phakopsora pachyrhizi*), stripe (yellow) rust (*Puccinia striiformis tritici*), welsh onion rust (*Puccinia allii*), wheat rust (*Puccinia striiformis, P. graminis, P. recondita*), white rust (*Albugo* spp., *Puccinia horiana*) and white pine rust (*Cronartium ribicola*).

Scab refers to a group of plant diseases caused by several fungi and bacteria symptomatically characterized by hardened, overgrown, and sometimes cracked tissue (crustaceous lesions) on fruit, tuber, leaf, or stem. Leaves of affected plants may wither and drop early. Scabs often affects the trees or plants of apples, crab apples, cereals, cucumbers, peaches, pecans, photinis, potatoes, and pyracantha. Fruit scab can be a major problem on apples and peaches and potatoes are especially susceptible to common scab. Examples of scabs include, without limitation, Apple scab (*Venturia inaequalis*), citris scab (*Elsinoe fawcetti*), common scab (*Streptomyces* scabies), peach scab (*Cladosporium carpophilum*), scab (*Venturia nashicola, V. pirina*), powdery potato scab (*Spongospora subterranean* f. sp. *subterranea*) and white scab (*Elsinoe leucospila*).

Smuts refers to a group of plant diseases caused by fungi symptomatically characterized by fungal spores that accumulate in sootlike masses called sori, which are formed within blisters in seeds, leaves, stems, flower parts, and bulbs. The sori usually break up into a black powder that is readily dispersed by the wind. Many smut fungi enter embryos or seedling plants, develop systemically, and appear externally only when the plants are near maturity. Other smuts are localized, infecting actively growing tissues. Smuts are most commonly seen on grasses, grains, and corn (maize), sugarcane, and sorghum. Examples of smuts include, without limitation, barley smut (*Ustilago nuda*), corn smut (*Ustilago maydis, U. zeae*), loose smut (*Ustilago tritici*) and stinking smut (*Tilletia caries*).

Wilt refers to a group of plant diseases caused by numerous fungi and bacteria and is symptomatically characterized by permanent stunting, wilting, and withering, often followed by the death of all or part of the plant. Fungi causing wilt include species from the genera *Fusarium* and *Verticillium*, whereas bacteria causing wilt include species from the genera *Corynebacterium, Erwinia, Pseudomonas*, and *Xanthomonas*. Wilt affects over 500 species of trees, shrubs, vines, flowers, house plants, vegetables, fruits, field crops, and weeds. Examples of wilts include, without limitation, *Fusarium* wilt (*Fusarium oxysporum*), oak wilt (*Ceratocystis fagacearum*), Stewart's wilt and *Verticillium* wilt (*Verticillium alboatrum, V. dahliae*).

Causal agents whose population can be controlled by a plant agent composition, method and/or use disclosed herein include, without limitation, viruses, bacteria, fungi and nematodes. In addition, all stages of development can be controlled by a plant agent composition, method and/or use disclosed herein include, without limitation, egg, larval, nymphal, juvenile, pupal and adult.

A plant agent composition, method and/or use disclosed herein can control a population of causal agents belongs to the Kingdom Monera, Kingdom Fungi and Phyla Nematoda. In an embodiment, a plant agent composition, method and/or use disclosed herein can control a population of causal agents belongs to the Domain Bacteria and Cyanobacteria (referred to as bacterial causal agents). In aspects of this embodiment, a plant agent composition, method and/or use disclosed herein can control a population of causal agents belongs to the Phylum Acidobacteria, Actinobacteria, Aquificae, Armatimonadetes, Bacteroidetes, Caldiserica, Chlamydiae, Chlorobi, Chloroflexi, Chrysiogenetes, Cyanobacteria, Deferribacteres, *Deinococcus-Thermus*, Dictyoglomi, Elusimicrobia, Fibrobacteres, Firmicutes, Fusobacteria, Gemmatimonadetes, Lentisphaerae, Nitrospira, Planctomycetes, Proteobacteria, Spirochaetes, Synergistetes, Tenericutes, Thermodesulfobacteria, Thermomicrobia, Thermotogae or Verrucomicrobia. A non-exhaustive list of particular genera of bacterial causal agents includes, but is not limited to, *Agrobacterium, Corynebacterium, Cryphonectria, Erwinia, Penicillium, Pseudomonas, Streptomyces* and *Xanthomonas*. A non-exhaustive list of particular species of bacterial causal agents includes, but is not limited to, *Agrobacterium tumefaciens, Cryphonectria parasitica, Erwinia amylovora, Penicillium digitatum, P. italicum, Pseudomonas syringae, Streptomyces* scabies and *Xanthomonas oryzae.*

In another embodiment, a plant agent composition, method and/or use disclosed herein can control a population of causal agents belongs to the Order Virales. Referred to as viral causal agents, a non-exhaustive list of particular genera includes, but is not limited to, *Begomovirus, Potyvirus* and *Tobamovirus*

In another embodiment, a plant agent composition, method and/or use disclosed herein can control a population of causal agents belongs to the Division Ascomycota, Basidiomycota, Deuteromycota or Zygomycota. Referred to as fungal causal agents, a non-exhaustive list of particular genera includes, but is not limited to, *Albugo, Alternaria, Aphanomyces, Armillaria, Asterina, Asterinella, Basidiophora, Bipolaris, Botryosphaeria, Botrytis, Bremia, Ceratocystis, Cercospora, Cercosporella, Cladosporium, Clitocybe, Cochliobolus, Colletotrichum, Corynespora, Cronartium, Cytospora, Diaporthe, Dibotryon, Diplocarpon, Diplotheca, Elsinoe, Erysiphe, Eutypella, Exobasidium, Fusarium, Gloeocercospora, Gloeosporium, Glomerella, Gnomonia, Guignardia, Gymnosporangium, Microdochium, Microsphaera, Monilinia, Mycosphaerella, Nectria, Peronospora, Pestalotiopsis, Phakopsora, Phomopsis, Phragmidium, Phyllactinia, Phytophthora, Placosphaeria, Plasmodiophora, Plasmopara, Podosphaera, Pseudoperonospora, Puccinia, Pyrenophora, Pythium, Rhizoctonia, Schizothyrium, Sclerospora, Sclerotinia, Septoria, Sphaerotheca, Spongospora, Stigmea, Taphrina, Thanatephorus, Tilletia, Typhula, Uncinula, Urnula, Ustilago, Valsa, Venturia* and *Verticillium*. A non-exhaustive list of particular species of fungal causal agents includes, but is not limited to, *Alternaria alternata, Alternaria brassicicola, Alternaria japonica, Alternaria longipes, Alternaria solani, Aphanomyces cochlioides, Armillaria mellea, Bipolaris maydis, Botrytis cinerea, Bremia lactucae, Ceratocystis fagacearum, Cercospora arachidicola, C. beticola, C. kaki, C. personata, C. sojina, C. zeae-maydis, Cercosporella brassicae, Cladosporium carpophilum, C. fulvum, Clitocybe tabescens, Cochliobolus heterostrophus, C. miyabeanus, Colletotrichum acutatum, C. capsici, C. lagenarium, C. lindemthianum, C. theaesinensis, C. tabacum, Corynespora cassiicola, Cronartium ribicola, Diaporthe phaseolorum, Dibotryon morbosum, Diplocarpon rosae, Elsinoe ampelina, E. fawcetti, E. leucospila, Erysiphe cichoracearum, E. graminis, E. pisi, Exobasidium reticulatum, Fusarium avenaceum, F. culmorum, F. gaminearum, F. oxysporum, F. nivale, Gloeocercospora sorghi, Gloeosporium kaki, Glomerella cingulata, Guignardia bidwellii, Gymnosporangium haraeanum, Microdochium nivale, Monilinia laxa, M. fructigena, M. fructicola, M. mali, Mycosphaerella melonis, M. nawae, Peronospora destructor, P. parasitica, P. sparsa, P. tabacina, Phakopsora ampelopsidis, P. pachyrhizi, Phomopsis juniperovora, P. vexans, Phytophtora cactorum, P. erythroseptica, P. infestans, P. parasitica, P. sojae, Plasmodiophora brassicae, Plasmopara viticola, Podosphaera leucotricha, Pyrenophora tritici-repentis, Pseudoperonospora cubensis, Puccinia allii, P. graminis, P. hordei, P. horiana, P. polvsora, P. recondita, P. striiformis, P. triticina triticia, Rhizoctonia solani, Sclerotinia homeocarpa, S. rolfsii, S. sclerotiorum, Septoria chrysanthemi-indici, S. glycines, S. lycopersici, Sphaerotheca fuliginea, S. humuli, S. pannosa, Spongospora subterranean, Taphrina deformans, Thanatephorus cucumeris, Tilletia caries, Typhula itoana, Uncinula necator, Ustilago maydis, U. nuda, U. tritici, U. zeae, Valsa ceratosperma, Venturia inaequalis, V. nashicola, V. pirina, Verticillium alboatrum* and *V. dahlia.*

In another embodiment, a plant agent composition, method and/or use disclosed herein can control a population of causal agents belongs to the Phylum Nematoda (round worms). Referred to as nematode causal agents, a non-exhaustive list of particular genera includes, but is not limited to, *Aphelenchoides, Belonolaimus, Criconemella, Dirofilaria, Ditylenchus, Heterodera, Hirschmanniella, Hoplolaimus, Meloidogyne, Onchocerca, Pratylenchus, Radopholus* and *Rotylenchulus*. A non-exhaustive list of particular species of nematode causal agents includes, but is not limited to, *Dirofilaria immitis, Heterodera zeae, Meloidogyne incognita, Meloidogyne javanica, Onchocerca volvulus, Radopholus similis*, and *Rotylenchulus reniformis.*

The plant agent compositions, method and uses described herein will most likely not harm mammals or the environment and are non-phytotoxic and can be safely applied to economically valuable plants or crops. Furthermore, the plant agent compositions, method and uses described herein can be used indoors and outdoors and will not soften, dissolve, or otherwise adversely affect treated surfaces. Lastly, a causal agent will not build resistance to the plant agent compositions, method and uses described herein.

Aspects of the present specification can also be described as follows:

1. A method of controlling a causal agent of a plant disease, the method comprising, consisting essential of or consisting of applying an effective amount of a plant agent composition to one or more plants infested with a causal agent and/or applying an effective amount of a plant agent composition to one or more locations in a manner where the causal agent will be exposed to the plant agent composition, wherein application of the plant agent composition results in an adverse effect on the causal agent of a plant disease sought to be controlled, wherein the composition comprises, consists essential of or consists of a treated, fermented microbial supernatant and one or more nonionic surfactants, wherein the composition lacks any active enzymes or live bacteria, and wherein the composition has a pH of at most 5.0.
2. A method of increasing plant growth and/or crop production, the method comprising, consisting essential of or consisting of applying an effective amount of a plant agent composition to one or more plants and/or applying an effective amount of a plant agent composition to one or more locations where a plant agent composition will be exposed to the one or more plants, wherein application of the plant agent composition results in improved absorption by root hairs, improve xylem sap flow through xylem and improve photosynthate flow in phloem, increased uptake of water, minerals and other nutrients from the soil, increase the capillary action and/or hydrostatic pressure in xylem, and/or increase synthesis of compounds and energy and/or disruption of one or more components blocking xylem sap flow and/or photosynthate flow, wherein the composition comprises, consists essential of or consists of a treated, fermented microbial supernatant and one or more nonionic surfactants, wherein the composition lacks any active enzymes or live bacteria, and wherein the composition has a pH of at most 5.0.
3. A method of maintaining or improving the efficiency of an irrigation system, the method comprising, consisting essential of or consisting of applying an effective amount of a plant agent composition to one or more pipes in a pipeline network of the irrigation system, wherein application of the plant agent composition results in adequate removal of one or more components blocking one or more pipeline networks of an irrigation system, wherein the composition comprises, consists essential of or consists of a treated, fermented microbial supernatant and one or more nonionic surfactants, wherein the composition lacks any active enzymes or live bacteria, and wherein the composition has a pH of at most 5.0.
4. Use of an effective amount of a plant agent composition for controlling a plant disease, wherein the composition comprises, consists essential of or consists of a treated, fermented microbial supernatant and one or more nonionic surfactants, wherein the composition lacks any active enzymes or live bacteria, and wherein the composition has a pH of at most 5.0.
5. Use of an effective amount of a plant agent composition for increasing plant growth and/or crop production, wherein the composition comprises, consists essential of or consists of a treated, fermented microbial supernatant and one or more nonionic surfactants, wherein the composition lacks any active enzymes or live bacteria, and wherein the composition has a pH of at most 5.0.
6. Use of an effective amount of a plant agent composition for maintaining or improving the efficiency of an irrigation system, wherein the composition comprises, consists essential of or consists of a treated, fermented microbial supernatant and one or more nonionic surfactants, wherein the composition lacks any active enzymes or live bacteria, and wherein the composition has a pH of at most 5.0.
7. The method according to embodiments 1-3 or use according to embodiments 4-6, wherein the treated, fermented microbial supernatant is from a fermented yeast supernatant, a fermented bacterial supernatant, a fermented mold supernatant, or any combination thereof.
8. The method or use according to embodiment 6, wherein the fermented yeast supernatant is produced from a species of yeast belonging to the genera *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* or *Zygotorulaspora.*
9. The method or use according to embodiment 6, wherein the fermented yeast supernatant is produced from the yeast *Saccharomyces cerevisiae.*
10. The method or use according to embodiment 6, wherein the fermented bacterial supernatant is produced from a species of bacteria belonging to the genera *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* or *Zymomonas.*
11. The method or use according to embodiment 6, wherein the fermented bacterial supernatant is produced from a species of mold belonging to the genus *Aspergillus.*
12. The method according to embodiments 1-3 or 7-11 or use according to embodiments 4-11, wherein the plant agent composition comprises at least 35% by weight of the treated fermented microbial supernatant.
13. The method according to embodiments 1-3 or 7-12 or use according to embodiments 4-12, wherein the plant agent composition comprises at most 95% by weight of the treated fermented microbial supernatant.
14. The method according to embodiments 1-3 or 7-13 or use according to embodiments 4-13, wherein the nonionic surfactant comprises, consists essential of or consists of a polyether nonionic surfactant, a polyhydroxyl nonionic surfactant, and/or a nonionic biosurfactant.

15. The method or use according to embodiment 14, wherein the polyhydroxyl nonionic surfactant comprises, consists essential of or consists of a sucrose ester, an ethoxylated sucrose ester, a sorbital ester, an ethoxylated sorbital ester, an alkyl glucoside, an ethoxylated alkyl glucoside, a polyglycerol ester, or an ethoxylated polyglycerol ester.
16. The method according to embodiments 1-3 or 7-15 or use according to embodiments 4-15, wherein the nonionic surfactant comprises, consists essential of or consists of an amine oxide, an ethoxylated alcohol, an ethoxylated aliphatic alcohol, an alkylamine, an ethoxylated alkylamine, an ethoxylated alkyl phenol, an alkyl polysaccharide, an ethoxylated alkyl polysaccharide, an ethoxylated fatty acid, an ethoxylated fatty alcohol, or an ethoxylated fatty amine, or a nonionic surfactant having the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group.
17. The method or use according to embodiment 16, wherein $R^1$ is a $C_7$-$C_{10}$ normal-alkyl group and/or wherein $R^2$ is a $C_{12}$-$C_{20}$ aliphatic group.
18. The method according to embodiments 1-3 or 7-17 or use according to embodiments 4-17, wherein the nonionic surfactant is an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.
19. The method according to embodiments 1-3 or 7-18 or use according to embodiments 4-18, wherein the plant agent composition comprises from about 1% to about 15% by weight of the one or more nonionic surfactants.
20. The method according to embodiment 19, wherein the plant agent composition comprises from about 5% to about 13% by weight of the one or more nonionic surfactants.
21. The method according to embodiment 20, wherein the plant agent composition comprises from about 7% to about 11% by weight of the one or more nonionic surfactants.
22. The method according to embodiments 1-3 or 7-21 or use according to embodiments 4-21, wherein the plant agent composition further comprises, consists essential of or consists of one or more anionic surfactants.
23. The method or use according to embodiment 22, wherein the plant agent composition comprises from about 0.5% to about 10% by weight of the one or more anionic surfactants.
24. The method or use according to embodiment 23, wherein the plant agent composition comprises from about 1% to about 8% by weight of the one or more anionic surfactants.
25. The method or use according to embodiment 24, wherein the plant agent composition comprises from about 2% to about 6% by weight of the one or more anionic surfactants.
26. The method according to embodiments 1-3 or 7-25 or use according to embodiments 4-25, wherein the pH is at most 4.5.
27. The method or use according to embodiment 26, wherein the pH about 3.7 to about 4.2.
28. The method according to embodiments 1-3 or 7-27 or use according to embodiments 4-27, wherein the plant agent composition is substantially non-toxic to humans, mammals, plants and the environment.
29. The method according to embodiments 1-3 or 7-28 or use according to embodiments 4-28, wherein the plant agent composition is biodegradable.
30. The method according to embodiments 1 or 7-29 or use according to embodiments 4 or 7-29, wherein the effective amount of the plant agent composition results in an adverse effect to the causal agent sought to be controlled.
31. The method or use according to embodiment 30, wherein the effective amount of the plant agent composition adversely effects about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of the causal agent sought to be controlled.
32. The method according to embodiments 1 or 7-31 or use according to embodiments 4 or 7-31, wherein the effective amount of the plant agent composition results in mortality of the causal agent sought to be controlled.
33. The method or use according to embodiment 32, wherein the effective amount of the plant agent composition results in mortality of about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of the causal agent sought to be controlled.

34. The method according to embodiments 1 or 7-33 or use according to embodiments 4 or 7-33, wherein the effective amount of the plant agent composition reduces the size of a population of the causal agent sought to be controlled.

35. The method or use according to embodiment 34, wherein the effective amount of the plant agent composition reduce the size of a population of a causal agent sought to be controlled by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

36. The method according to embodiments 1 or 7-35 or use according to embodiments 4 or 7-35, wherein the effective amount of the plant agent composition deters a population of a causal agent sought to be controlled from entering or infesting one or more locations.

37. The method or use according to embodiment 36, wherein the effective amount of the plant agent composition deters about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99% of a population of the causal agent from entering or infesting one or more locations.

38. The method according to embodiments 2 or 7-29 or use according to embodiments 5 or 7-29, wherein the effective amount of the plant agent composition improves absorption of water, minerals and other nutrients from the soil by root hairs.

39. The method or use according to embodiment 38, wherein the effective amount of the plant agent composition improves absorption of water, minerals and other nutrients from the soil by root hairs by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

40. The method according to embodiments 2, 7-29 or 38-39 or use according to embodiments 5, 7-29 or 38-39, wherein the effective amount of the plant agent composition improves xylem sap flow through xylem.

41. The method or use according to embodiment 40, wherein the effective amount of the plant agent composition improves xylem sap flow through xylem by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

42. The method according to embodiments 2, 7-29 or 38-41 or use according to embodiments 5, 7-29 or 38-41, wherein the effective amount of the plant agent composition improves photosynthate flow in phloem.
43. The method or use according to embodiment 42, wherein the effective amount of the plant agent composition improves photosynthate flow in phloem by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
44. The method according to embodiments 2, 7-29 or 38-43 or use according to embodiments 5, 7-29 or 38-43, wherein the effective amount of the plant agent composition increases uptake of water, minerals and other nutrients from the soil.
45. The method or use according to embodiment 44, wherein the effective amount of the plant agent composition increases uptake of water, minerals and other nutrients from the soil by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
46. The method according to embodiments 2, 7-29 or 38-45 or use according to embodiments 5, 7-29 or 38-45, wherein the effective amount of the plant agent composition increases capillary action and/or hydrostatic pressure in xylem.
47. The method or use according to embodiment 46, wherein the effective amount of the plant agent composition increases capillary action and/or hydrostatic pressure in xylem by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
48. The method according to embodiments 2, 7-29 or 38-47 or use according to embodiments 5, 7-29 or 38-47, wherein the effective amount of the plant agent composition improves transportation of raw materials through the plant.
49. The method or use according to embodiment 48, wherein the effective amount of the plant agent composition improves transportation of raw materials through the plant by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
50. The method according to embodiments 2, 7-29 or 38-49 or use according to embodiments 5, 7-29 or 38-49, wherein the effective amount of the plant agent composition increases synthesis of compounds and energy in the plant.

51. The method or use according to embodiment 50, wherein the effective amount of the plant agent composition increases synthesis of compounds and energy in the plant by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

52. The method according to embodiments 2, 7-29 or 38-51 or use according to embodiments 5, 7-29 or 38-51, wherein the effective amount of the plant agent composition improves synthesis of compounds and energy needed to sustain and continue plant growth.

53. The method or use according to embodiment 52, wherein the effective amount of the plant agent composition improves synthesis of compounds and energy needed to sustain and continue plant growth by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

54. The method according to embodiments 2, 7-29 or 38-53 or use according to embodiments 5, 7-29 or 38-53, wherein the effective amount of the plant agent composition dissolves, disperses, or otherwise removes one or more components that disrupt xylem sap flow in xylem.

55. The method or use according to embodiment 54, wherein the effective amount of the plant agent composition dissolves, disperses, or otherwise removes one or more components that disrupt xylem sap flow in xylem by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

56. The method according to embodiments 2, 7-29 or 38-55 or use according to embodiments 5, 7-29 or 38-55, wherein the effective amount of the plant agent composition dissolves, disperses, or otherwise removes one or more components that disrupt photosynthate flow in phloem.

57. The method or use according to embodiment 56, wherein the effective amount of the plant agent composition dissolves, disperses, or otherwise removes one or more components that disrupt photosynthate flow in phloem by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.

58. The method according to embodiments 3 or 7-29 or use according to embodiments 6-29, wherein the effective amount of the plant agent composition dissolves, disperses, or otherwise removes one or more components that disrupt water flow in a pipeline network of an irrigation system.
59. The method or use according to embodiment 58, wherein the effective amount of the plant agent composition dissolves, disperses, or otherwise removes one or more components that disrupt water flow in a pipeline network of an irrigation system by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
60. The method according to embodiments 3, 7-29 or 58-59 or use according to embodiments 6-29 or 58-59, wherein the effective amount of the plant agent composition improves water transport throughout the pipeline network of an irrigation system.
61. The method or use according to embodiment 60, wherein the effective amount of the plant agent composition improves water transport throughout the pipeline network of an irrigation system by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
62. The method according to embodiments 1-3 or 7-61 or use according to embodiments 4-61, wherein the effective amount of the plant agent composition maintains and/or enhances the health and vigor of a plant.
63. The method or use according to embodiment 62, wherein the effective amount of the plant agent composition maintains and/or enhances the health and vigor of a plant by about 70%, about 75%, about 80%, about 85%, about 86%, about 87%, about 88%, about 89%, about 90%, about 91%, about 92%, about 93%, about 94%, about 95%, about 96%, about 97%, about 98% or about 99%; or at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99%; or at most 70%, at most 75%, at most 80%, at most 85%, at most 86%, at most 87%, at most 88%, at most 89%, at most 90%, at most 91%, at most 92%, at most 93%, at most 94%, at most 95%, at most 96%, at most 97%, at most 98% or at most 99%; or about 70% to about 80%, about 70% to about 85%, about 70% to about 90%, about 70% to about 95%, about 70% to about 99%, about 75% to about 85%, about 75% to about 90%, about 75% to about 95%, about 75% to about 99%, about 80% to about 90%, about 80% to about 95%, about 80% to about 99%, about 85% to about 93%, about 85% to about 95%, about 85% to about 97%, about 85% to about 99%, about 90% to about 93%, about 90% to about 95%, about 90% to about 97%, about 90% to about 99%, about 93% to about 95%, about 93% to about 97%, about 93% to about 99%, about 95% to about 97% or about 95% to about 99%.
64. The method according to embodiments 1-3 or 7-63 or use according to embodiments 4-63, wherein the effective amount of the plant agent composition is a plant agent composition:dilutant ratio of about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575 or about 1:600; or at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575 or at least 1:600; or at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575 or at most 1:600; or about 1:50 to about 1:100, about 1:50 to about 1:200, about 1:50 to about 1:300, about 1:50 to about 1:400, about 1:50 to about 1:500, about 1:50 to about 1:600, about 1:100 to about 1:200, about 1:100 to about 1:300, about 1:100 to about 1:400, about 1:100 to about 1:500, about 1:100 to about 1:600, about 1:200 to about 1:300, about 1:200 to about 1:400, about 1:200 to about 1:500, about 1:200 to about 1:600, about 1:300 to about 1:400, about 1:300 to about 1:500, about 1:300 to about 1:600, about 1:400 to about 1:500, about 1:400 to about 1:600 or about 1:500 to about 1:600.

65. The method according to embodiments 1-3 or 7-63 or use according to embodiments 4-63, wherein the effective amount of the plant agent composition is a plant agent composition:dilutant ratio of about 1:500, about 1:750, about 1:1000, about 1:1250, about 1:1500, about 1:1750, about 1:2000, about 1:2250, about 1:2500, about 1:2750, about 1:3000, about 1:3250, about 1:3500, about 1:3750, about 1:4000, about 1:4250, about 1:4500, about 1:4750, about 1:5000, about 1:5250, about 1:5500, about 1:5750, about 1:6000 about 1:7000, about 1:8000, about 1:9000 or about 1:10000; or at least 1:500, at least 1:750, at least 1:1000, at least 1:1250, at least 1:1500, at least 1:1750, at least 1:2000, at least 1:2250, at least 1:2500, at least 1:2750, at least 1:3000, at least 1:3250, at least 1:3500, at least 1:3750, at least 1:4000, at least 1:4250, at least 1:4500, at least 1:4750, at least 1:5000, at least 1:5250, at least 1:5500, at least 1:5750, at least 1:6000, at least 1:7000, at least 1:8000, at least 1:9000 or at least 1:10000; or at most 1:500, at most 1:750, at most 1:1000, at most 1:1250, at most 1:1500, at most 1:1750, at most 1:2000, at most 1:2250, at most 1:2500, at most 1:2750, at most 1:3000, at most 1:3250, at most 1:3500, at most 1:3750, at most 1:4000, at most 1:4250, at most 1:4500, at most 1:4750, at most 1:5000, at most 1:5250, at most 1:5500, at most 1:5750, at most 1:6000 at most 1:7000, at most 1:8000, at most 1:9000 or at most 1:10000; or about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:2000 to about 1:3000, about 1:2000 to about 1:4000, about 1:2000 to about 1:5000, about 1:2000 to about 1:6000, about 1:2000 to about 1:7000, about 1:2000 to about 1:8000, about 1:2000 to about 1:9000, about 1:2000 to about 1:10000, about 1:3000 to about 1:4000, about 1:3000 to about 1:5000, about 1:3000 to about 1:6000, about 1:3000 to about 1:7000, about 1:3000 to about 1:8000, about 1:3000 to about 1:9000, about 1:3000 to about 1:10000, about 1:4000 to about 1:5000, about 1:4000 to about 1:6000, about 1:4000 to about 1:7000, about 1:4000 to about 1:8000, about 1:4000 to about 1:9000, about 1:4000 to about 1:10000, about 1:5000 to about 1:6000, about 1:5000 to about 1:7000, about 1:5000 to about 1:8000, about 1:5000 to about 1:9000, about 1:5000 to about 1:10000, about 1:6000 to about 1:7000, about 1:6000 to about 1:8000, about 1:6000 to about 1:9000, about 1:6000 to about 1:10000, about 1:7000 to about 1:8000, about 1:7000 to about 1:9000, about 1:7000 to about 1:10000, about 1:8000 to about 1:9000, about 1:8000 to about 1:10000 or about 1:9000 to about 1:10000.
66. The method according to embodiments 1-3 or 7-65 or use according to embodiments 4-65, wherein the effective amount of the plant agent composition has a final concentration of about 0.0001%, about 0.0002%, about 0.0003%, about 0.0004%, about 0.0005%, about 0.0006%, about 0.0007%, about 0.0008%, about 0.0009%, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9% or about 10%; or at least 0.0001%, at least 0.0002%, at least 0.0003%, at least 0.0004%, at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9% or at least 10%; or at most 0.0001%, at most 0.0002%, at most 0.0003%, at most 0.0004%, at most 0.0005%, at most 0.0006%, at most 0.0007%, at most 0.0008%, at most 0.0009%, at most 0.001%, at most 0.002%, at most 0.003%, at most 0.004%, at most 0.005%, at most 0.006%, at most 0.007%, at most 0.008%, at most 0.009%, at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4%, at most 5%, at most 6%, at most 7%, at most 8%, at most 9% or at most 10%; or about 0.0001% to about 0.0005%, about 0.0001% to about 0.001%, about 0.0001% to about 0.005%, about 0.0001% to about 0.01%, about 0.0001% to about 0.05%, about 0.0001% to about 0.1%, about 0.0001% to about 0.5%, about 0.0001% to about 1%, about 0.0001% to about 5%, about 0.0001% to about 10%, about 0.0005% to about 0.001%, about 0.0005% to about 0.005%, about 0.0005% to about 0.01%, about 0.0005% to about 0.05%, about 0.0005% to about 0.1%, about 0.0005% to about 0.5%, about 0.0005% to about 1%, about 0.0005% to about 5%, about 0.0005% to about 10%, about 0.001% to about 0.005%, about 0.001% to about 0.01%, 0.001% to about 0.05%, about 0.001% to about 0.1%, 0.001% to about 0.5%, 0.001% to about 1%, 0.001% to about 5%, about 0.001% to about 10%, about 0.005% to about 0.01%, about 0.005% to about 0.05%, about 0.005% to about 0.1%, about 0.005% to about 0.5%, about 0.005% to about 1%, about 0.005% to about 5%, about 0.005% to about 10%, about 0.01% to about 0.05%, about 0.01% to about 0.1%, about 0.01% to about 0.5%, about 0.01% to about 1%, about 0.01% to about 5%, about 0.01% to about 10%, about 0.05% to about 0.1%, about 0.05% to about 0.5%, about 0.05% to about 1%, about 0.05% to about 5%, about 0.05% to about 10%, about 0.1% to about 0.5%, about 0.1% to about 1%, about 0.1% to about 5%, about 0.1% to about 10%, about 0.5% to about 1%, about 0.5% to about 5%, about 0.5% to about 10%, about 1% to about 5%, about 1% to about 10% or about 5% to about 10%.
67. A plant agent composition comprising, consisting essential of or consisting of a treated, fermented microbial supernatant and one or more nonionic surfactants, wherein the composition lacks any active enzymes or live bacteria, and wherein the composition has a pH below 5.0.
68. The plant agent composition according to embodiment 67, wherein the treated, fermented microbial supernatant is from a fermented yeast supernatant, a fermented bacterial supernatant, a fermented mold supernatant, or any combination thereof.

69. The plant agent composition according to embodiment 68, wherein the fermented yeast supernatant is produced from a species of yeast belonging to the genera *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* or *Zygotorulaspora.*

70. The plant agent composition according to embodiment 69, wherein the fermented yeast supernatant is produced from the yeast *Saccharomyces cerevisiae.*

71. The plant agent composition according to embodiment 68, wherein the fermented bacterial supernatant is produced from a species of bacteria belonging to the genera *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* or *Zymomonas.*

72. The plant agent composition according to embodiment 71, wherein the fermented bacterial supernatant is produced from a species of bacteria belonging to the genus *Aspergillus.*

73. The plant agent composition according to any one of embodiments 67-72, wherein the plant agent composition comprises at least 35% by weight of the treated fermented microbial supernatant.

74. The plant agent composition according to any one of embodiments 67-73, wherein the plant agent composition comprises at most 50% by weight of the treated fermented microbial supernatant.

75. The plant agent composition according to any one of embodiments 67-74, wherein the nonionic surfactant comprises, consists essential of or consists of a polyether nonionic surfactant, a polyhydroxyl nonionic surfactant, and/or a biosurfactant.

76. The plant agent composition according to embodiment 75, wherein the polyhydroxyl nonionic surfactant comprises, consists essential of or consists of a sucrose ester, an ethoxylated sucrose ester, a sorbital ester, an ethoxylated sorbital ester, an alkyl glucoside, an ethoxylated alkyl glucoside, a polyglycerol ester, or an ethoxylated polyglycerol ester.

77. The plant agent composition according to any one of embodiments 67-76, wherein the nonionic surfactant comprises, consists essential of or consists of an amine oxide, an ethoxylated alcohol, an ethoxylated aliphatic alcohol, an alkylamine, an ethoxylated alkylamine, an ethoxylated alkyl phenol, an alkyl polysaccharide, an ethoxylated alkyl polysaccharide, an ethoxylated fatty acid, an ethoxylated fatty alcohol, or an ethoxylated fatty amine, or a nonionic surfactant having the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group.

78. The plant agent composition according to embodiment 77, wherein $R^1$ is a $C_7$-$C_{10}$ normal-alkyl group and/or wherein $R^2$ is a $C_{12}$-$C_{20}$ aliphatic group.

79. The plant agent composition according to any one of embodiments 67-78, wherein the nonionic surfactant is an ethoxylated nonyl phenol, an ethoxylated octyl phenol, an ethoxylated ceto-oleyl alcohol, an ethoxylated ceto-stearyl alcohol, an ethoxylated decyl alcohol, an ethoxylated dodecyl alcohol, an ethoxylated tridecyl alcohol, or an ethoxylated castor oil.

80. The plant agent composition according to any one of embodiments 67-79, wherein the plant agent composition comprises from about 1% to about 15% by weight of the one or more nonionic surfactants.

82. The plant agent composition according to embodiment 80, wherein the plant agent composition comprises from about 5% to about 13% by weight of the one or more nonionic surfactants.

83. The plant agent composition according to embodiment 81, wherein the plant agent composition comprises from about 7% to about 11% by weight of the one or more nonionic surfactants.

84. The plant agent composition according to any one of embodiments 67-83, wherein the plant agent composition further comprises, consists essential of or consists of one or more anionic surfactants.

85. The plant agent composition according to embodiment 84, wherein the plant agent composition comprises from about 0.5% to about 10% by weight of the one or more anionic surfactants.

86. The plant agent composition according to embodiment 85, wherein the plant agent composition comprises from about 1% to about 8% by weight of the one or more anionic surfactants.

87. The plant agent composition according to embodiment 86, wherein the plant agent composition comprises from about 2% to about 6% by weight of the one or more anionic surfactants.

88. The plant agent composition according to any one of embodiments 67-87, wherein the pH is at most 4.5.

89. The plant agent composition according to embodiment 88, wherein the pH about 3.7 to about 4.2.

90. The plant agent composition according to any one of embodiments 67-89, wherein the plant agent composition is substantially non-toxic to humans, mammals, plants and the environment.

91. The plant agent composition according to any one of embodiments 67-90, wherein the plant agent composition is biodegradable.

92. A method of controlling a causal agent of a plant disease, the method comprising, consisting essential of or consisting of applying an effective amount of a plant agent composition as defined in any one of embodiments 67-91 to one or more plants infested with a causal agent and/or applying an effective amount of a plant agent composition to one or more locations in a manner where the causal agent will be exposed to the plant agent composition, wherein application of the plant agent composition results in an adverse effect on the causal agent of a plant disease sought to be controlled.

93. A method of increasing plant growth and/or crop production, the method comprising, consisting essential of or consisting of applying an effective amount of a plant agent composition as defined in any one of embodiments 67-91 and/or applying an effective amount of a plant agent composition as defined in any one of embodiments 67-91 to one or more locations where a plant agent composition will be exposed to the one or more plants, wherein application of the plant agent composition results in improved absorption by root hairs, improve xylem sap flow through xylem and improve photosynthate flow in phloem, increased uptake of water, minerals and other nutrients from the soil, increase the capillary action and/or hydrostatic pressure in xylem, and/or increase synthesis of compounds and energy and/or disruption of one or more components blocking xylem sap flow and/or photosynthate flow 94. A method of maintaining or improving the efficiency of an irrigation system, the method comprising, consisting essential of or consisting of applying an effective amount of a plant agent composition as defined in any one of embodiments 67-91 to one or more pipes in a pipeline network of the irrigation system, wherein application of the plant agent composition results in adequate removal of one or more components blocking one or more pipeline networks of an irrigation system.
95. Use of an effective amount of a plant agent composition as defined in any one of embodiments 67-91 for controlling a plant disease.
96. Use of an effective amount of a plant agent composition as defined in any one of embodiments 67-91 for increasing plant growth and/or crop production.
97. Use of an effective amount of a plant agent composition as defined in any one of embodiments 67-91 for maintaining or improving the efficiency of an irrigation system.
98. The method according to embodiments 1, 7-36 or 62-66 or use according to embodiments 4, 7-36 or 62-66, wherein the plant disease is an anthracnose, a blight, a canker, a club root, a damping off, a gall, a leaf blister, a leaf spot, a mildew, a mold, a mosaic virus disease, a rot, a rust, a scab, a smut, a wilt, or any combination thereof.
99. The method according to embodiments 1, 7-36, 62-66 or 98 or use according to embodiments 4, 7-36, 62-66 or 98, wherein the causal agent is a viral causal agent, a bacterial causal agent, a fungal causal agent, a nematode causal agent, or any combination thereof.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the plant agent compositions, or methods or uses disclosed herein.

Example 1

Preparation of Treated Fermented Yeast Supernatant 1

To prepare a treated fermented yeast supernatant, a fermentation reaction is set up in which about 1,000 L of warm water having a temperature of between about 29° C. to about 38° C. was placed in a large jacketed mixing kettle. To the water was added about 84.9 kg black untreated cane molasses, about 25.2 kg raw cane sugar and about 1.2 kg magnesium sulfate. The mixture was thoroughly blended, after which about 11.4 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation composition is centrifuged to remove the "sludge" formed during the fermentation. The resulting fermentation supernatant (about 98.59%, by weight) was collected and sterilized by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 2

Preparation of Treated Fermented Yeast Supernatant 2

To prepare a treated fermented yeast supernatant, a fermentation reaction is set up in which about 1,000 L of warm water having a temperature of between about 29° C. to about 38° C. was placed in a large jacketed mixing kettle. To the water was added about 42.5 kg black untreated cane molasses, about 12.6 kg raw cane sugar and about 1.2 kg magnesium sulfate. The mixture was thoroughly blended, after which about 10.3 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation culture is centrifuged to remove the "sludge" formed during the fermentation. The resulting fermentation yeast supernatant (about 98.59%, by weight) was collected and treated by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 3

Preparation of Treated Fermented Yeast Supernatant 3

To prepare a treated fermented yeast supernatant, a fermentation reaction is set up in which about 1,000 L of warm water having a temperature of between about 29° C. to about 38° C. was placed in a large jacketed mixing kettle. To the water was added about 21.3 kg black untreated cane molasses, about 6.3 kg raw cane sugar and about 1.2 kg magnesium sulfate. The mixture was thoroughly blended, after which about 9.3 kg diastatic malt and about 1.2 kg baker's yeast were added and agitated slightly. The mixture is incubated at about 26° C. to about 42° C. for about 3 days, after which the effervescent reaction had subsided, indicating essentially complete fermentation. At the end of the fermentation the yeast fermentation culture is centrifuged to remove the "sludge" formed during the fermentation. The resulting fermentation supernatant (about 98.59%, by weight) was collected and treated by autoclaving. The treated fermented yeast supernatant can then be stored in liquid form for subsequent use. Alternatively, the treated fermented yeast supernatant can be spray dried by methods known in the art to produce a dry powder. The dry powder form can also be stored for subsequent use.

Example 4

Preparation of Plant Agent Composition

To prepare a plant agent composition, 1,000 L of hot sterile water (about 60° C. to about 65° C.) was added to 1,000 L of treated fermented yeast supernatant in a large jacketed mixing kettle. To this mixture was added about 168.8 kg of TERGITOL™ 15-S-7, a linear secondary alcohol ethoxylate, about 168.8 kg of TERGITOL™ 15-S-5, a linear secondary alcohol ethoxylate, about 67.5 kg of DOWFAX™ 2A1, alkyldiphenyloxide disulfonate, and about 67.5 kg of TRITON™ H-66, phosphate polyether ester. This mixture was thoroughly blended to effect solution. Water was then added to bring the volume to about 4,500 L and stirred until complete mixing had been obtained. The pH of the resulting plant agent composition was adjusted to from about 3.7 to about 4.2 with phosphoric acid. The pH adjusted plant agent composition was then filter sterilized to remove any microbial contamination.

The composition was found to be nonirritating to skin tissue, nontoxic and could be stored in a cool location over periods of months without any discernible loss in effectiveness or deterioration.

DOWFAX™ 2A1 can be substituted with an anionic biosurfactant such as, e.g., STEPONOL® AM 30-KE, an ammonium lauryl sulfate, STEPONOL® EHS, a sodium 2-ethyl hexyl sulfate, or a combination thereof.

Optionally, the resulting plant agent composition may then be mixed with preservative or stabilizing agents, such as about 1% by weight sodium benzoate, about 0.01% by weight imidazolidinyl urea, about 0.15% by weight diazolidinyl urea, about 0.25% by weight calcium chloride. With continuous agitation, sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to from about 20° C. to about 25° C. The pH of the resulting plant agent composition was adjusted to from about 3.7 to about 4.2 with phosphoric acid. The pH adjusted plant agent composition was then filter sterilized to remove any microbial contamination.

Example 5

Preparation of Plant Agent Composition

To prepare a plant agent composition, 850 L of hot sterile water (about 60° C. to about 65° C.) was placed in a large jacketed mixing kettle. To the water was added about 7.62 g treated fermented yeast supernatant dried powder, about 37.5 kg of TERGITOL™ 15-S-7, a linear secondary alcohol ethoxylate, about 37.5 kg of TERGITOL™ 15-S-5, a linear secondary alcohol ethoxylate, about 15.0 kg of DOWFAX™ 2A1, alkyldiphenyloxide disulfonate, and about 25.0 kg of TRITON™ H-66, phosphate polyether ester. This mixture was thoroughly blended to effect solution. Water was then added to bring the volume to about 1,000 L and stirred until complete mixing had been obtained. The pH of the resulting plant agent composition was adjusted to from about 3.7 to about 4.2 with phosphoric acid. The pH adjusted plant agent composition was then filter sterilized to remove any microbial contamination.

Optionally, the resulting plant agent composition may then be mixed with preservative or stabilizing agents, such as about 1% by weight sodium benzoate, about 0.01% by weight imidazolidinyl urea, about 0.15% by weight diazolidinyl urea, about 0.25% by weight calcium chloride. With continuous agitation, sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to from about 20° C. to about 25° C. The pH of the resulting plant agent composition was adjusted to from about 3.7 to about 4.2 with phosphoric acid. The pH adjusted plant agent composition was then filter sterilized to remove any microbial contamination.

The composition was found to be nonirritating to skin tissue, nontoxic and could be stored in a cool location over periods of months without any discernible loss in effectiveness or deterioration.

DOWFAX™ 2A1 can be substituted with an anionic biosurfactant such as, e.g., STEPONOL® AM 30-KE, an ammonium lauryl sulfate, STEPONOL® EHS, a sodium 2-ethyl hexyl sulfate, or a combination thereof.

As an alternative to the treated fermented yeast supernatant dried powder disclosed in Examples 1-3, commercially available treated fermented yeast supernatant dried powders can be used, including, e.g., TASTONE® 154, TASTONE® 210 or TASTONE® 900.

Example 6

Rice Study

This example shows the effects of a plant agent composition disclosed herein on rice plant growth and grain production.

In one assay, the effects of a plant agent composition disclosed herein on rice seed germination, seedling height and root length was assessed. Seeds from the rice variety Oryzica 1 were divided into three groups of 100 seeds, placed in a bag and each group pre-treated for 2 minutes by immersing the bag in one of the following solutions: 1) distilled water (control); 2) a 2% solution of a plant agent composition disclosed herein (92% treated fermented supernatant and 8% surfactant); and 3) a 2% solution of a plant agent composition disclosed herein (90% treated fermented supernatant and 10% surfactant). Treated seeds were was sown in sterile sand and then placed in a soil grower for 7-10 days to allow for germination. Germination effects was assessed by determining germination percentage, height of seedling and root length. This assay was performed four times. The results indicated that seed treatments of rice seed variety Oryzica 1 showed no differences in the measured variables: germination percentage, seedling height and root length.

In another assay, the effects of a plant agent composition disclosed herein on growth of rice seedlings was assessed. Seedlings from the rice variety Oryzica 1 were divided into group of 20 seedlings and transplanted into planters with previously sterilized soil fertilized properly to meet the nutritional requirements of a good development of the rice plant. The seedlings were divided into three groups of five planters. Seedlings were treated with 2 mL of one of three solution each day for 20 days. Group 1 was treated with distilled water (control); Group 2 was treated with a 2% solution of a plant agent composition disclosed herein (92% treated fermented supernatant and 8% surfactant); and Group 3 was treated with a 2% solution of a plant agent composition disclosed herein (90% treated fermented supernatant and 10% surfactant). At the end of the 20-day period, data seedling height, stem production, and grain yield was taken.

The results indicated that Treatment Groups 1 and 2 showed significant improvement relative to Control Group 1. For example, one assessment I the ratio of stem growth to panicle (loose, branching cluster of flower) growth. The Control Group 1 showed greater stem/panicle ratio (15.4/12.2) with many long stems with very short panicle, an indicator of less grain production. Treatment Group 1 and Treatment Group 2 showed more favorable stem/panicle ratios (10.4/7.4 and 12.2/10.2, respectively) which will result in higher grain yields. Treatment Group 2 showed a better stem/panicle ratio relative to Treatment Group 1, producing long stems with good panicles. In addition, of the panicle produced, the Control Group 1 contained 13.5% vain grain (not full of rice grain), which is an indicator of sterility. Treatment Group 2 showed 6.4% vain grain and Treatment Group 3 showed 3.9% vain grain. Thus, treatment with a plant agent composition disclosed herein reduced sterility in the plants. Furthermore, Treatment Group 2 produced 14% more grains per plant and Treatment Group 3 produced 64% more grains per plant when compared to Control Group 1. Furthermore, Treatment Group 2 showed a 55% increase in root growth and Treatment Group 3 produced 104% increase in root growth when compared to Control Group 1. Taken together, significant benefits were observed when rice plants were treated with a 2% solution of a plant agent composition disclosed herein.

Example 7

Tomato Study

This example shows the effects of a plant agent composition disclosed herein on tomato plant growth and fruit production.

Tomato seedlings were grown in greenhouses in soil composed of 40% sand and 60% organic compost. Although no fertilizer or urea was used, cow manure was applied. The tomato seedlings were divided into two groups: The Control Group comprised seedlings that were drip irrigated with distilled water (control) each day for 6 months. The Treatment Group comprised seedlings that were drip irrigated with a 2% solution of a plant agent composition disclosed herein (90% treated fermented supernatant and 10% surfactant). Plants were assessed on a monthly basis for a 6-month period of time. Plant growth and fruit production were assessed.

The results indicated that Treatment Group showed significant improvement relative to Control Group. For example Treatment Group plants were stronger and more robust than the Control Group throughout the entire 6-month period. In addition, the Control Group had a 30% mortality for this study while the Treatment Group exhibited 100% survivability rate. Furthermore, Treatment Group plants were still flowering and bearing fruit for 5 months while the Control Group stopped flowering and bearing fruit after 3 months. Lastly, the final yield of the crop for the Treatment Group was over 2 times more than the Control Group yield. For example, the Control Group yielded 720 Kg of tomatoes while the Treatment Group yielded 1,715 Kg of tomatoes. Taken together, significant benefits were observed when tomato plants were treated with a 2% solution of a plant agent composition disclosed herein.

Similar studies were conducted for parsley. The results indicated that five times more parsley could be harvested from a Treatment Group treated with a 2% solution of a plant agent composition disclosed herein relative to a Control Group treated with distilled water.

Similar studies were conducted for eggplant. The results indicated 28% more eggplant could be harvested from a Treatment Group treated with a 2% solution of a plant agent composition disclosed herein relative to a Control Group treated with distilled water.

Example 8

Olive Tree Study

This example shows the effects of a plant agent composition disclosed herein on olive tree growth and fruit production.

Olive trees grown in an orchard were divided into two groups: The Control Group comprised trees that were drip irrigated with distilled water (control) over the course of two seasons. The Treatment Group comprised trees that were drip irrigated with a 2% solution of a plant agent composition disclosed herein (90% treated fermented supernatant and 10% surfactant) over the course of two seasons. Plants were assessed on a monthly basis over the study period. Plant growth and fruit production were assessed.

The results indicated that Treatment Group showed significant improvement relative to Control Group. For example, the Treatment Group yielded about 35% to about 40% more olives compared to the Control Group. More astonishingly, fruiting occurring every year for olive trees in the Treatment Group as compared to the Control Group which fruited every other year. Lastly, the taste of the oil, specifically the phenols, were enhanced, and therefore taste or quality was improved in the oil from the trees in the Treatment Group relative to the Control Group.

Similar test results were observed for walnut trees and almond trees.

Example 9

Tobacco Study

This example shows the effects of a plant agent composition disclosed herein on tobacco growth and fruit production.

Tobacco seedlings were grown in field. The tobacco seedlings were divided into two groups: The Control Group comprised seedlings that were drip irrigated with distilled water (control) each day for 6 months. The Treatment Group comprised seedlings that were drip irrigated with a 2% solution of a plant agent composition disclosed herein (90% treated fermented supernatant and 10% surfactant). Plants were assessed on a monthly basis for a 6-month period of time. Plant growth and fruit production were assessed.

The results indicated that Treatment Group showed significant improvement relative to Control Group. For example, tobacco crops from the Treatment Group showed about 40% to about 50% more growth compared to the Control Group. In addition, tobacco crops from the Treatment Group exhibited larger root growth and better survival rates of seedlings.

Similar test results were observed for *cannabis*, although the study was performed in a greenhouse.

Example 10

Plant Disease Study

This example shows the effects of a plant agent composition disclosed herein on treating a plant disease caused by a causal agent disclosed herein.

Roses with leaf spot caused by a fungal infestation were treated with a 1:200 dilution on a plant agent composition disclosed herein using a spray bottle. After one to two weeks the fungal infestation was gone.

Olive trees with blight caused by a fungal infestation were treated with a 1:1000 dilution on a plant agent composition disclosed herein using a drip irrigation system. After one to two weeks the fungal infestation was gone.

Olive trees with blight caused by a bacterial infestation were treated with a 1:1000 dilution on a plant agent composition disclosed herein using a drip irrigation system. After one to two weeks the bacterial infestation was gone.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A dry powdered composition comprising at most 20.0% by weight of a dried treated, fermented yeast supernatant including bio-nutrients, minerals and amino acids, and one or more nonionic biosurfactants, wherein the composition lacks active enzymes contributed by yeast during fermentation due to the treatment.

2. The dry powdered composition according to claim 1, wherein the dried treated, fermented yeast supernatant is produced from a culture containing yeast belonging to the genus *Brettanomyces, Candida, Cyberlindnera, Cystofilobasidium, Debaryomyces, Dekkera, Geotrichum, Issatchenkia, Kazachstania, Kloeckera, Kluyveromyces, Pichia, Rhodosporidium, Rhodotorula, Saccharomyces, Schizosaccharomyces, Thrichosporon, Torulaspora, Torulopsis, Yarrowia, Zygosaccharomyces*, or *Zygotorulaspora.*

3. The dry powdered composition according to claim 1, comprising at most 15% by weight of the dried treated, fermented yeast supernatant.

4. The dry powdered composition according to claim 3, comprising at most 10% by weight of the dried treated, fermented yeast supernatant.

5. The dry powdered composition according to claim 1, comprising about 5% to about 15% by weight of the dried treated, fermented yeast supernatant.

6. The dry powdered composition according to claim 5, comprising about 5% to about 10% by weight of the dried treated, fermented yeast supernatant.

7. The dry powdered composition according to claim 1, comprising at least 10.0% by weight of the one or more nonionic biosurfactants.

8. The dry powdered composition according to claim 1, being non-toxic to humans, mammals, plants or the environment.

9. The dry powdered composition according to claim 1, wherein the dry powdered composition does not contain any ionic surfactants.

10. The dry powdered composition according to claim 1, further comprising an antimicrobial.

11. The dry powdered composition according to claim 1 comprising at least 10.0% by weight of the one or more nonionic biosurfactants, and wherein the dried treated, fermented yeast supernatant is produced from a culture containing yeast belonging to the genus *Saccharomyces.*

12. The dry powdered composition according to claim 11, wherein the yeast is *Saccharomyces cerevisiae.*

13. The dry powdered composition according to claim 11, comprising at most 15.0% by weight of a dried treated, fermented yeast supernatant.

14. The dry powdered composition according to claim 13, comprising at most 10% by weight of the dried treated, fermented yeast supernatant.

15. The dry powdered composition according to claim 11, comprising about 5% to about 15% by weight of the dried treated, fermented yeast supernatant.

16. The dry powdered composition according to claim 15, comprising about 5% to about 10% by weight of the dried treated, fermented yeast supernatant.

17. The dry powdered composition according to claim 11, being non-toxic to humans, mammals, plants or the environment.

* * * * *